US012780308B2

(12) United States Patent
Noël et al.

(10) Patent No.: US 12,780,308 B2
(45) Date of Patent: Nov. 3, 2026

(54) STEERING AND BOGIE ADJUSTMENT ASSEMBLY FOR A VEHICLE STEERING WHEELS SYSTEM

(71) Applicant: GN Technologies Inc., Sainte-Julie (CA)

(72) Inventors: Gérard Noël, Sainte-Julie (CA); Alexandre Noël, Sainte-Julie (CA)

( * ) Notice: Subject to any disclaimer, the term of this patent is extended or adjusted under 35 U.S.C. 154(b) by 345 days.

(21) Appl. No.: 18/594,553

(22) Filed: Mar. 4, 2024

(65) Prior Publication Data

US 2024/0208570 A1 Jun. 27, 2024

Related U.S. Application Data

(63) Continuation of application No. 18/120,304, filed on Mar. 10, 2023, now Pat. No. 11,945,497.

(60) Provisional application No. 63/319,108, filed on Mar. 11, 2022.

(30) Foreign Application Priority Data

Sep. 30, 2022 (CA) ................................ CA 3178011

(51) Int. Cl.
*B62D 13/02* (2006.01)
*B60G 15/12* (2006.01)
*B62D 13/04* (2006.01)

(52) U.S. Cl.
CPC ............. *B62D 13/02* (2013.01); *B60G 15/12* (2013.01); *B62D 13/04* (2013.01)

(58) Field of Classification Search
CPC ......... B62D 13/02; B62D 13/04; B60G 15/12
See application file for complete search history.

(56) References Cited

U.S. PATENT DOCUMENTS 4,720,119 A * 1/1988 Ritter ..................... B62D 13/04 280/419
6,125,963 A 10/2000 Staiger
7,874,571 B2 * 1/2011 Frey ......................... B60G 3/14 280/445
8,600,620 B2 12/2013 Noel
9,114,827 B2 8/2015 Burns, Jr.
9,828,051 B2 * 11/2017 Gray .................... B62D 13/025

FOREIGN PATENT DOCUMENTS

GB 2396141 A * 6/2004 ........... B62D 13/025
JP 2020128103 A * 8/2020

* cited by examiner

*Primary Examiner* — Jacob D Knutson
(74) *Attorney, Agent, or Firm* — Decode Legal Inc.; Mathieu Audet

(57) ABSTRACT

A coupling assembly is coupling a steering mechanism to a steering axle of a vehicle. The coupling assembly comprises subassemblies, one mounted to the chassis and the other to the bogie; and racks extending side by side, that couple the subassemblies. One rack is coupled to steering mechanism and the one subassemblies is coupled to the steering axle. The coupling assembly operates such that when the steering member moves relative to the first subassembly, it exerts the racks to move relative to each other, resulting in the second subassembly steering the steering axle. However, when the bogie moves, the second subassembly moves without the elongated members moving relative to each other.

20 Claims, 66 Drawing Sheets

STEERING AND BOGIE ADJUSTMENT ASSEMBLY FOR A VEHICLE STEERING WHEELS SYSTEM

CROSS-REFERENCE TO RELATED APPLICATION

This application relates to and is a non-provisional application claiming priority under 35 U.S.C. § 121 from U.S. patent application Ser. No. 18/120,304, filed Mar. 10, 2023, published Sep. 14, 2023 under Publication No. US 2023/0286581 A1, and entitled VEHICLE STEERING WHEELS SYSTEM, which is priority under 35 U.S.C. § 119(a) and 37 C.F.R. § 1.55 from Canadian patent application Ser. No. 3,178,011, filed Sep. 30, 2022, published Sep. 11, 2023 under Publication No. CA 3,178,011 A1, entitled VEHICLE STEERING WHEELS SYSTEM, and under 35 U.S.C. § 119(e) from U.S. patent application Ser. No. 63/319,108, filed Mar. 11, 2022, under 35 U.S.C. § 111, entitled VEHICLE STEERING WHEELS SYSTEM, the specifications of which are hereby incorporated herein by reference in their entireties.

BACKGROUND

(A) Field

The present invention generally relates to steering systems, and more particularly, to a steering system for a trailer in a tractor/trailer combination. More particularly, it relates generally to the field of trailer having steering axle(s) to enhance the turning radius and overall maneuverability of the trailer.

(b) Related Prior Art

Semi-trailers and trailers are in widespread use throughout the world to transport goods, vehicles, and other cargo. Due to industry demands, trailer length and payload capacities have increased to meet such demands. While increased trailer length and payload capacity allows a greater amount of cargo and heavier payloads to be transported, longer length and heavier trailers are more difficult to maneuver, particularly in congested urban areas.

To handle the weight distribution associated with long length trailers and/or heavy payloads, trailers can be equipped with additional axles and/or spaced axles. While spaced axles, configured as individual axles or tandem groups of axles, enhance ride quality, they disadvantageously decrease the turning radius of the trailer. Poor maneuverability and decreased turning radius can lead to wear-and-tear on the trailer components, increasing costs and requiring more frequent service and replacement of worn and damaged components. In addition, trailer maneuverability difficulties can, for instance, create road hazards, increase the likelihood of property damage, and add to congestion in urban areas.

Examples of trailers with steerable axles comprise U.S. Pat. No. 2,662,782 from Wilson, U.S. Pat. No. 3,533,644 from Humes, and U.S. Pat. No. 4,955,630 from Hogren. These systems, through their conception, have a gross level of control of the steering angle, without distinction of steering angle between the left wheel(s) and the right wheel(s). Examples also comprises U.S. Pat. Nos. 4,740,006, 5,026,085, US5,071,152, and U.S. Pat. No. 5,392,872 from Ducote that feature a remote-control system that also features no distinction in the wheel steering based on side of the wheel(s). Same applies to the systems described in U.S. Pat. No. 5,289,892 from Notsu, U.S. Pat. Nos. 7,694,993 and 8,260,457 from Timmons Jr., and CA 2,399,992 from Guerard.

In comparison, CA 2,758,217 from Noel teaches to interconnect the steering systems of the wheels from neighbor axles of a trailer located on the same side of the trailer to improve cooperation of the front and the rear axles.

U.S. Pat. No. 5,308,095 from Fabris involves a gearing system involving angular cog teeth that present technical difficulties of production, that increases production costs, and that increases risks of failures.

U.S. Pat. No. 6,409,199 form Boyd involves a combination of hydraulic components controlling independently the steering of the left wheel(s) and of the right wheel(s), which improves the risks of the wheels steering at incompatible angles upon occurrence of failures.

U.S. Pat. No. 7,686,320 from McGhie features connection between neighbor wheels of the same side of the trailer to steer them that is difficult to optimize for different steering angles. It is further sensible to high steering angles risking having the arm connecting two wheels to touch one of the wheels.

U.S. Pat. No. 8,955,853 from Perkins and US 2011/0202238 from Cebon feature components that are electrically controlled, and sensible to failures of the sensors and of the signal encoding, decoding and transmission.

U.S. Pat. No. 9,266,557 from Matayoshi involves the control of the steering of the trailer wheels via a steering wheel operated by a user, and thus requiring additional attention and work from the user than what is required with non-steerable wheels trailers. Furthermore, Matayoshi, through its conception of independent controls of the left side and the right side wheels, renders the trailer inoperable as soon as a failure occurs.

U.S. Pat. Nos. 9,598,103 and 10,449,954 From Langenfeld, and U.S. Pat. No. 10,766,521 from Ruebusch, like Matayoshi, involve the control of the steering of the trailer wheels via a steering wheel operated by a user, thus featuring the same disadvantages.

US 2019/0263448 from Lukka features a complex system involving control arms configured to control the steering angles of the wheels. As the number of steerable axles increases, the system of Lukka becomes complex, and thus expensive for maintenance and replacement.

It is worth observing that solutions discussed before are configured for single steering axles or more steerable axles. However, most of them do no provide a common solution for both single axle trailers and multi-axle trailers that remain coherent and with the same robustness for all axles.

It is further worth observing that none of the solutions discussed before feature a failure safe solution that result, in case of a failure of a component, in the trailer remaining operable.

There is therefore a need for innovative solutions that overcome at least some of the discussed drawback of known trailer steering systems.

SUMMARY

According to embodiments, there is provided a steering system for steering wheels of a trailer based on a read angle apparatus between a tractor and a trailer.

According to embodiments, there is provided a steering system for steering wheels of a trailer that directs wheels of the trailer in a path similar to the path of the tractor vehicle. This is also applicable to a series of trailers.

A solution for reading angle between a tractor and a trailer is also provided.

A solution for mechanically transmitting a read angle occurring between a tractor and a trailer to a hydraulic system as a linear motion is also provided.

A solution for exerting specific steering angles to opposed wheels on an axle in a common and synchronous manner preventing ripping for both wheels is also provided.

A hydraulic power accumulator powered by the rotation of the wheels of a trailer is also provided.

A solution for decreasing wear of air springs is also provided.

In some aspects, the techniques described herein relate to a steering system for steering steerable wheels based on an angle registered at a steering direction interface, wherein the registered angle results from hauling the steerable wheels, the steering system including: a steer driving assembly operating at the steering direction interface, the steer driving assembly being adapted to translate a registered angle at the steering direction interface into a longitudinal displacement of an arm member; and a steering axle including: an axle structure; a rotatable central piece mounted to the axle structure, the central piece being rotatable about a central axis and connected to the arm member; and a first rotatable side piece mounted to the axle structure, the first side piece being rotatable about a first side axis, a second rotatable side piece mounted to the axle structure, the second side piece being rotatable about a second side axis, wherein a steerable wheel is rigidly connected to each one of the first and the second rotatable side pieces; wherein each of the first and the second rotatable side pieces are driven by the rotatable central piece, wherein the rotatable central piece is interfacing with the first rotatable side piece and with the second side piece along a non-circular interface relative to the central axis, and wherein the steering system exerts a specific steering direction to each of the steerable wheel rigidly connected to first and the second rotatable side piece in response to a registered angle.

In some aspects, the techniques described herein relate to an angular encoder system for registering an angle at a steering direction interface about a hauling attachment between a hauling saddle and a kingpin, the angular encoder system including: a releasable clinging assembly including a clinging component adapted to releasably cling to the kingpin, and a releasing means adapted, when undergoing an external force, to pull away the clinging component from the kingpin; an angular encoder; and a connector coupling the releasable clinging assembly to the angular encoder.

In some aspects, the techniques described herein relate to a mechanical steer driving assembly for a trailer, the mechanical steer driving assembly being for transforming a change of hauling angle between a hauling saddle and a kingpin into a linear displacement substantially longitudinal to the trailer, the mechanical steer driving assembly including: an interfacing piece interfacing with the saddle, the interfacing piece being adapted to adopt direction of the saddle; a cog railway connected to the piece; a support structure to which is slidably mounted the cog railway; at least one rotatable gear mounted to the support structure, one of the at least one rotatable gear interfacing with the cog railway, with the one rotatable gear being exerted in rotating when the cog railway slides relative to the support structure; a hauling angle transformation mechanism mounted to the support structure and connected to a terminal gear of the at least one rotatable gear, the hauling angle transformation mechanism being adapted to receive a change in the hauling angle through the at least one rotatable gear and to translate it into a linear motion; and a transmission component connected to the hauling angle transformation mechanism, the hauling angle transformation mechanism being adapted to undergo the linear.

In some aspects, the techniques described herein relate to a steering axle to be mounted to a vehicle having a longitudinal axis, the steering axle including: an axle structure; a left steering piece rotatably mounted to the axle structure and adapted to have a left steerable wheel mounted thereto having a rotation axis; a right steering piece rotatably mounted to the axle structure and adapted to have a right steerable wheel mounted thereto a rotation axis; and a central piece rotatably mounted to the axle structure about a pivot axis, the central piece having a left interface and a right interface symmetric to each other, the left interface and the right interface having a neutral position opposed to each other relative to the pivot axis of the central piece, wherein, in the neutral position, the rotation axes of the steerable wheels being parallel each other, and wherein the left interface and the right interface are non-symmetrical relative to their respective neutral position.

In some aspects, the techniques described herein relate to a steering driving assembly for a vehicle including a) a bogie including a steering axle and b) a chassis movable relative to the bogie, wherein the steering driving assembly is adapted to transmit a steering movement longitudinal to the vehicle to the steering axle, the steering assembly including: a trailer-mounted (stm) assembly including a stm body and a stm gear assembly mounted to the stm body, the stm gear assembly including a first stm gear and a second stm gear interfacing with the first stm gear; a bogie-mounted (bm) assembly including a bm body and a bm gear assembly including a fix bm gear mounted to the gm body, and a mobile bm gear interfacing with the first bm gear, a gear connecting arm connecting the fix bm gear to the mobile bm gear and allowing the mobile bm gear to partially revolve around the fix bm gear, wherein the mobile bm gear is mounted to a mobile shaft adapted to connect to a downstream steer driving arm; an upstream cog rail and a downstream cog rail that are mounted to the trailer-mounted assembly and the bogie-mounted assembly, wherein the upstream cog rail is adapted to connect to an upstream steer driving arm movable longitudinally to the vehicle, and wherein the upstream cog rail and the downstream cog rail interface with each other through the stm gear assembly; wherein the steering driving assembly allows displacement of the bogie-mounted assembly along the cog rails without displacement of the cog rails relative to each other, and wherein the steering driving assembly is adapted to communicate movement of the upstream steer driving arm to the downstream steer driving arm therethrough.

In some aspects, the techniques described herein relate to a hydraulic power accumulator powered by rotation of wheels under an external force, the hydraulic power accumulator being fluidly connected to a hydraulic circuit including a hydraulic actuator powered with pressurized liquid, the hydraulic power accumulator including: a hydraulic generator mounted to the wheel and fluidly connected to the hydraulic circuit, the hydraulic generator being driven by the rotation of the wheel to pump liquid into the hydraulic circuit; a passive pressurized reservoir adapted to receive and store liquid pumped by the hydraulic generator, wherein pressure of liquid increases with its stored volume; controls adapted to use liquid under pressure from the pressurized reservoir to power a hydraulic component connected to the hydraulic circuit.

In some aspects, the techniques described herein relate to an air suspension for a vehicle including a chassis, including: a structure connected to wheels, the structure having a generally flat face; a shock absorber mounted to the structure and connected to the chassis; and an air spring mounted to the structure and connected to the chassis, wherein the structure includes a mounting plate for the air spring that is at an angle relative to the flat face of the structure.

In some aspects, the techniques described herein relate to a steering converter adapted to convert a steering-tractor movement into a steering movement steering steerable wheels, the steering converter including: a structure; a first component adapted to be exerted the steering-tractor movement relative to the structure in a first direction, the first component including a channel that is sloped relative to the first direction; a steering component rotatably mounted to the structure about a rotation axis, the steering component including a first shaft engaged in the channel, and second shaft distant to the first shaft designed to transmit the steering movement, wherein movement of the first component exerts the first shaft to travel into the channel.

In some aspects, the description herein relates to a coupling assembly of a vehicle, the coupling assembly being designed for coupling a steering mechanism to a steering axle mounted to a bogie movable relative to the steering mechanism, the coupling assembly including: a first subassembly for mounting to the vehicle, including a first structure for being coupled to the vehicle at a fixed distance relative to the steering mechanism and a first linking mechanism mounted to the first structure: a second subassembly for mounting to the bogie, including a second structure for being coupled to the bogie, a second linking mechanism mounted to the second structure, and an intermediary steering component coupled to the second linking mechanism designed to be coupled to the steering axle: and a pair of elongated members extending side by side, the elongated members coupling the subassemblies, wherein a first one of the elongated members is adapted to be coupled to the steering member, wherein, when the steering member is moving relative to the first subassembly, the steering member is exerting the elongated members to move relative to each other with the intermediary steering component being controlled therethrough, and wherein, when the bogie is moving relative to the steering mechanism, the bogie exerts the second subassembly to move relative to the first subassembly without exerting the elongated members to move relative to each other.

In some aspects, the description herein relates to a vehicle including: a chassis; a bogie movable relative to the chassis: a steering axle mounted to the bogie; a steering mechanism; and a coupling assembly coupling the steering mechanism to the steering axle, the coupling assembly including: a first subassembly, including a first structure coupled to the chassis, and a first linking mechanism mounted to the first structure: a second subassembly, including a second structure coupled to the bogie, a second linking mechanism mounted to the second structure, and an intermediary steering component coupled to the second linking mechanism coupled to the steering axle: and a pair of elongated members extending side by side, the elongated members coupling the subassemblies, wherein a first one of the elongated members is coupled to the steering mechanism, wherein the steering mechanism is adapted to exerts the elongated members to move relative to each other with the intermediary steering component being controlled therethrough, thereby steering the steering axle, and wherein, when the bogie is moving relative to the chassis, the bogie exerts the second subassembly to move relative to the first subassembly without the elongated members moving relative to each other.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations, and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

Figure 1:
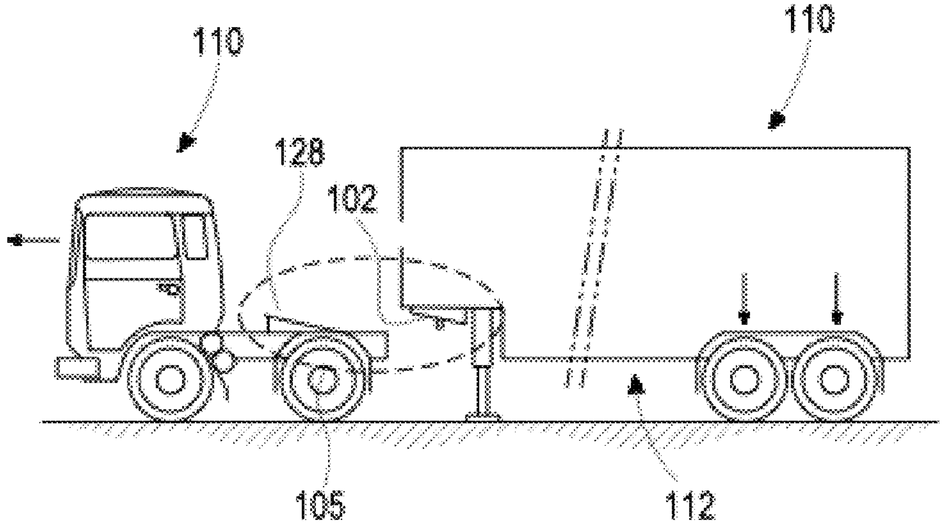
FIG. 1 is a side view of an exemplary tractor and a trailer disengage from the tractor, with normal orientations depicted, in accordance with an embodiment.
Figure 2:
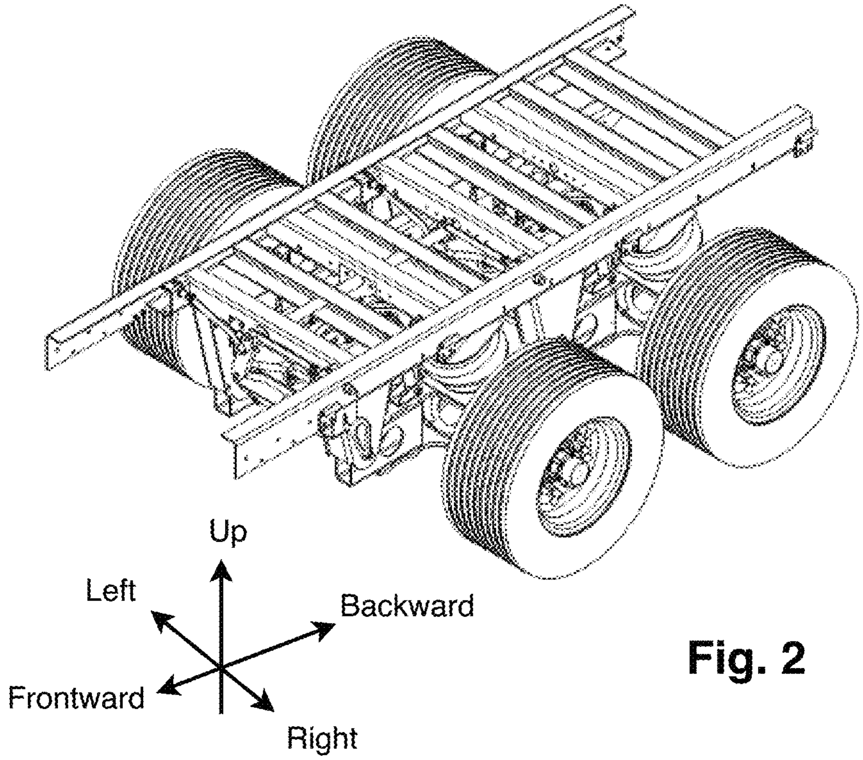
FIG. 2 is an elevated perspective view of a section of a trailer comprising two steerable axles, loading bed removed, with normal orientations depicted, in accordance with an embodiment.
Figure 3:
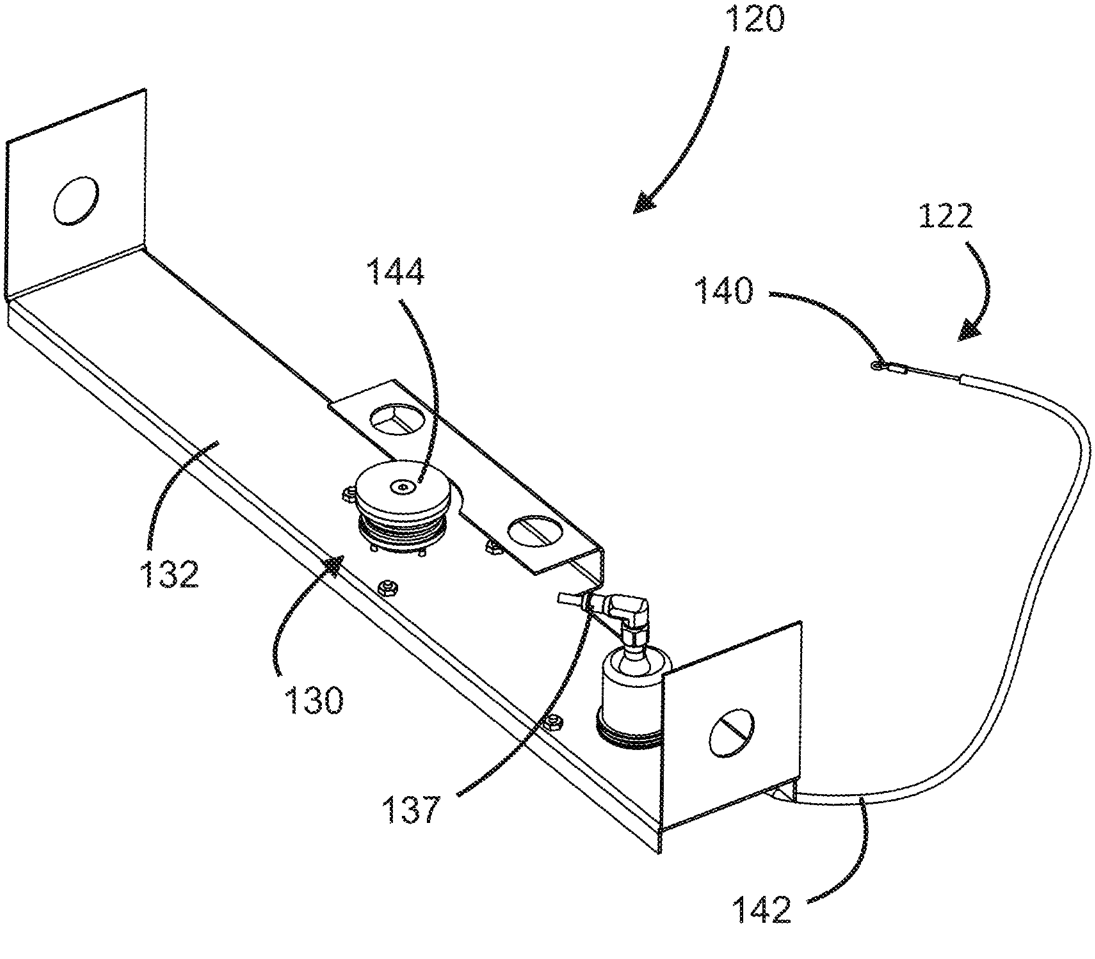
FIG. 3 is an elevated perspective view of an angular sensor system adapted to me mounted to a tractor.
Figure 4:
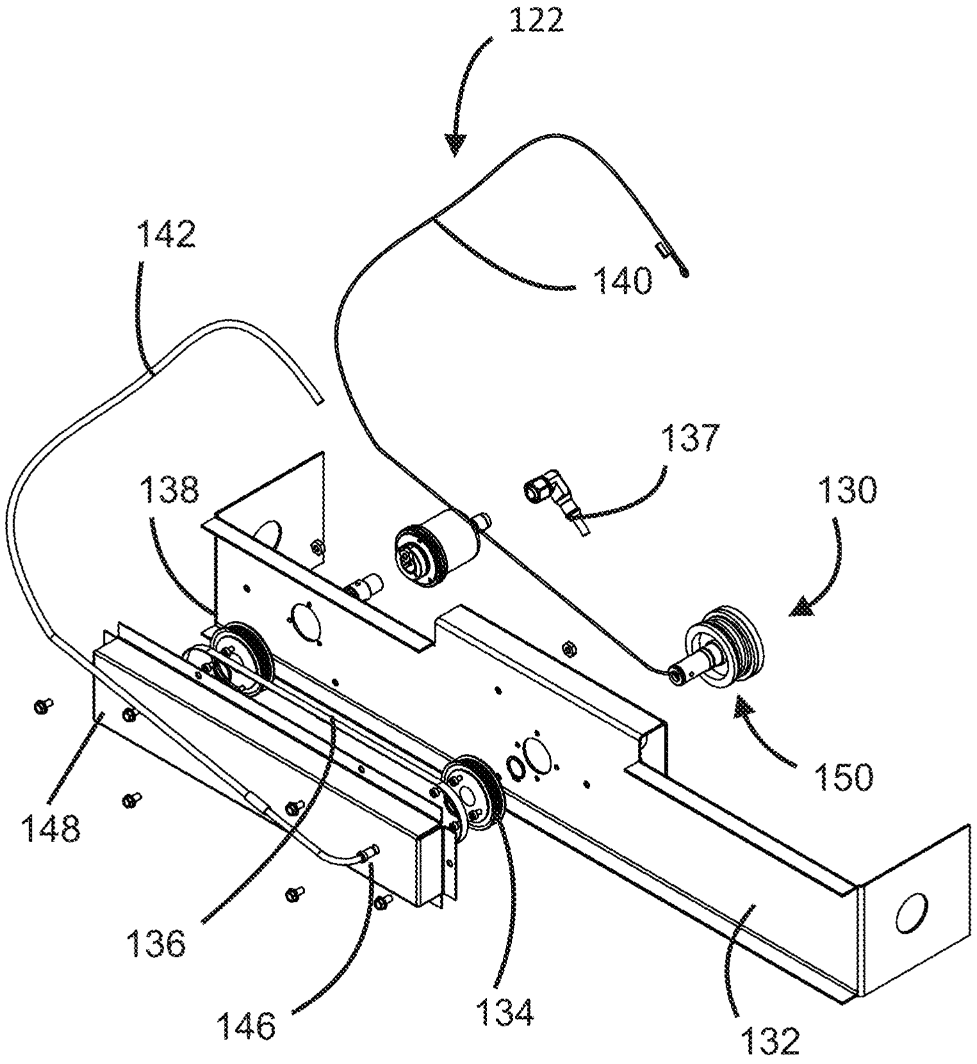
FIG. 4 is an exploded bottom perspective view of the angular sensor system of FIG. 3.
Figure 5:
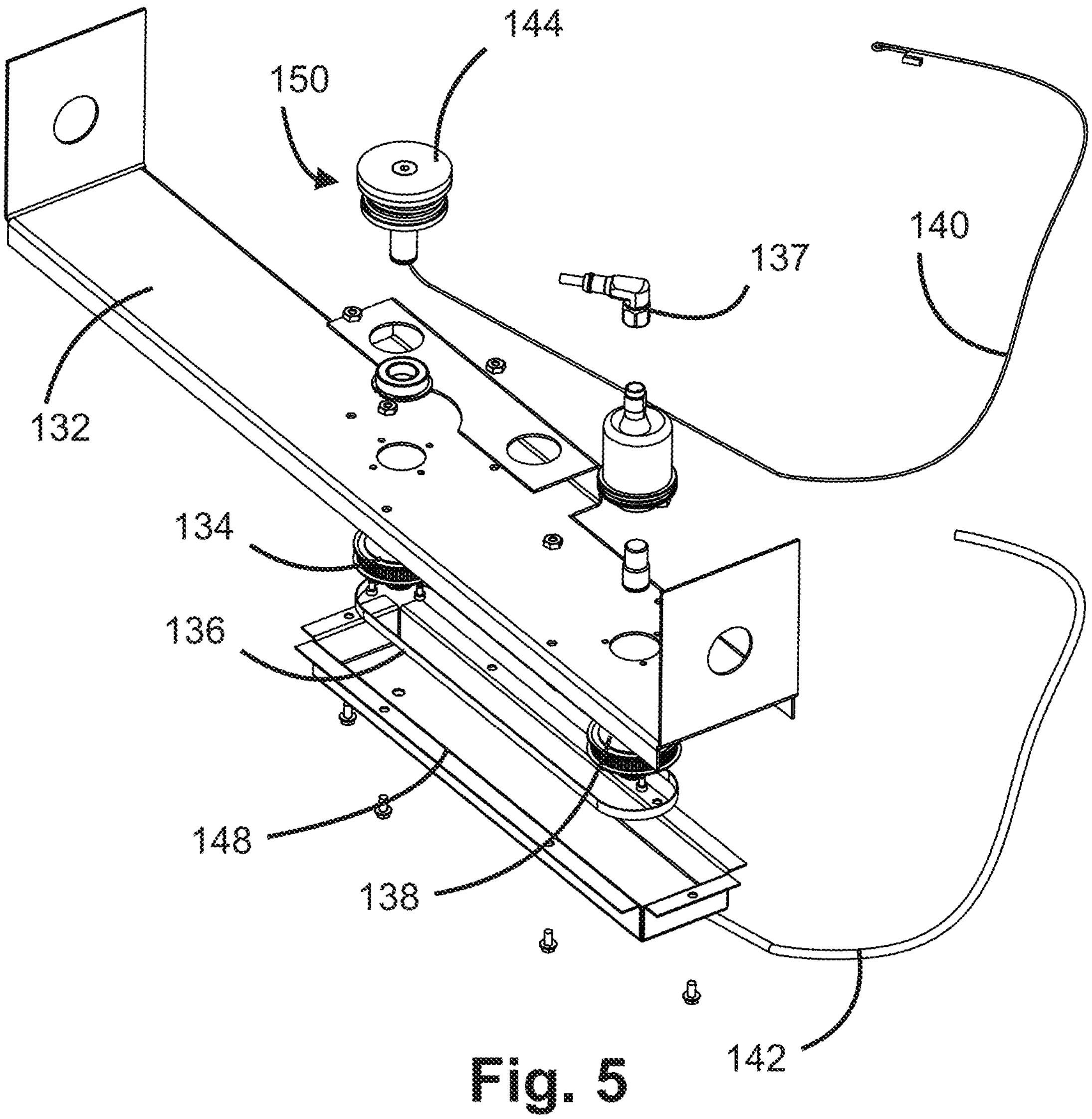
FIG. 5 is an exploded perspective view of the angular sensor system of FIG. 3.
Figure 6:
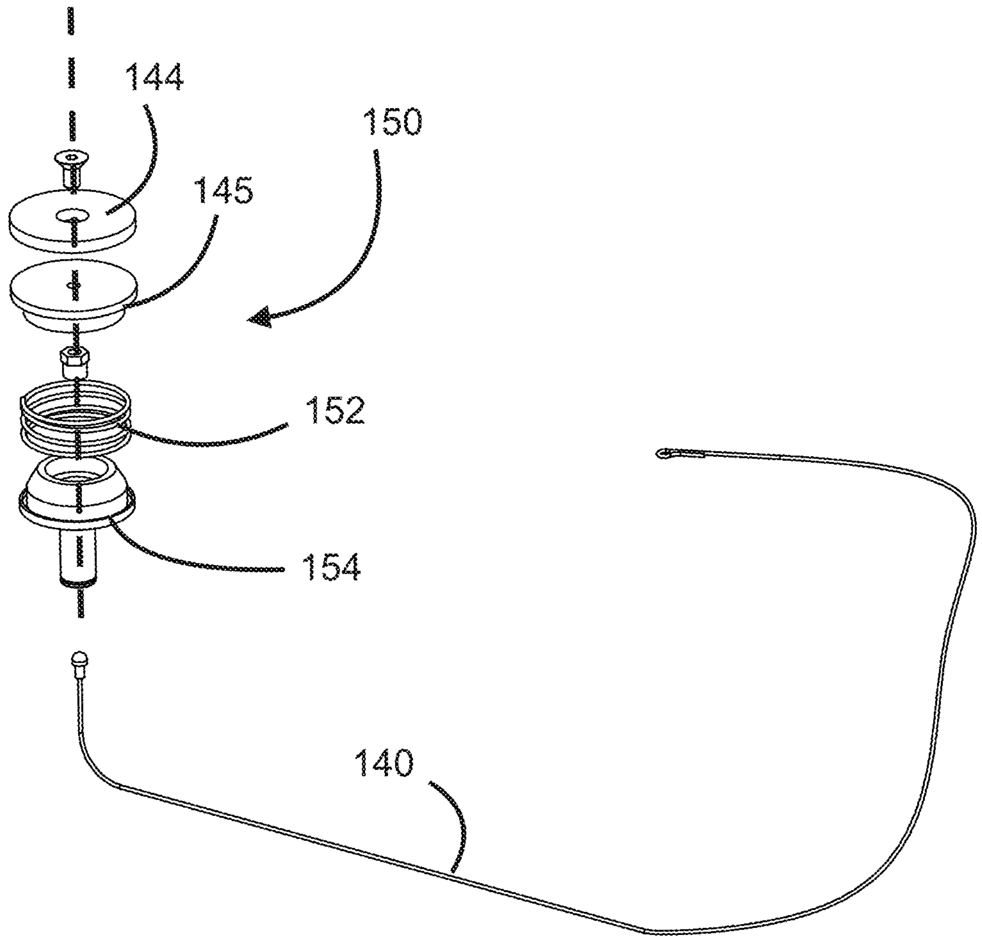
FIG. 6 is an exploded view of the compressible assembly of the kingpin clinging assembly of FIG. 3 and of the cable connected thereto.
Figure 7:
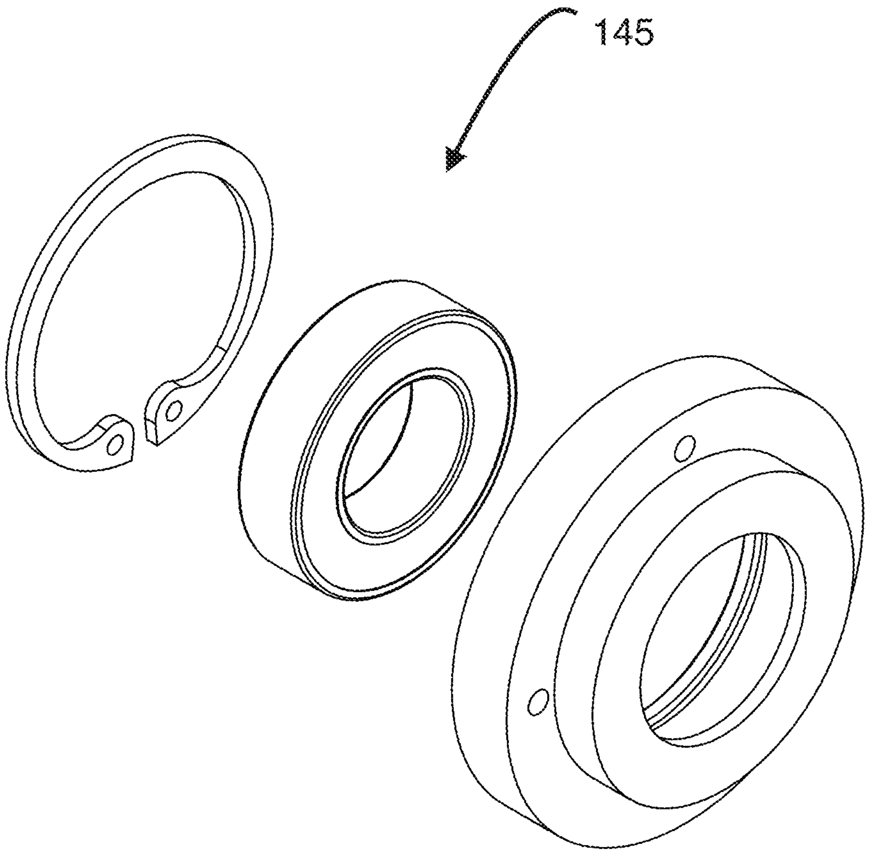
FIG. 7 is an exploded view of bearing assembly components of the angle sensor system of FIG. 3.

The terms "top", "up", "upper", "bottom", "lower", "down", "vertical", "horizontal", "interior" and "exterior" and the like are intended to be construed in their normal meaning in relation with normal installation of the product, with indication of normal orientation of the components being provided on FIGS. 1-2.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature.

Referring now to the drawings, and more particularly to FIGS. 1-2 and 45-48, there is depicted a combination of a tractor 100 and a semi-trailer 110 designed to be hauled by the tractor 100. The semi-trailer 110 features at least one axle distant from the rotatable hauling attachment 105 linking the semi-trailer 110 to the tractor 100.

Figure 10:
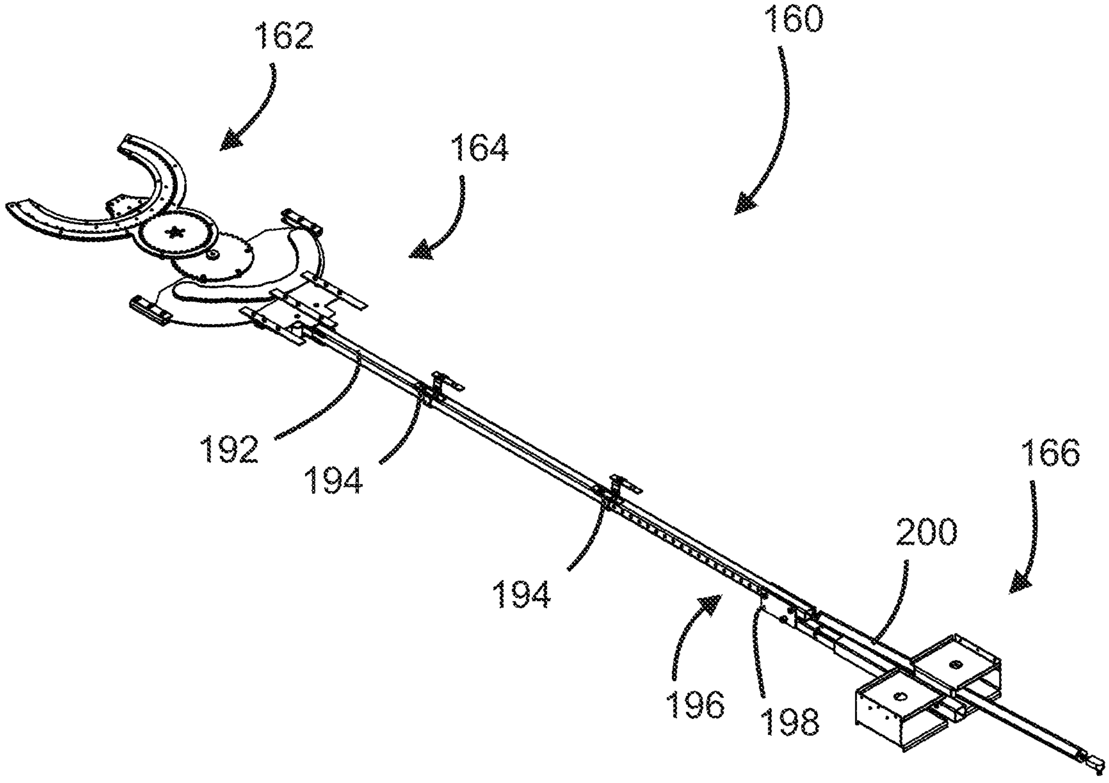
FIG. 10 is a perspective view of a mechanical steer driving system in accordance with an embodiment.

The axles of the semi-trailer 110 are operated with a wheel steering system 115 comprising a front mechanical steer driving assembly 160, FIG. 10, that steers the trailer-axle mounted wheels according to the misalignment of the semi-trailer 110 relative to the tractor 100 that results in an optimum radius of steering for each of the wheels of the tractor 100 that is function of the exact misalignment, i.e., relative angle, thereof and of e.g., the position of each of the wheels of the semi-trailer 110 relative to the hauling attachment 105. Accordingly, based on the angle resulting in the hauling attachment linking them, the wheels of the semi-trailer 110, hereinafter steered wheels, are steered to ease the hauling of the semi-trailer 110 as to provide other advantages as is discussed hereinafter.

It is worth mentioning herein that nowadays most semi-trailers feature non-steerable wheels having disadvantages over steered wheels semi-trailers 110. Even thus the straight axle of non-steerable wheels provides some stability, non-steerable wheels cause a substantial level of ripping (i.e., the tires being in some degree pulled sideways instead or in combination with the tires rolling on the ground), which causes substantial wear to the wheel bearings, the tires, and the ground surface on which ripping occurs. Furthermore, a tractor 100 hauling a non-steerable wheels semi-trailer must adopt a larger radius of curvature compared to semi-trailers equipped with steered wheels since the non-steerable wheels semi-trailer marry to a lesser degree the path of the tractor 100. It results, in urban conditions, in the non-steerable wheels semi-trailer frequently rolling on sidewalks and the driver bring obligated to drive the tractor 100 such that it rolls over multiple driveways 1- to limit the path of the non-steerable wheels semi-trailer to remain in the driveway, and 2- to try to prevent the non-steerable wheels semi-trailer to hit obstacles such as buildings and road signposts, thereby obstructing substantially the vehicles circulation. All of these factors are incentives toward the use of steered wheels semi-semi-trailers 110 that have a greater efficacy in urban conditions and therethrough improving the efficiency of deliveries through lower requirements to place the steered wheels semi-semi-trailers 110 in the desired location for delivery, a shorter time period necessary to move the steered wheels semi-trailers 110 to the delivery location, and a broader range of locations reachable with the steered wheels semi-trailers 110 compared to non-steerable wheels semi-trailers.

Associated advantage of the use of steered wheels semi-trailers 110 further comprises lowering the hauling power required to haul the tractor-semi-trailer combination at substantial hauling angles between the tractor 100 and the steered wheels semi-trailer 110. With non-steerable wheels trailers, the required power increases along with an increase of the hauling angle. At the contrary, the present semi-trailer 110 with steered wheels require almost none to no additional power to haul the tractor-semi-trailer combination at an important hauling angle since the wheels remain in the rolling configuration instead of entering in a ripping configuration. In other words, the hauling power required remains substantially the same regardless of the hauling angle.

Furthermore, use of steered wheels semi-trailers 110 decreases substantially the risks of the semi-trailer overturning with the hauling angle increasing compared to non-steerable wheels semi-trailers.

Furthermore, according to embodiment, the maximum steering angles with steered wheels semi-trailers may be set to adopt at least 25 degrees, at least 30 degrees, at least 35 degrees, at least 40 degrees and even up to 45 degrees without the steering of the wheels generating instability, tire rubbing over the structure of the semi-trailer, tire ripping, or any other non-discussed disadvantages.

Furthermore, the ripping and the undesired passages over sidewalks and other low obstacles frequently occurring with non-steerable wheels semi-trailers exert efforts to the structure of non-steerable wheels semi-trailers. Such efforts, since generating e.g., premature wear, must be considered at the design time. In practice, with nowadays non-steerable wheels semi-trailers, additional attention must be set to respond to the side forces and the effect of these side forces. To respond to these potential efforts, the design of semi-trailers featuring non-steerable wheels anticipates these conditions with a more robust structure.

Due to the decrease in lateral forces, the life of the semi-trailer structure can be lengthened through a decrease in fatigue in the materials which can create long-term cracks.

Accordingly, the present steered wheels semi-trailer 110 featuring steered wheels mitigates these problems with wheels mounted to an axle steered in a linked manner with the left wheel and the right wheel being adapted to adopt their own steering angle set according to the specific configuration of the semi-trailer 110, namely, e.g., the distance between the axle and the hauling attachment 105, the wheelbase, etc. Accordingly, the present steered wheels semi-trailer 110 furthermore minimizes to substantially none the ripping of wheels occurring at all hauling angles since the wheels of both sides are configured to adopt the precise required steering angle. Furthermore, the present steered wheels semi-trailer 110 is adapted to set steering angles of a plurality of axles featuring steered wheels in a linked manner while steering the wheels of the axles to different angles based on, e.g., the distance between the hauling attachment and each of the axles.

Accordingly, the present wheel steering system 115 may be adapted to a plurality of semi-trailer designs that feature different characteristic, comprising a different number of axles, different distances between the axles, different transversal distance between the wheels mounted to the same axle, and the numbers of semi-trailers interconnected in a semi-trailer-train configuration.

Furthermore, the present wheel steering system 115 provides flexibility through the steering wheel system 115 allowing the operator to select an operating configuration among a) a straight wheels configuration, b) a steered wheels configuration in automatic mode and c) a manual correction mode at low speed. It also provides a level of security unattained until now through a mechanical solution resulting, in case of component failure, into the wheel steering system 115 returning automatically and autonomously into the straight wheel configuration. Therethrough, it prevents instability that could potentially occur, e.g., if the steering system 115 did not prevent the direction of the steered wheels of the semi-trailer and the steering direction from adopting incompatible values following failure of a component.

It is operable, and thus provides flexibility, in both forward operations and backward operations.

It is therethrough contemplated the options that different embodiments of the present steering system 115 may feature one or more, up to all, of the advantages listed hereinbefore.

Referring now to FIGS. 1, and 3-7 is depicted an angular encoder system 120 for a hauling assembly 125. The angular encoder system 120 is adapted to register the angle of at the steering direction interface 350 located at the hauling attachment 105, and more precisely angle that adopts the kingpin 102 relative to the hauling saddle 128 as the semi-trailer 110 hauls and steers the steered wheels semi-trailer 110. The angular encoder system 120 comprises a kingpin clinging assembly 130 adapted to cling to the downward face 424, perpendicular to the axis of the kingpin 102 depicted on FIG. 48, and to rotate with the kingpin 102 of the semi-trailer as it pivots into the hauling saddle 128.

The kingpin clinging assembly 130 comprises components extending through the base plate 132, thus having reading-related and communicating components above the base plate 132 and other components below the base plate 132, in a more protected configuration. The kingpin clinging assembly 130 comprises a gearbelt pulley 134 located under the base plate 132 that exerts the movements of the kingpin 102 to an angular encoder 138 through a timing belt 136. An encoder connector 137, connected to the angular encoder 138, is mounted on the top of the base plate 132 for easy connection thereto.

The angular encoder system 120 further comprises a disengaging means 122 that allows to controllably disengage (i.e., break magnetic clinging) of the kingpin clinging assembly 130 over the kingpin 102 when about to disengage the hauling assembly 125 linking the semi-trailer 110 to the tractor 100.

The kingpin clinging assembly 130 comprises a compressible assembly 150 to which is connected a cable 140 secured into a sheath 142. The disengaging means 122 comprises a cable 140 that, when pulled, forces compression of the compressible assembly 150, and thereby disengages the magnetic top 144 of the compressible assembly 150 from the kingpin 102. Since the sheath 142 is fixed at one end 146 to the interfacing piece 148 on which is at least partially mounted the kingpin clinging assembly 130, and that the cable 140 is traveling freely into the sheath 142, attached at one extremity to the magnetic top 144, by pulling the cable 140, the magnetic top 144 is pulled downward and disengaged from the kingpin 102.

The compressible assembly 150 comprises the magnetic top 144, an intermediary portion 145, a spring 152, and a base 154, wherein the spring 152 is secured on top to the magnetic top 144 and at its base to the base 154, therefore able to transmit rotation of the magnetic top 144 to the base 154. As the base 154 pivots, the connected gearbelt pulley 134 located under the base plate 132 also pivots. The rotation is transmitted through the timing belt 136 to the angular encoder 138. Signals from the angular encoder 138 may be communicated to appropriate systems, such as e.g., a display control (not depicted) located in the cabin of the tractor 100.

Preferably, the cable 140 is connected at the extremity opposed to the compressible assembly 150 to the saddle release handle 156 (part of the disengaging means 122) designed to release the kingpin 102 from the hauling saddle 128. Though this connection, the kingpin clinging assembly 130 is always disengaged from the kingpin 102 when the kingpin 102 can be disengaged from the saddle 128, preventing breaking of the kingpin clinging assembly 130 at the dismounting step and avoiding the operator to perform an additional action when disengaging the kingpin 102.

Figure 9:
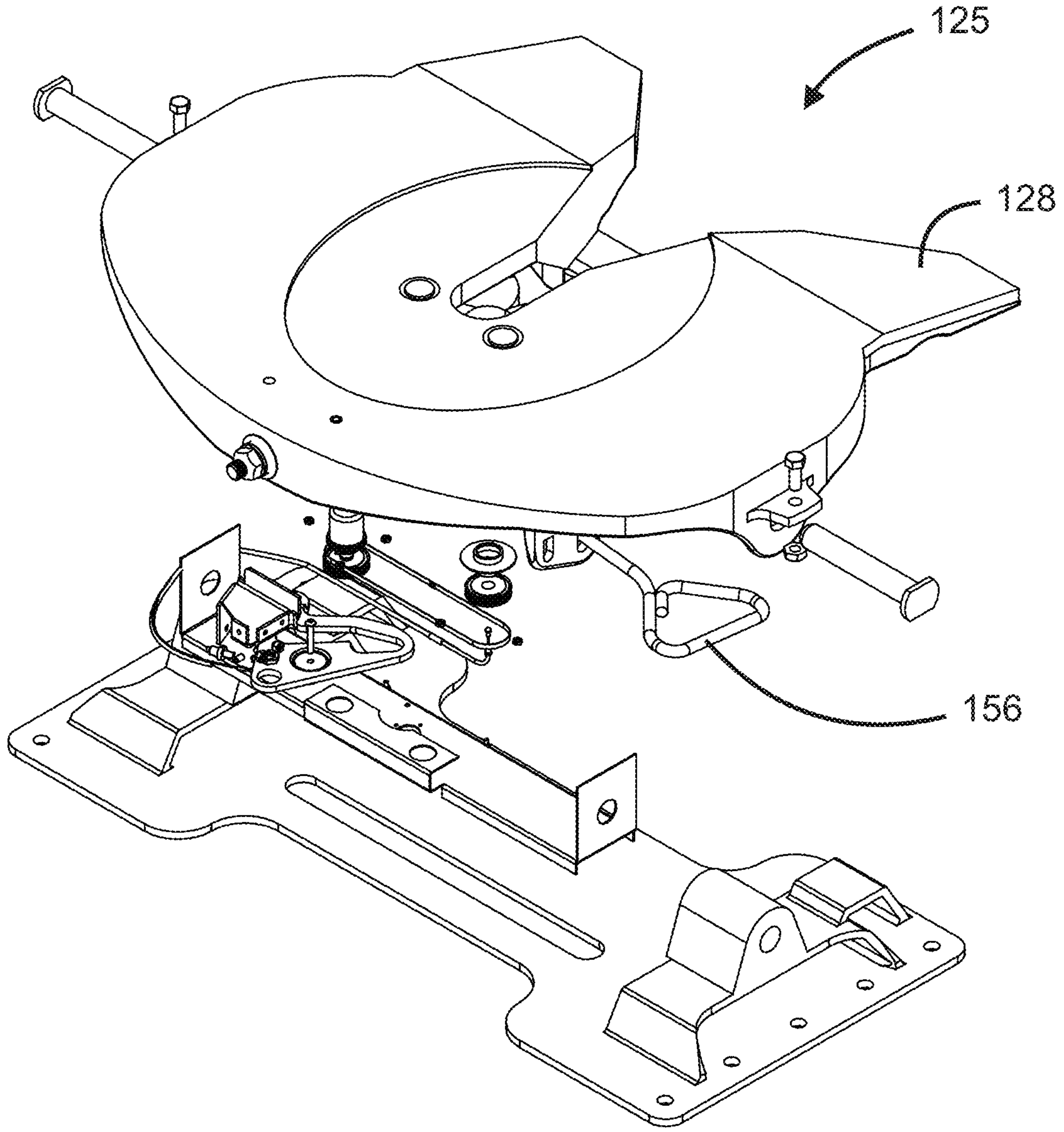
FIG. 9 is an exploded perspective view of the angle sensor system mounted to a tractor (with only saddle mounting components depicted) and the saddle mounted on top of FIG. 8.

It is therethrough contemplated that the angular encoder system 120 is adapted to be mounted to existing hauling saddles 128 without modification of existing hauling saddles 128. As depicted on FIG. 9, the angular encoder system 120 is adapted to be mounted thereunder, taking advantage of existing mounting components to be mounted to the semi-trailer 110.

Referring now additionally to FIGS. 82 to 87, an angular encoder system 121 in accordance with another embodiment comprises an interfacing top 644 featuring a substantially linear protrusion 646 comprising a rounded front 648, inwardly curved sides 650, and a straight end 662. The protrusion 646 is adapted to interface and set in a settling component 652 fixedly mounted to the bottom of the kingpin 102, The settling component 652 comprises a bottom face 656 featuring a channel 654 having a funnel-shaped front portion 658 and a linear-shaped portion 660 beyond the front portion 658. The interfacing top 644, indirectly connected to the angular encoder 138 (not identified on FIGS. 82 to 87, see e.g., FIG. 4), is adapted to follow rotation exerted through misalignment of the tractor 100 and semi-trailer 110 relative to each other. The interfacing of the protrusion 646 and of the channel 654 allows them to engage and disengage easily as the hauling saddle 128 and the kingpin 102 make contact and are released from each other. A biasing means, typically a spring (not shown) is connected to the interfacing top 644 so that when the interfacing top 644 and the kingpin 102 are disengaged, the interfacing top 644 automatically returns to an aligned position, aka a direction parallel to the longitudinal orientation of the tractor 100, easing next engagement of the protrusion 646 in the channel 654.

Figure 56:
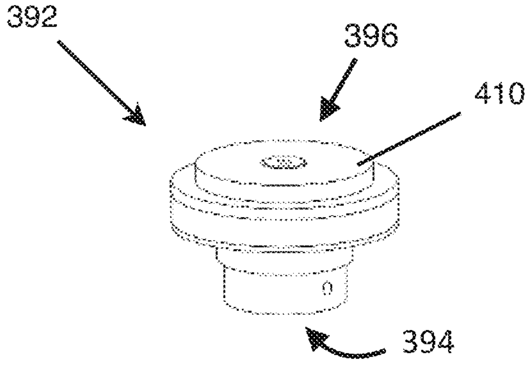
FIG. 56 is a perspective view of a clinging component in accordance with an embodiment.
Figure 57:
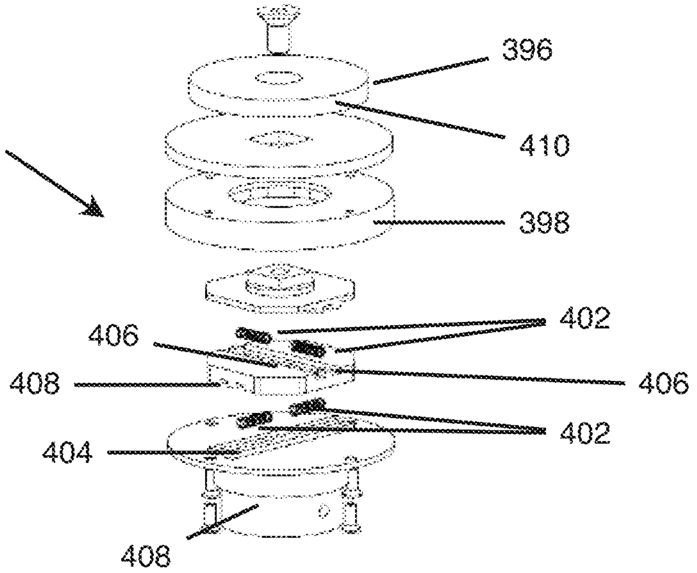
FIG. 57 is an exploded view of the clinging component of FIG. 56.
Figure 58:
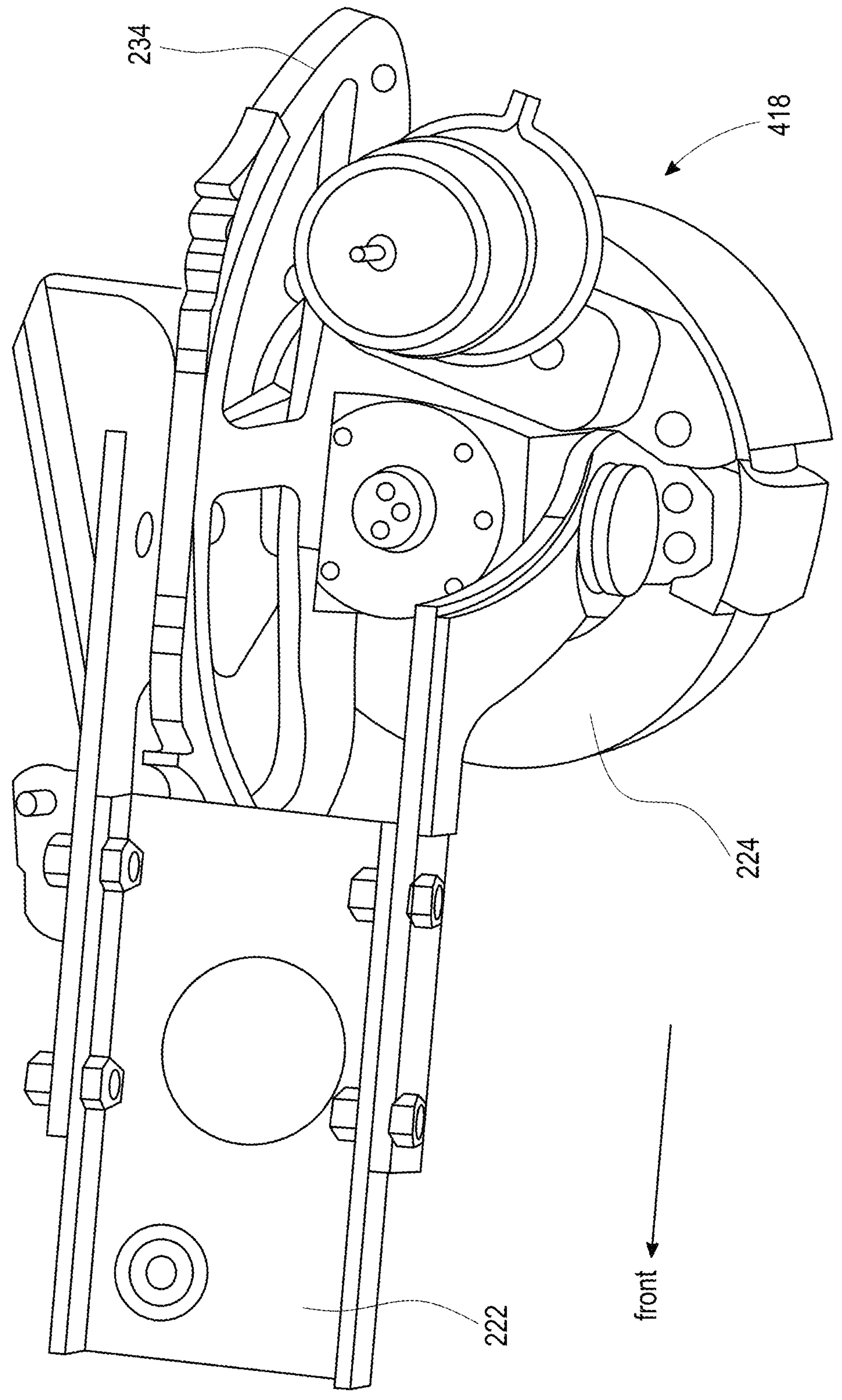
FIG. 58 is a perspective view from the center line of a trailer of a portion of a steering axle showing a cogged piece, the wheel mounted thereto with break-related components, and a portion of a beam.

Referring additionally to FIGS. 56-57, the clinging component 392 is the component adapted to cling to the kingpin face (see FIG. 48) facing down in the hauling saddle 128. The clinging component 392 comprises a base 394, a top 396, and at least one biasing means 402, e.g., springs, biasing the top toward alignment with the base. The springs 402 are mounted in pair operating in opposed directions. Two pairs are operating in distinct directions misaligned of e.g., 90 degrees relative to each other for each pair of springs 402 being able to undergo movement of the kingpin 102 and to bias the clinging component 392 toward its center. Springs 402 are set in guiding means 404 that limit linear displacement of in the general direction of the springs 402. Abutments 406 limit linear displacement of the springs 402 in the first direction, interaction between the abutment 406 and a compressed spring (spring 402 not illustrated in its compressed state in the drawings) exerting a force toward moving the above portion toward the center. Accordingly, an intermediary plate 408 comprising two faces is dividing and interfacing with the two pair of springs 402. Thereby, the intermediary plate 408 is adapted to undergo displacements along the direction of the bottom springs and of the top springs without exerting rotation to the base. It is worth mentioning that the intermediary plate 408 is rigidly connected to a clinging piece 410. It is also worth mentioning that the first pair of springs 402, the second pair of springs 402 and the intermediary plate 408 are encapsulated between the base 394 and a cover 398, thereby the clinging component 392 featuring a clinging piece 410 adapted to move along the kingpin 102 extending distant to the base 394.

Figure 8:
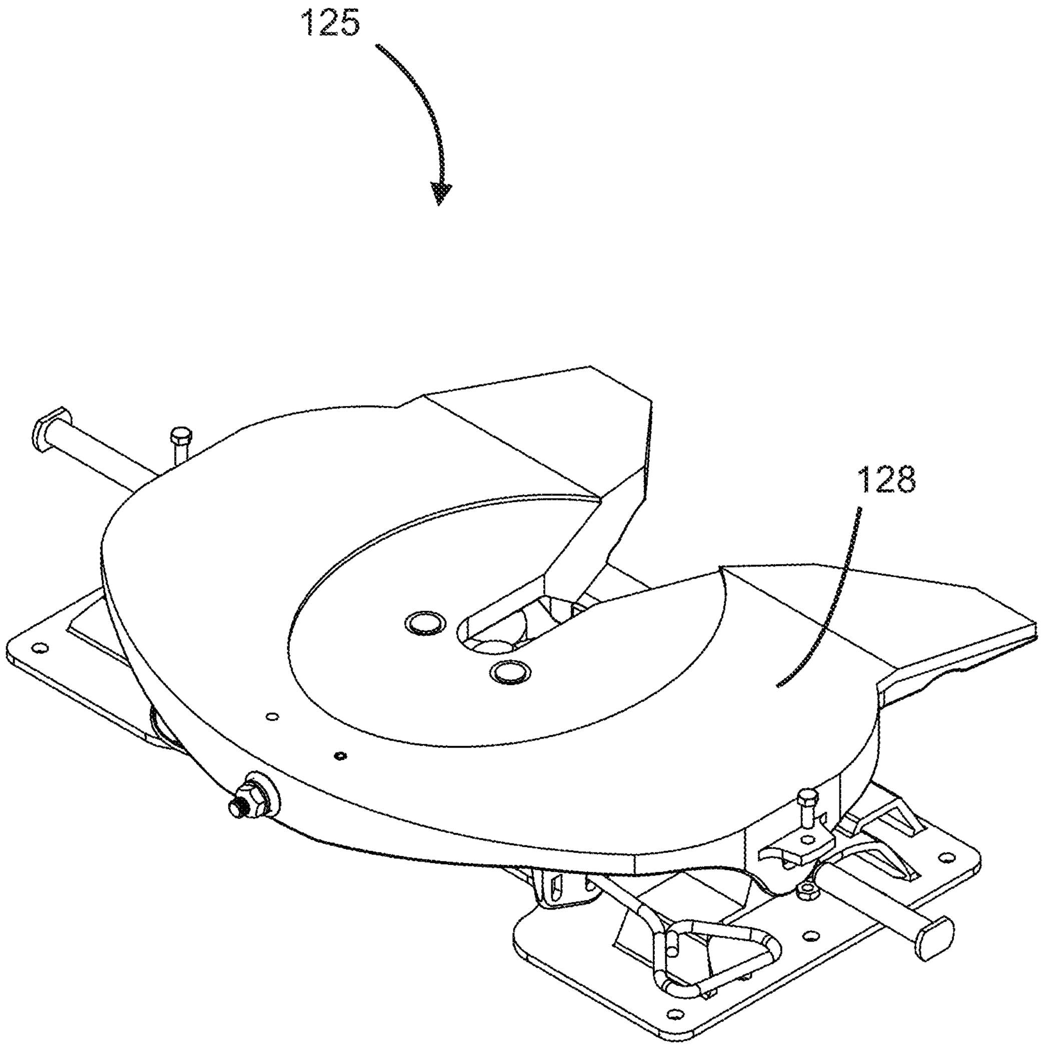
FIG. 8 is a perspective view of the angle sensor system mounted to a tractor (with only saddle mounting components depicted) and a saddle mounted on top.

Referring now to FIGS. 1, and 10-17, the semi-trailer 110 comprises a front mechanical steer driving assembly 160 that is adapted to connect to the hauling saddle 128 (see FIGS. 8-9) at the time the kingpin 102 is engaged in the hauling saddle 128 to define the hauling assembly 125 (see FIG. 8). The front mechanical steer driving assembly 160 comprises a rotation reading mechanism 162, an angular translation mechanism 164 and a steering transmission mechanism 166 connected to each other.

Figure 12:
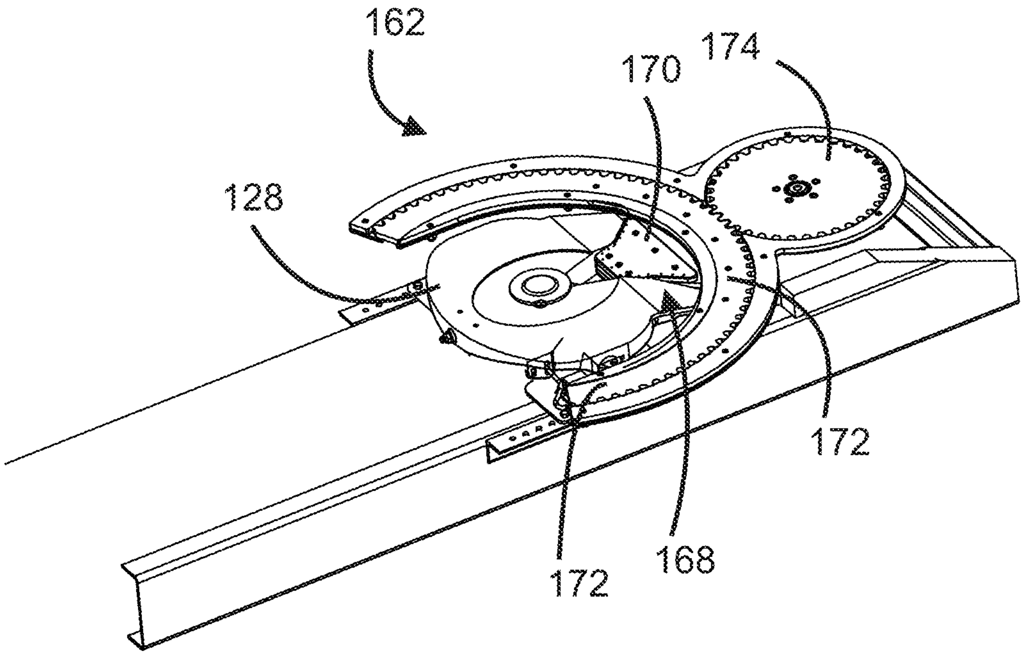
FIG. 12 Is a perspective view of the rotation reading mechanism of the mechanical steer driving system of FIG. 10, wherein the rotation reading mechanism is depicted mounted to a saddle of a tractor with a portion of the chassis of the tractor depicted.
Figure 13:
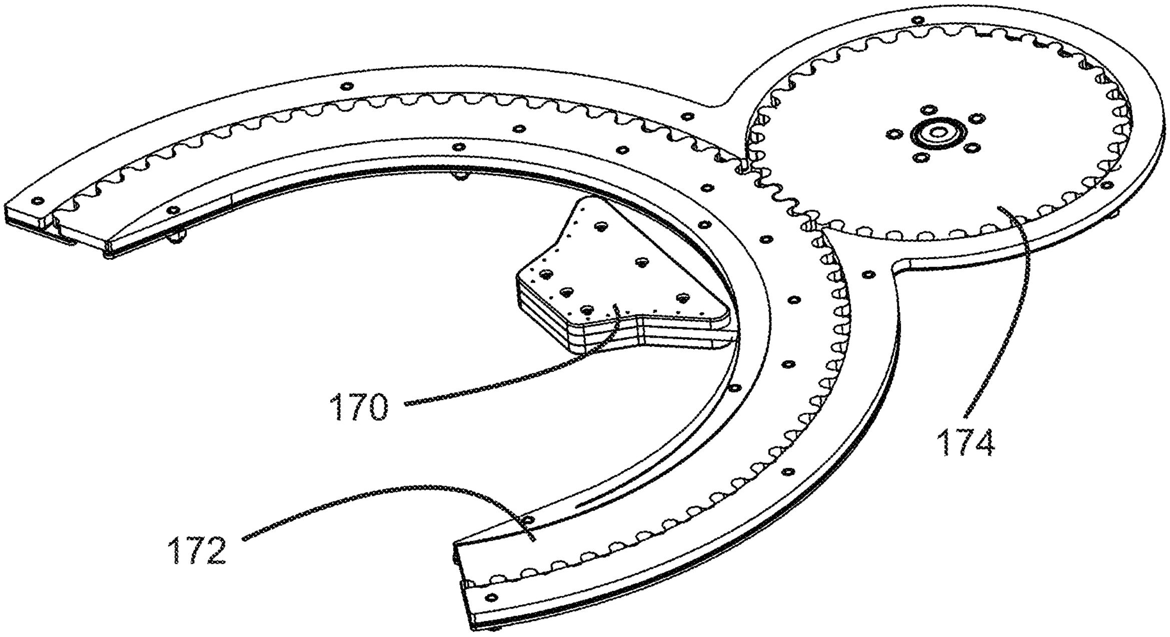
FIG. 13 is a perspective view of a portion of the rotation reading mechanism of FIG. 12.
Figure 14:
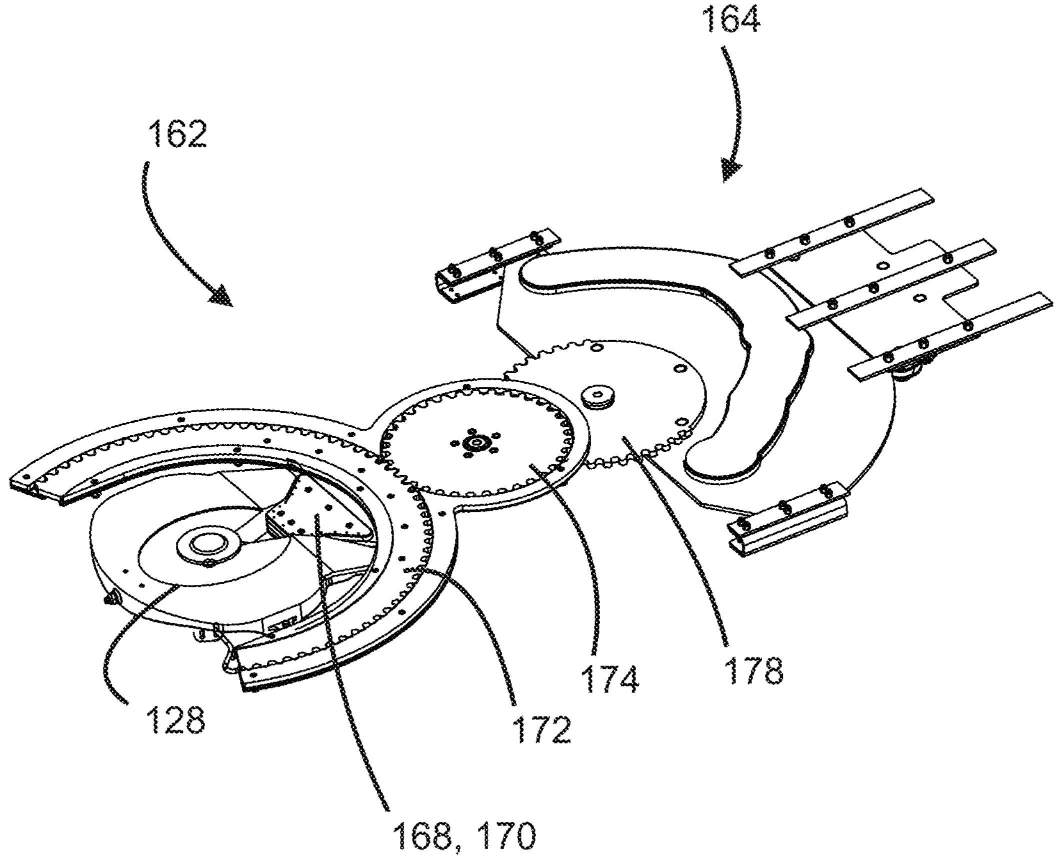
FIGS. 14-15 are a partially exploded perspective view of the rotation reading mechanism and a portion of the angular translation mechanism of the mechanical steer driving system of FIG. 10.
Figure 15:
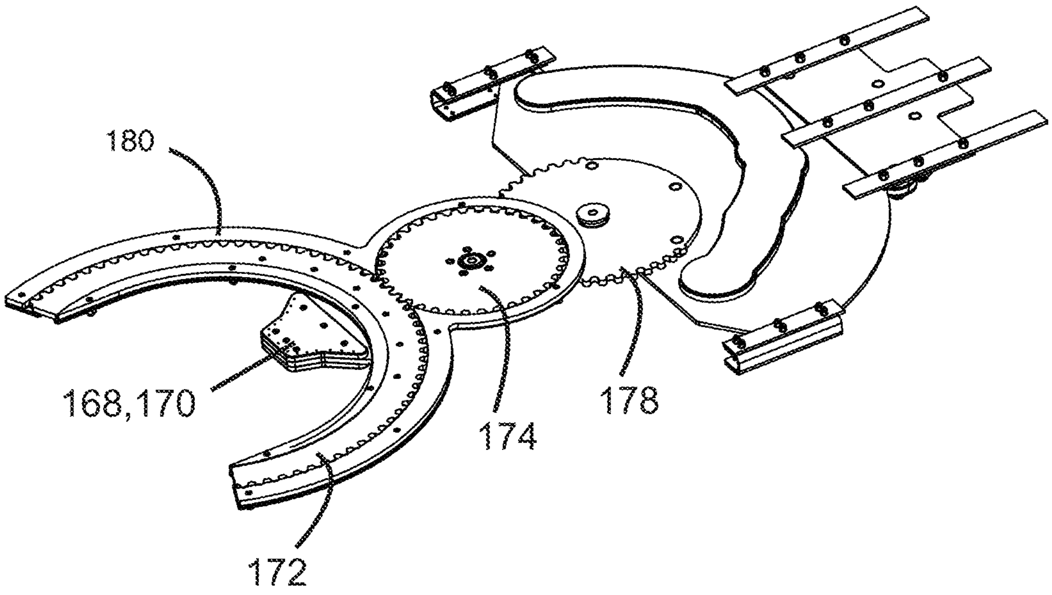

Referring particularly to FIGS. 1 and 12, the rotation reading mechanism 162 is adapted to have a fix component 168 marrying the funnel portion 170 of the hauling saddle 128 when engaging the kingpin 102 in the hauling saddle 128.

Preferably, the fix component 168 has a V-shape (or other functional shape of projection) that is wedged in the funnel portion 170 as the kingpin 102 is engaged in the hauling saddle 128. The sides of the fix component 168, abutting the sides of the funnel portion 170, ensures transmission of any rotation of the tractor 100 relative to the semi-trailer 110.

The funnel portion 170 is rigidly connected to an arch-shaped cog railway 172 wrapping around the operating angles of the hauling assembly 125. A first gear 174 rotatably mounted to the general structure of the front mechanical steer driving assembly 160, is adapted to pivot when the angle between the tractor 100 and the semi-trailer 110 changes. The first gear 174 is rigidly connected to a second gear 176 mounted on the opposed side, FIG. 16. The second gear 176 for its part drives the third gear 178 rotatably mounted to the structure. Accordingly, the teeth ratio between the pair of cog railway-cog and cogs provided a first transmission ratio of the rotation angle between the tractor 100 and the semi-trailer 110. That ratio allows to translate an above 180-degrees rotation into a less than 90-degrees rotation for the reasons better explained hereinafter. Accordingly, this assembly may be understood as a series of interconnected gears comprising a terminal gear connected to a cogged piece part of, mounted to or fixedly linked otherwise to the angular translation mechanism.

Figure 18:
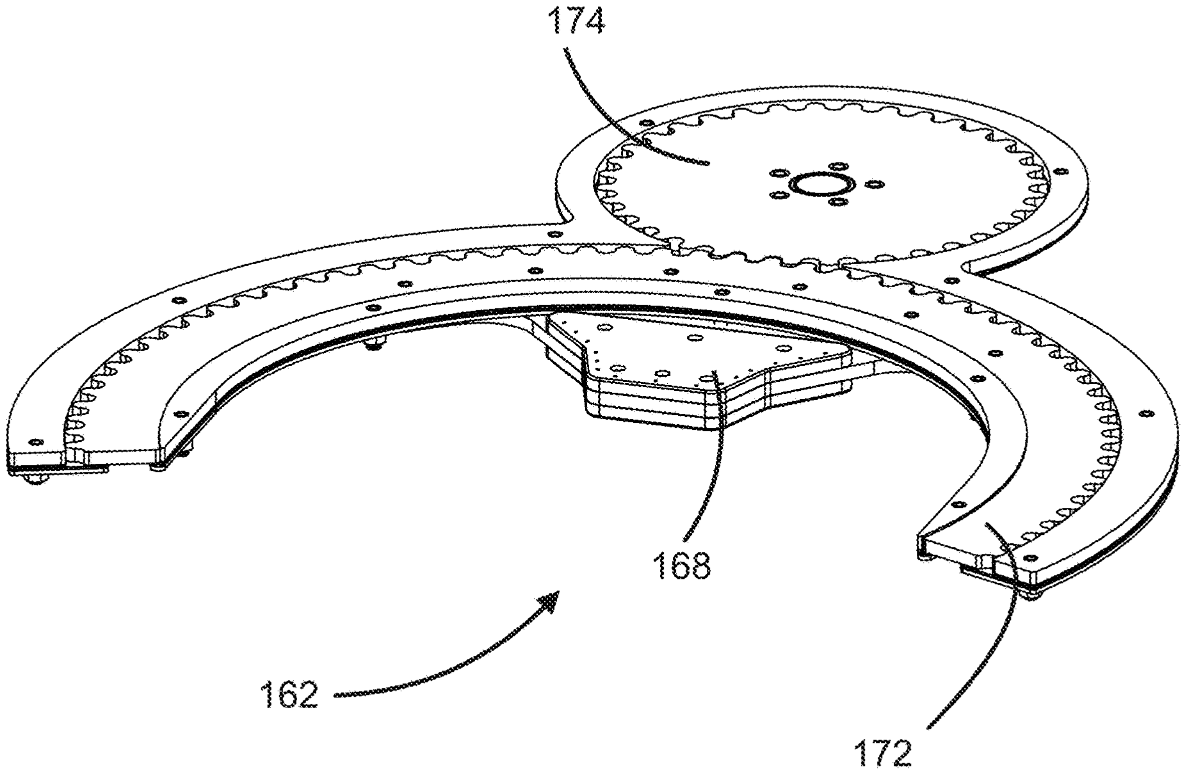
FIG. 18 is a perspective view from the front of a portion of the rotation reading mechanism comprising the fix portion and the interface between the arch-shaped cog railway and the first cog.
Figure 19:
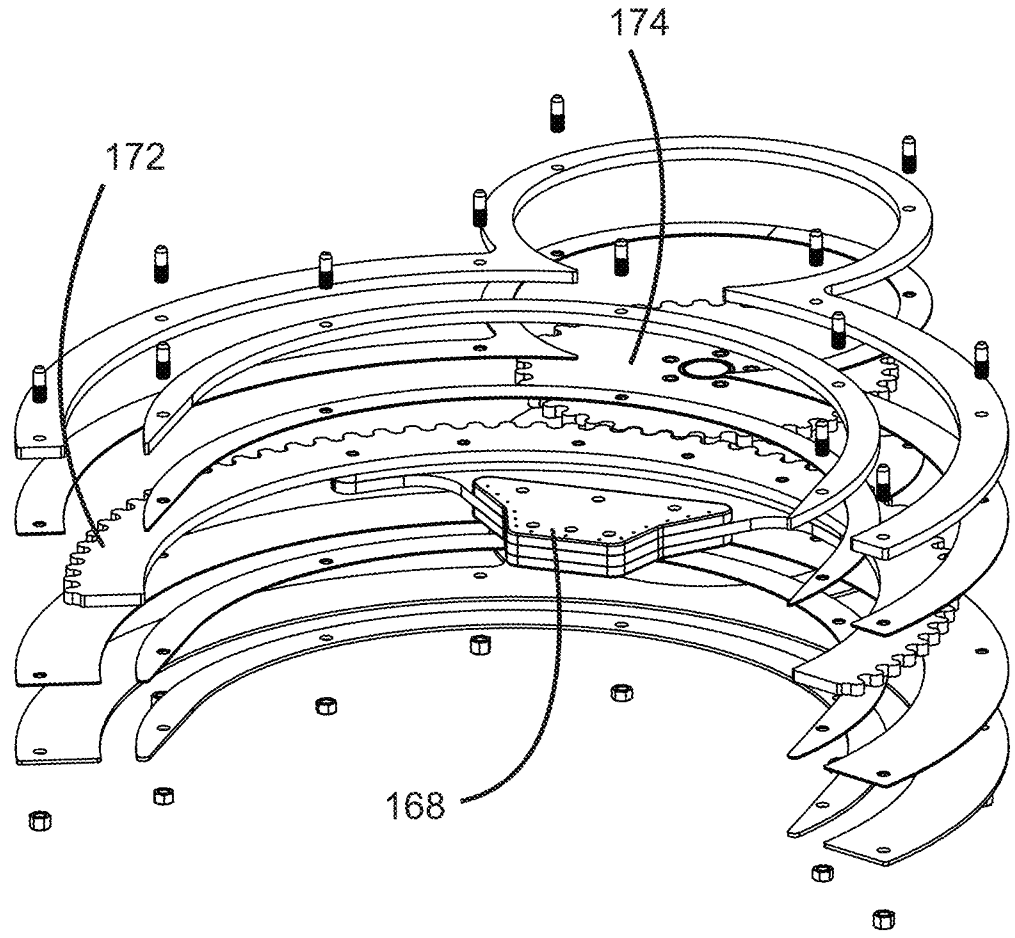
FIGS. 19-20 are exploded perspective views of the components of FIG. 18.
Figure 20:
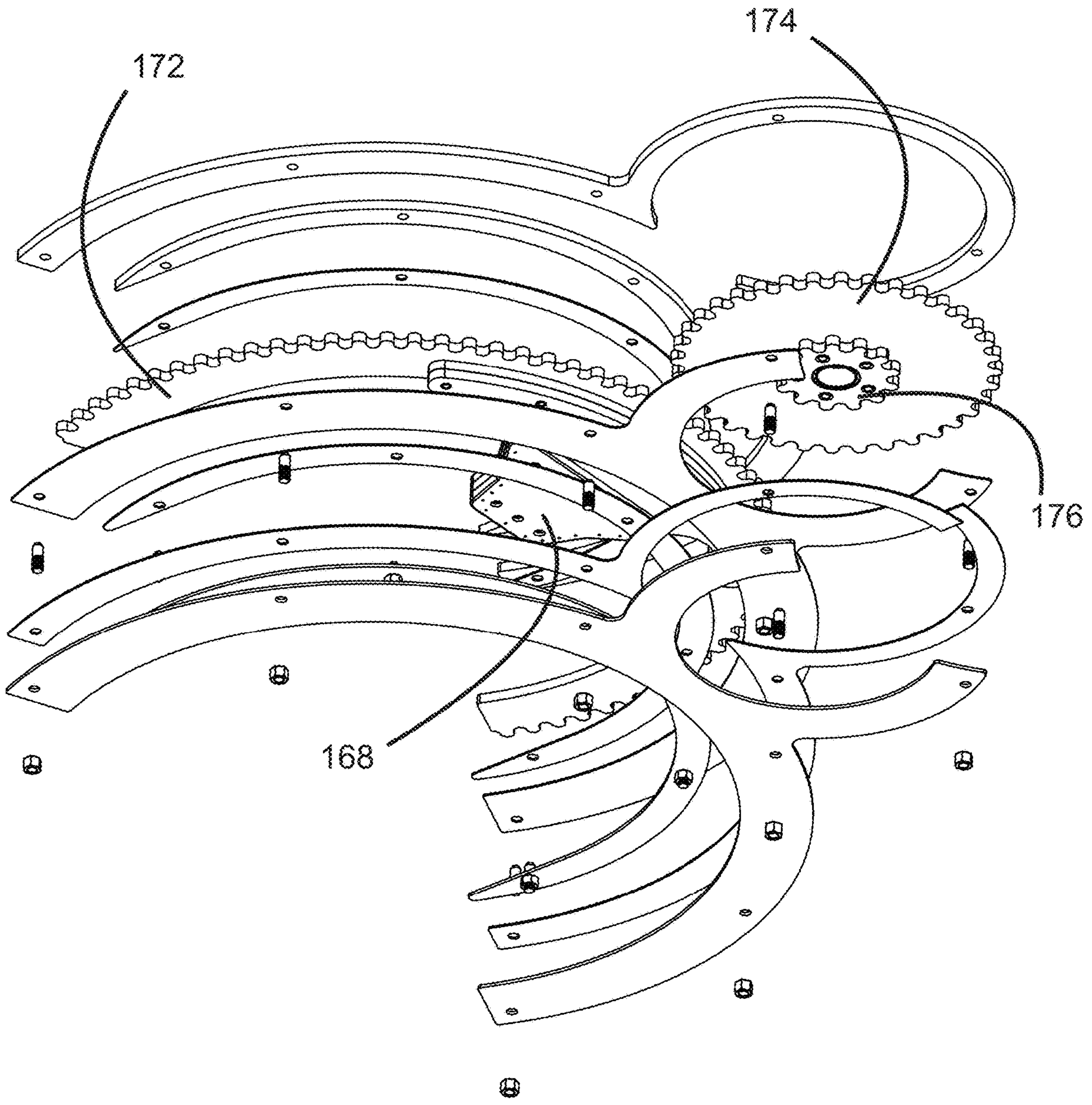
Figure 21:
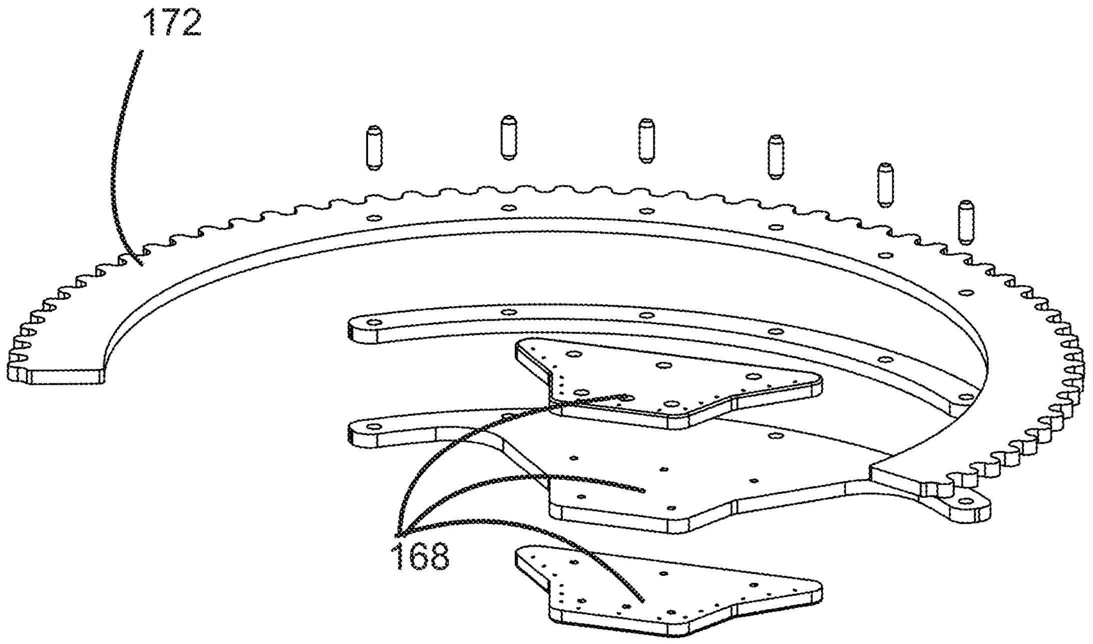
FIG. 21 is an exploded perspective view of the junction of the fix portion with the arch-shaped cog railway according to the components depicted on FIG. 18.

It is contemplated therethrough that the rotation reading mechanism 162, FIG. 18, has a generally flat shape adapted to be mounted to the semi-trailer 110, rear to the kingpin 102, without creating obstruction preventing standard kingpins 102, aka kingpins 102 used nowadays on non-steerable wheels semi-trailers, to be used. The described rotation reading mechanism 162 takes advantage of the existing clearance and of existing structures (see ex. FIG. 12) to avoid replacement of existing components of a tractor 100 to retrofit the semi-trailer into a steered wheels semi-trailer 110.

Referring now to FIGS. 1 and 18-23, the rigid mounting of the cog railway 172 and of the fix component 168 is illustrated through a series of plates and fixtures.

The first gear 174, rotatably mounted to the structure provided by the plates that when mounted to each other define an enclosure for the first gear 174, is forced to pivot when the angle between the tractor 100 and the semi-trailer 110 changes. Therethrough, relative angle between the semi-trailer 110 and the tractor 100 is transmitted to the second gear 174.

Figure 23:
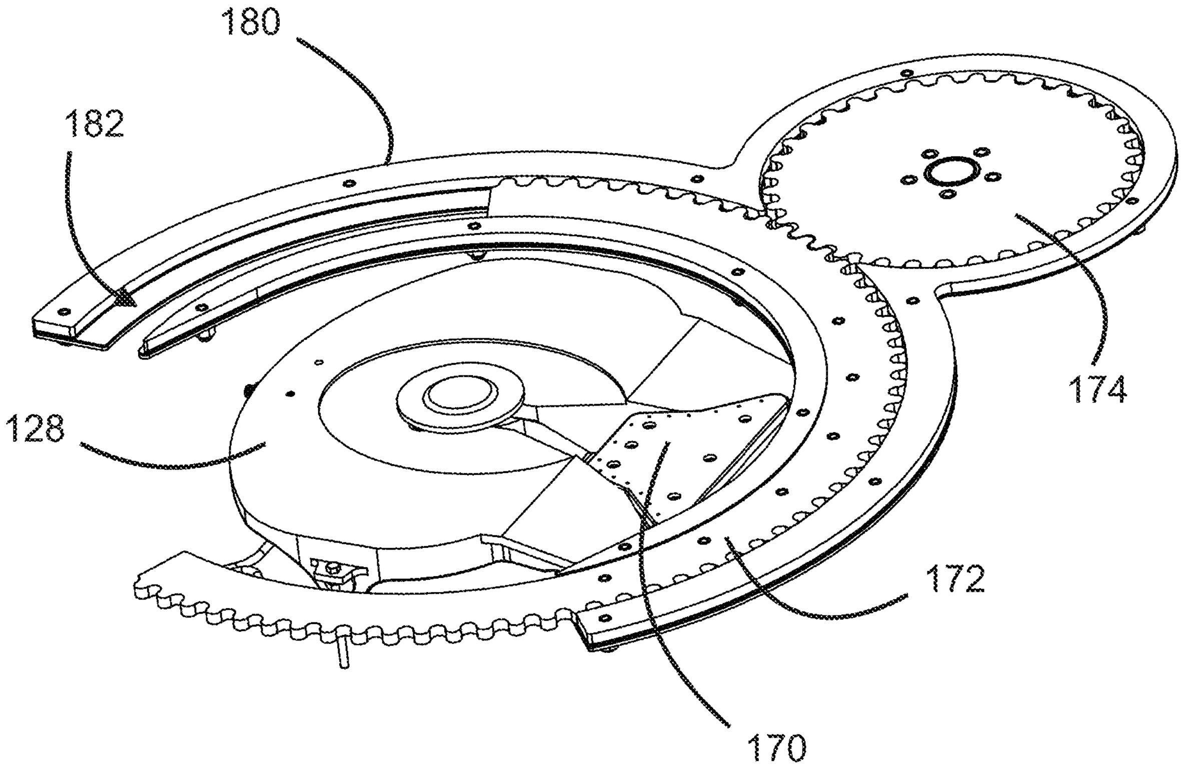
FIG. 23 is a perspective view of the components of FIG. 18 and the hauling saddle depicting relative positions when the angle between the tractor and the trailer is close to 90 degrees.

Referring particularly to FIG. 23, it is worth mentioning that as the relative angle between the semi-trailer 110 and the tractor 100 changes, the arch-shaped cog railway 172 moves relative to its housing 180, the housing 180 being connected, and preferably an extension of the general structure of the front mechanical steer driving assembly 160. An open-ended arch-shaped slot 182 provides the clearance for the arch-shaped cog railway 172 to travel in both directions.

It is thereby contemplated that the generally flat design of the housing 180 allows the housing 180 to travel in the clearance existing opposed to the semi-trailer 110, aka between the hauling saddle 128 and the cabin of the tractor 100, thanks to the elevated nature of the hauling saddle 128 relative to the chassis of the tractor 100. The general flat shape of the housing 180 also allows the housing 180 to travel without interfering to the release handle 156, FIG. 9.

Figure 22:
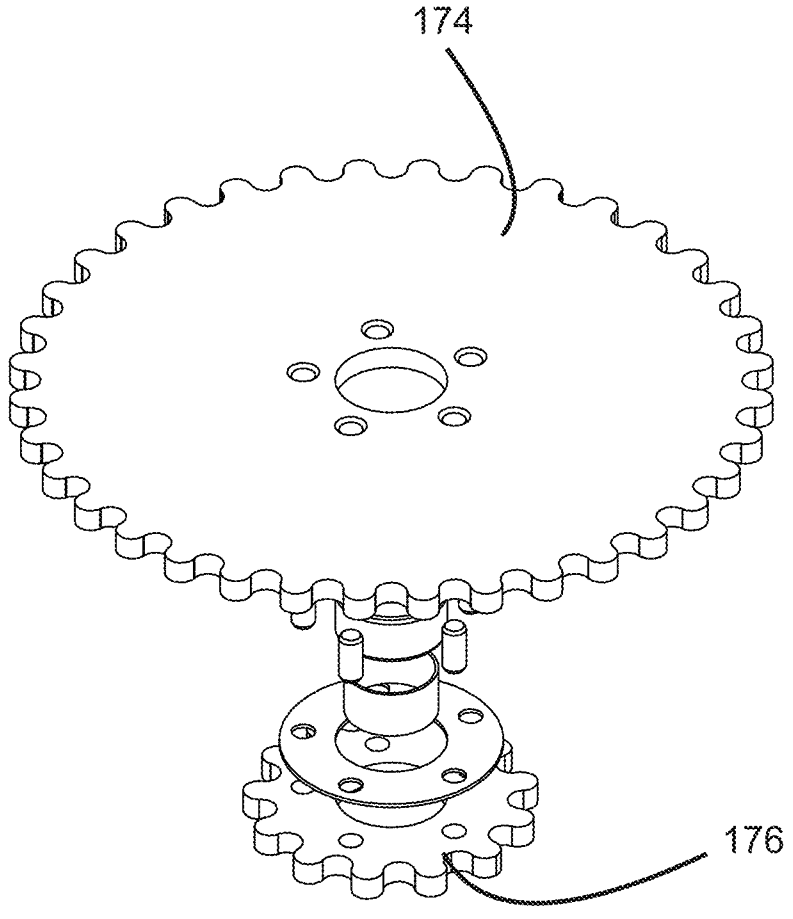
FIG. 22 is an exploded perspective view of the junction of the first cog with the second cog according to the components depicted on FIG. 18.

FIG. 22 depicts that the rigid mounting of the first gear 174 to the second gear 176. According to the embodiment, the gears 174, 176 are maintained in an enclosure rather than rotatably mounted to a common axle.

According to an embodiment, the floor (not identified) of the semi-trailer 110 (see FIG. 1) forms part of the enclosure containing the gears 174, 176.

Referring to FIGS. 1, 10-11, 17, the third gear 178 is mounted to the cam 184 with the rotation of the cam 184 translating angular change between the tractor 100 and the semi-trailer 110 into a linear displacement of the steering transmission mechanism 166. The steering transmission mechanism 166 and the cam 184 are joined through a guided pin 188 travelling in a slot 190 as the cam 184 rotates.

Since the slot 190 is not of an arch-shaped sharing it center of curvature with the rotatable axis of the third gear 178, rotation of the third gear 178 translate into a linear movement of the guided pin 188.

The slot 190 has a particular shape. It is worth mentioning that the slot 190 has a particular shape around the 0 degree to communicate no steering to the semi-trailer when the tractor turn angle is less than 5 degrees. Such solution is applied to avoid some swaying that may result from the steering of the wheels of the semi-trailer on highways and other similar conditions. It further provides a solution to desensitize the angle communication between the front part and the rear part, since, based on the nature of the fixation of longitudinally settable wheel assembly(ies) to the structure of the semi-trailer (further discussed hereinafter), such fixation may generate errors that need to be damped off to prevent instability.

It is worth noting that the cooperation of the cam 184, the slot 190 and the pin 188 undergo low resistance. The other end of the front mechanical steer driving assembly 160 is configured to register linear movements without exerting strong resistance.

In an alternative realization, function is performed through a linear displacement instead of an angular displacement provided by the cam 184, to obtain the same displacement as the arm member 192. According to an embodiment (not depicted), the linear displacement involves an input gear, a toothed rail interfacing with the gear, and a slotted component connected to the distant end of the tooted rail, with the shape of the slot allowing to control the resulting displacement, e.g., no displacement with a change of angle of less than 5 degrees around the aligned position, a proportional displacement afterwards until reaching a limit angle, and a null displacement with higher degree of misalignment in order to prevent mechanical failures that could occur with very high steering angles.

The steering transmission mechanism 166 comprises a first arm member 192 connected through the guided pin 188 to the angular translation mechanism 164, and a second arm member 200 adapted to communicate, through its linear movement, angle changes between the tractor 100 and the semi-trailer 110.

The first arm member 192 is mounted to the underbelly 112, below the floor, of the semi-trailer 110 using supports 194, the latter fixedly mounted to the semi-trailer 110 while allowing frontward-backward movement of the first arm member 192.

Close to its rear extremity, the first arm member 192 features a series of adjustment holes (not visible on the drawings) allowing to adjust the length of the steering transmission mechanism 166 according to the trailer configuration. e.g., according to the specific distance of the first axle relative to the kingpin 102. A coupling 198, attached to the front section of the second arm member 200, is adapted to connect the first arm member 192 to the second arm member 200. By selecting which adjustment holes to use, the operator sets the length of the steering transmission mechanism 166.

Referring to FIGS. 47-48 and 50-55, semi-trailers are usually equipped with a movable bogie 302 on which axle(s) and wheels are mounted, wherein the bogie 302 is movable frontward or rearward for optimization based on the weight and distribution of the weight to be loaded on the semi-trailer. Accordingly, distance between the kingpin 102 and the steered wheel hub assemblies 224, FIGS. 25-31, mounted to the bogie 302 must be easily adjustable.

Figure 50:
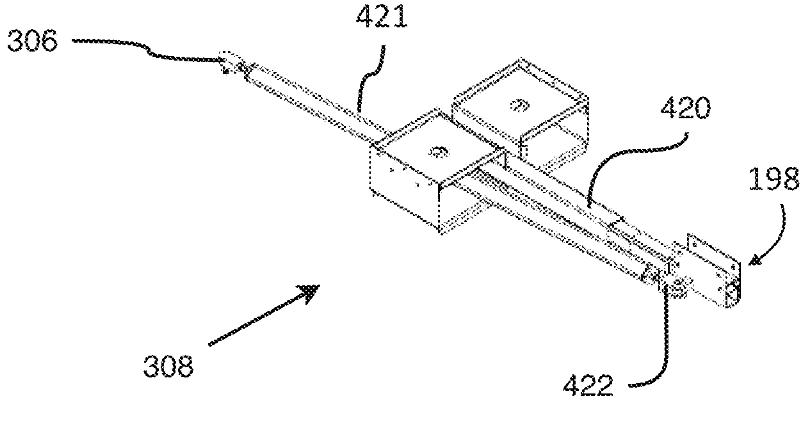
FIG. 50 is a perspective view of a rear mechanical steering driving assembly in accordance with an embodiment.
Figure 52:
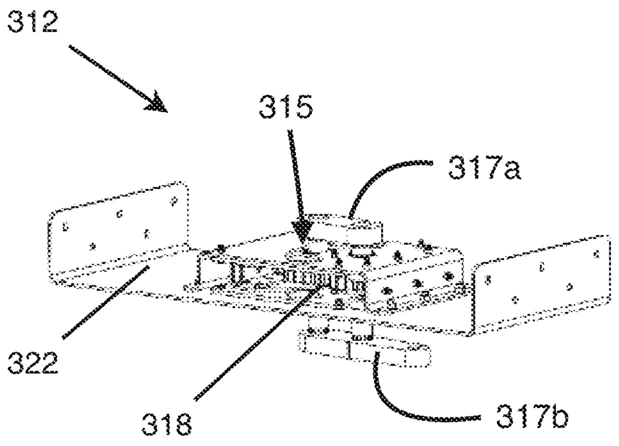
FIGS. 52 and 53 are respectively a perspective view and an exploded perspective view of the trailer-mounted translation assembly of the rear mechanical steering driving assembly of FIG. 50.
Figure 53:
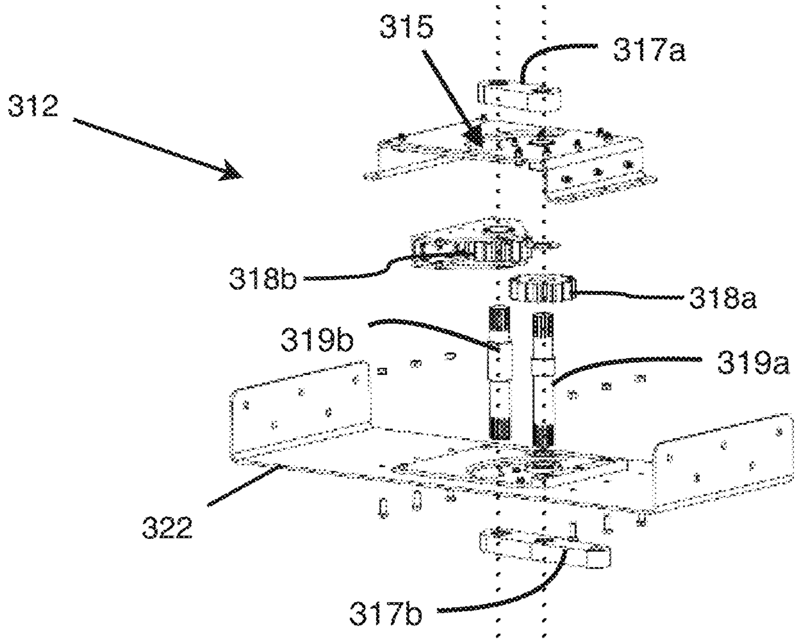

The present steer driving assembly 160 includes a mechanical steering drive assembly whose rear mechanism 308, FIG. 50, makes it possible to move the bogie 302 under the semi-trailer 110. The arm 196 is connected to the coupling 198 by bolting. The end of the arm 422 is connected to the coupling 198 which consists of a tube which moves longitudinally relative to the component 420. The other end of the arm 421, named extremity 306, is connected to the group of rear axles of the semi-trailer 110. Given the presence of mechanical play between the mechanical bogie 302 and the point of attachment to the structure of the semi-trailer 110, a rigid link connects them.

Figure 59:
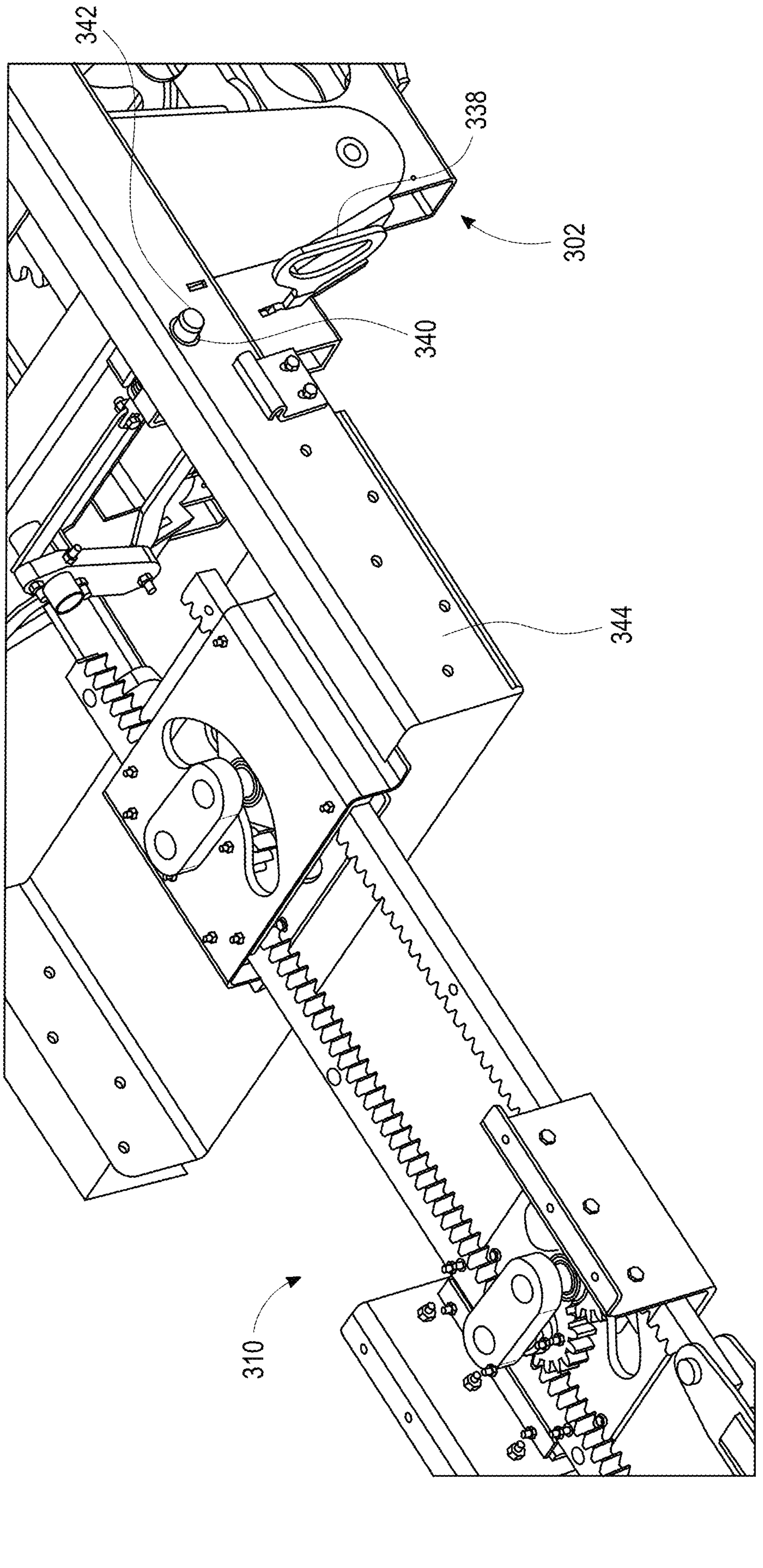
FIGS. 59, 60 and 61 are respectively an elevated 45-degrees perspective view from the front, a 10-degrees elevated 15-degrees perspective view from the front, and a bottom perspective view all depicting a portion of a rear-mechanical steering driving assembly connected to a steering axle mounted to a movable bogie in accordance with an embodiment.
Figure 60:
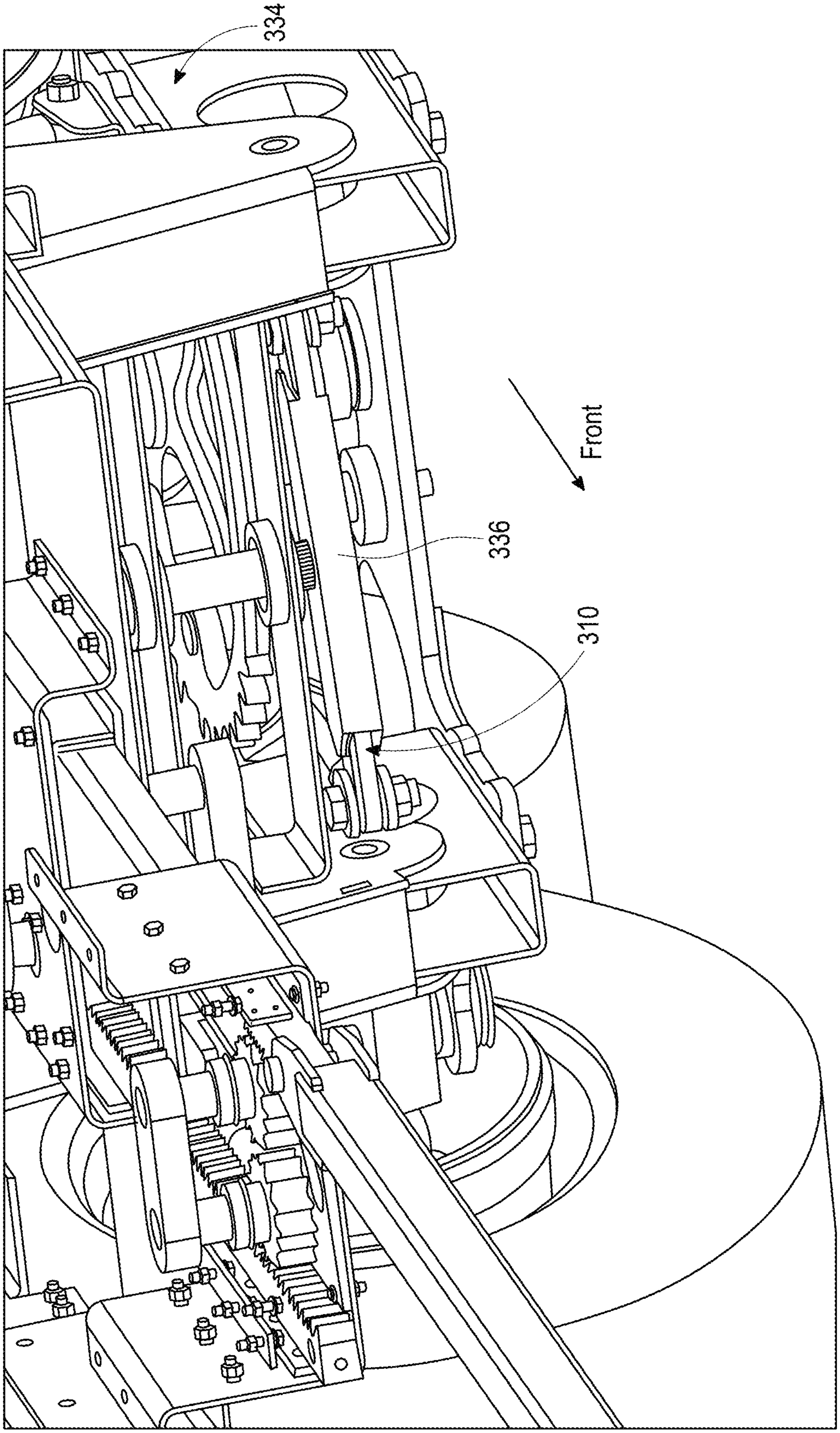
Figure 61:
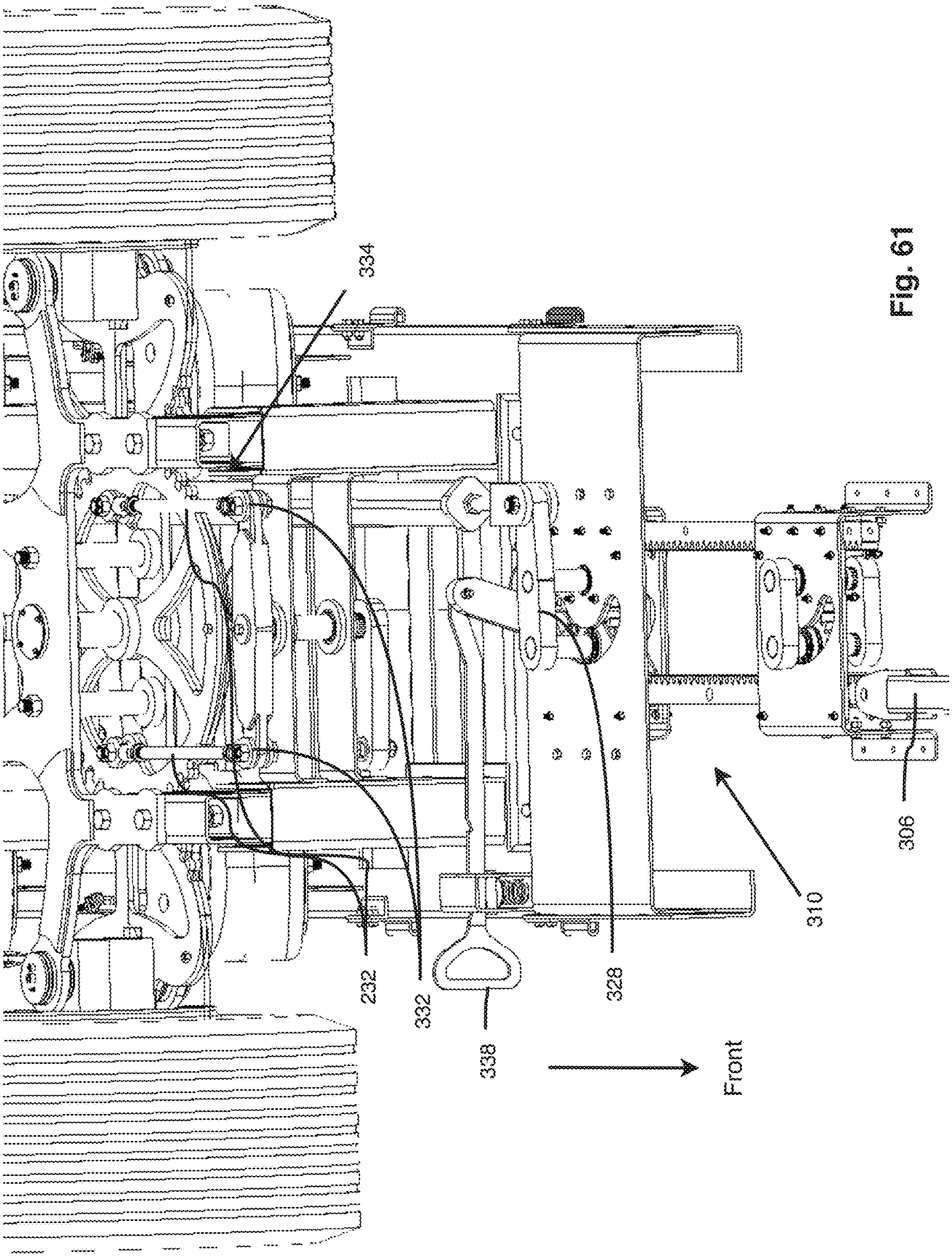

In FIG. 59, in addition to FIGS. 51 to 55, is depicted the mechanism 310 which makes it possible to relocate, aka move and lock, the bogie 302 under the semi-trailer 110 while maintaining the set steering. The arm 196, connected to the steer driving assembly 160 frontward and thereby being driven as the tractor 100 and the semi-trailer 110 turn relative to each other, is connected to the front end of the mechanism 310. The rear end of the mechanism 310 is connected to and drives the steering axle 334 through the rotatable arm 336. A first portion of the mechanism 310, namely the fix assembly 320, is mounted under the semi-trailer 110 to its underbelly 304, and it thus fix. A second portion of the mechanism 310, namely the bogie-mounted assembly 312, is mounted to the bogie 302 and is thus mobile relative to the fix assembly 320. The mechanism 310 comprises cog rails 314, 316 which connect to the fix assembly 320 to the bogie-mounted assembly 312 without needing to exert a change in the driven direction of the steering axle 334.

Since the bogie 302 can move, the bogie-mounted assembly 312 moves with it. Thus, the steer driving assembly 160 becomes more flexible to the effects of movements of the bogie 302 under the semi-trailer 110. The end 306 of the arm 421 connects the group of axles of the bogie 302 in the same way.

Figure 54:
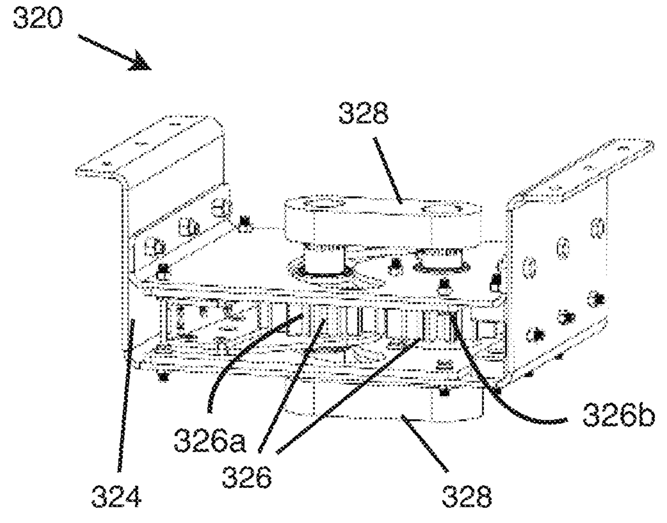
FIGS. 54 and 55 are respectively a perspective view and an exploded perspective view of the bogie-mounted translation assembly of the rear mechanical steering driving assembly of FIG. 50.
Figure 55:
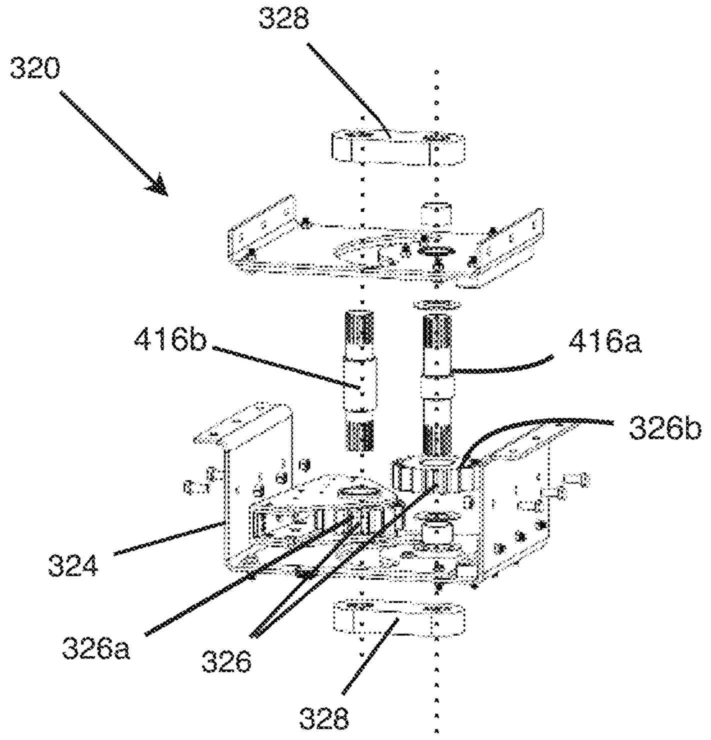

Referring particularly to FIGS. 54 and 55, the fix assembly 320 comprises a structure 324 on which are mounted a pair of gears 326, mounted on shafts 416, that are interfacing with each other and with the cog rails 314, 316. Position of a first gear 326*b* is fix, while position of second gear 326*a* is rotatable around the first gear 326*b*, with arms 328 maintaining the interface in-between. An arch-shaped slot 327 allows limited rotation of the position of the second gear 326*a*. The arm 421 is connected to the first cog rail 314, which, when the fix assembly 320 is fix, drives the second cog rail 316 driving the steering through the bogie-mounted assembly 312.

The bogie-mounted assembly 312, mounted to the bogie 302, is somewhat similar to the fix assembly 320. The bogie-mounted assembly 312 comprises a pair of gears 318*a* and 318*b* each interfacing with one of the cog rails 314, 316 and interfacing with each other so that, when the steering is not changing, a movement in the opposite direction is transmitted by a first cog rail 314 to the second cog rail 316. The bogie-mounted assembly 312 further comprises a mounting structure 322, comprising two parts providing a top and bottom enclosure to the gears 318, that is mounted to the structural bogie 302. The mounting structure 322 providing the structure to mount the bogie-mounted assembly 312 to the bogie 302, to mount the gears 318, and to provide a guide for the translation of the cog rails 314, 316. The bogie-mounted assembly 312 further comprises shafts 319 for the gears 318, arms 317 and a slot 315 allowing rotation of the second gear 319*b* around the first gear 319*a* corresponding to steering angles.

It is worth mentioning that in the fix assembly 320, the shaft 416*a* of one gear 326*a* is adapted to rotate around the other 416*b* of the other gear 326*b*, thereby exerting movement to the steering arm 317*b*, the latter connected to the steering axle 334 and thereby driving the steering axle 334.

It is also worth mentioning that the configuration of the structures 322 and 324 are preferably designed to define a room between plates for the gears and cog rails to take place. The room feature a top plate and a bottom plate providing the desired support necessary for shafts and other components, else than the arms linking the shafts of the gears. The arm 317*b* connected to the steering axle 334 is located below, so as to connect about the height of the driving arms 232. It is also worth mentioning that the rooms have openings facing each other for the cog rails 314, 316 to extend therethrough and between the rooms and beyond the rooms in the opposite sides. The rooms are depicted having no side walls facing each other, thus featuring a single large opening. In other embodiments, openings may be more limited to providing clearance for the cog rails. Shielding structures may also be present to protect the cog rails 314, 316 from dust and other foreign material.

Referring additionally to FIGS. 58, 59, 60, and 61, changing longitudinal location of the bogie 302 may therefore being easily performed with minimal efforts, i.e., without requiring the operator to get under the semi-trailer 110, dismount components, are reattach components afterward. Changing longitudinal location of the bogie 302 is performed by pulling the handle 338 which disengages a pin 340 from one of the holes 342 present in the beams 344. It is followed, under power of the tractor 100, with the pulling the semi-trailer 110 forward or rearward. Once at desired location, the handle 338 are pushed back, resulting in the pin 340 being inserted in another one of the holes 342 and thus setting the new longitudinal location of the bogie 302.

It is worth mentioning that the configuration of the mechanism 310 allows to longitudinally move the bogie 302 without changing the steering direction of the steering axle 334. The displacement of the bogie-mounted assembly 312 relative to the fix assembly 320 exerts relative displacement of the cog rails 316, 316 without exerting a rotation of the arms 317*b*, and thus without affecting the steering of steering axle 334.

It should be kept in mind that this kind of fixation of the bogie 302 relative to the underbelly 304 of the semi-trailer 110 was originally designed for non-steerable wheels. As the semi-trailer 110 is hauled, clearance in this fixation allows small longitudinal displacements of the bogie 302 that is not a problem with non-steerable wheels. The same cannot be stated for steerable wheels. If the steering system 115 was not designed to ignore small longitudinal displacements, it would result in the steerable wheel hub assemblies 224 swaying, or as a visual comparison vibrating, what could generate instability to the steering system 115. The semi-trailer 110 is designed to generate no steering force over the two driving arms 232 when small changes around the straight alignment arise between the tractor 100 and the semi-trailer 110, aka the steering direction interface 350 (see e.g., FIG. 46). The result is such that no steering of the wheels occurs. Other advantage is that noise over the rear mechanical steering driving mechanism 310 is also damped the same way. Bogie-generated noise resulting from the undesired displacement of the bogie 302, is damped in the same way.

Figure 11:
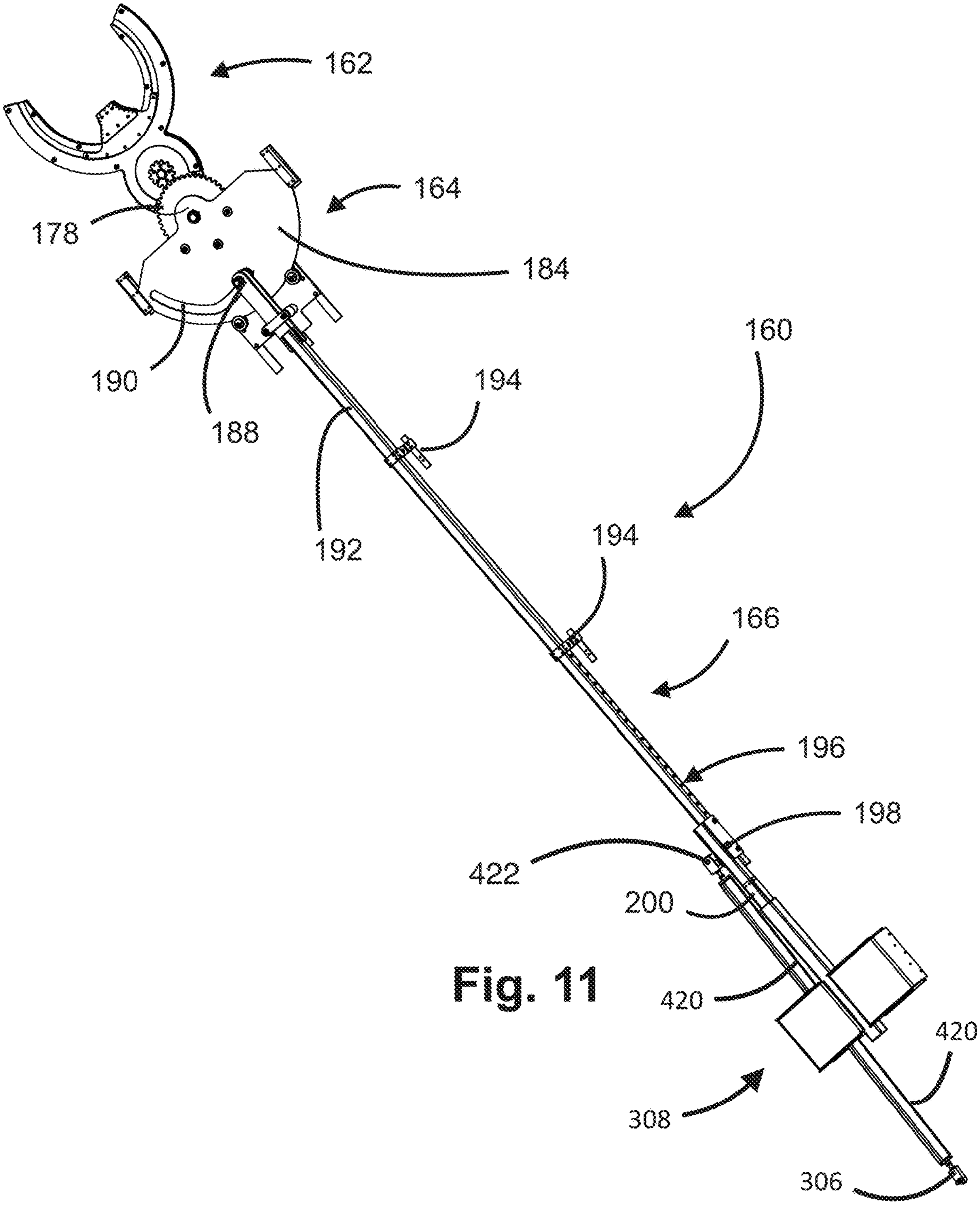
FIG. 11 is a bottom view of the mechanical steer driving system of FIG. 10.
Figure 64:
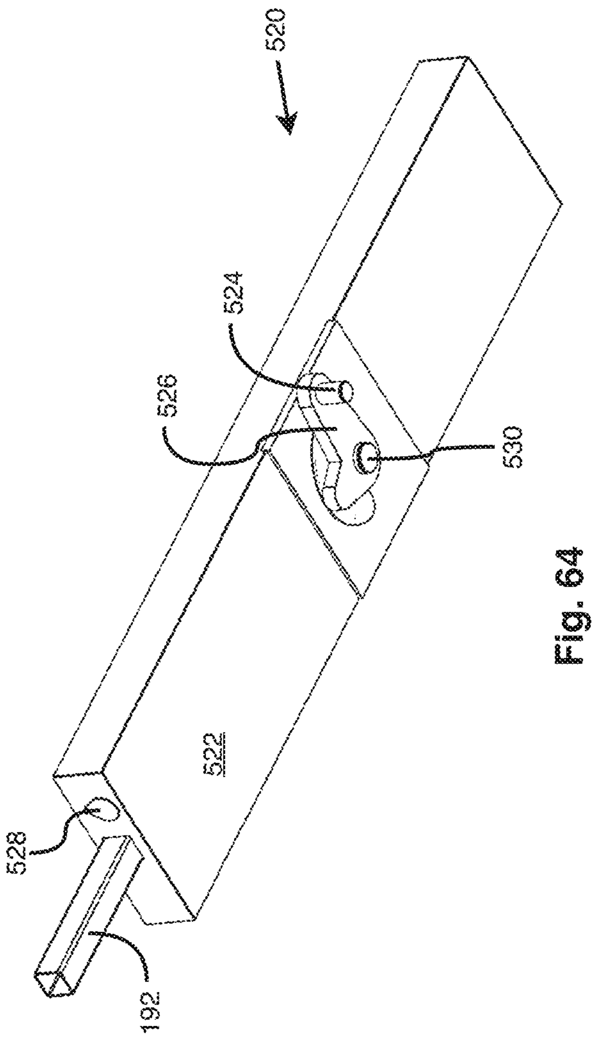
FIGS. 64 and 65 are respectively a front bottom perspective view and a front top perspective view of a steering converter in accordance with an embodiment.
Figure 65:
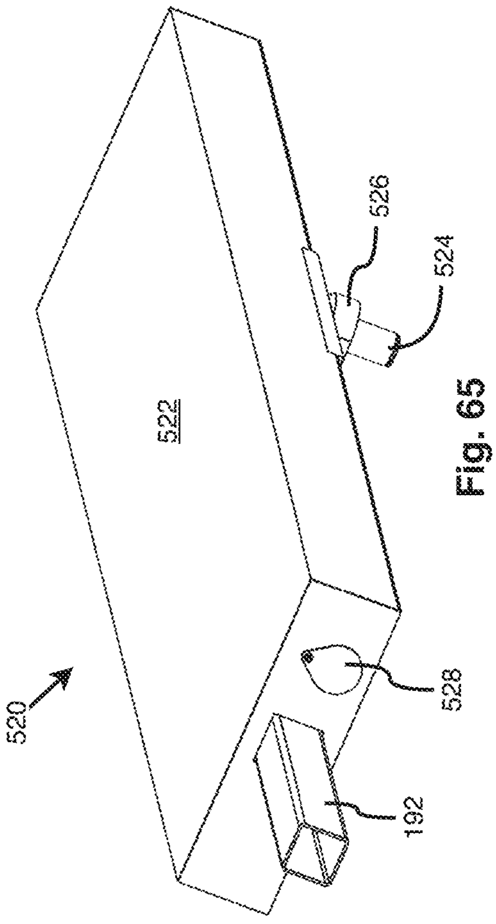
Figure 66:
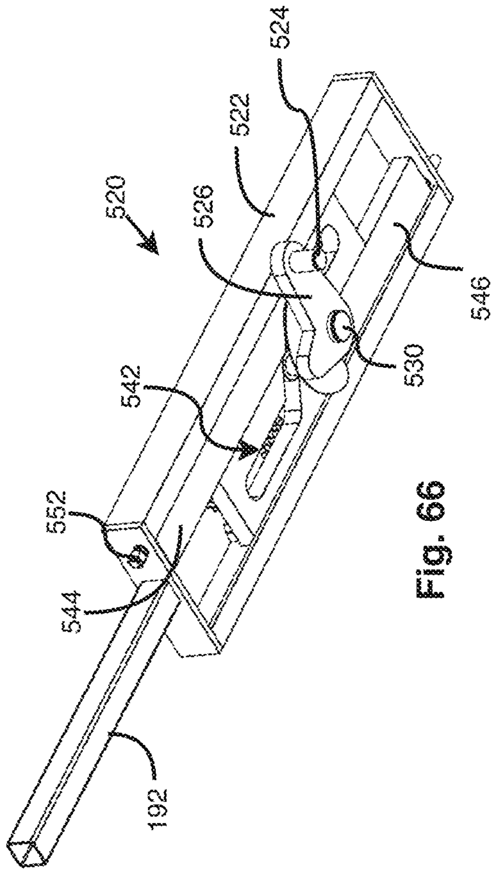
FIGS. 66 and 67 are respectively a bottom perspective view and a bottom plane view of the steering converter of FIGS. 64 and 65 with cover plates removed.
Figure 67:
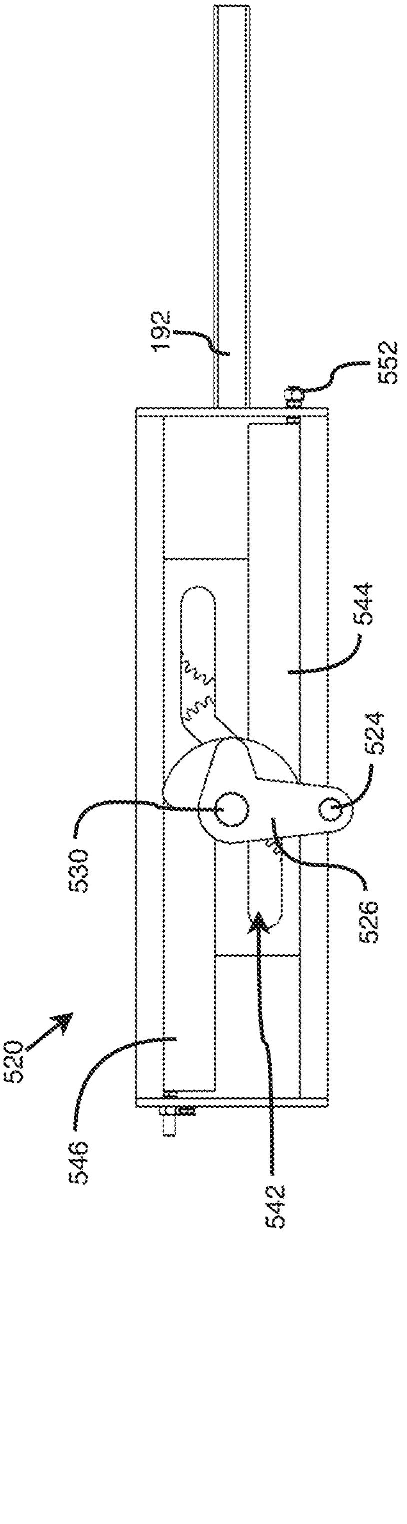
Figure 68A:
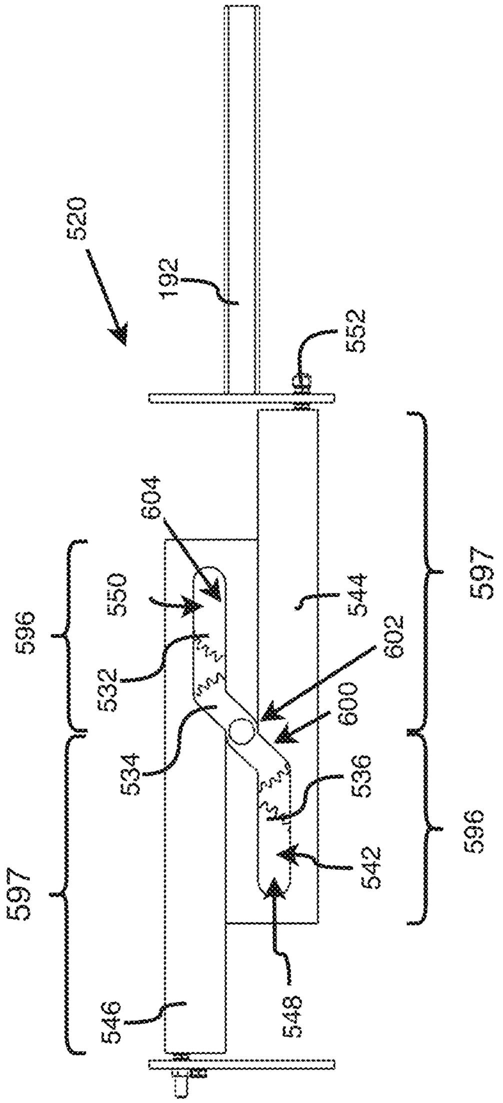
FIG. 68A is a bottom plane view of the steering converter of FIGS. 64 and 65 with all covers, and steering transmission components removed.
Figure 68B:
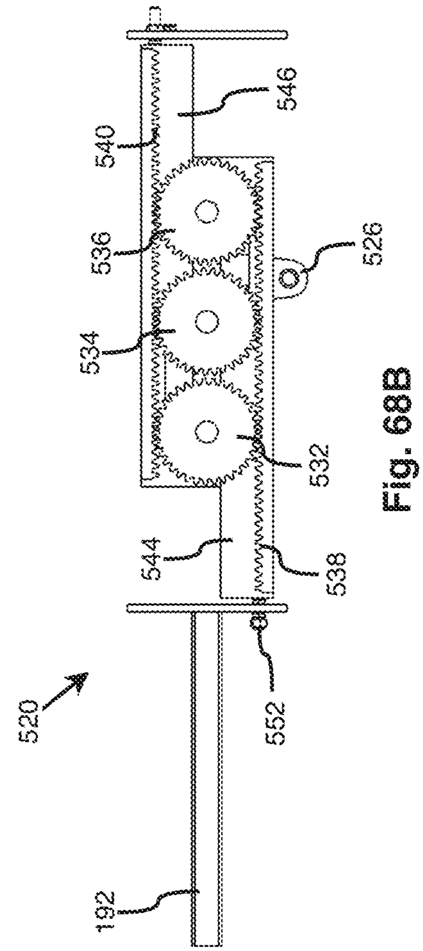
FIG. 68B is a top plane view of the remaining components of the steering converter depicted on FIG. 68A.
Figure 69A:
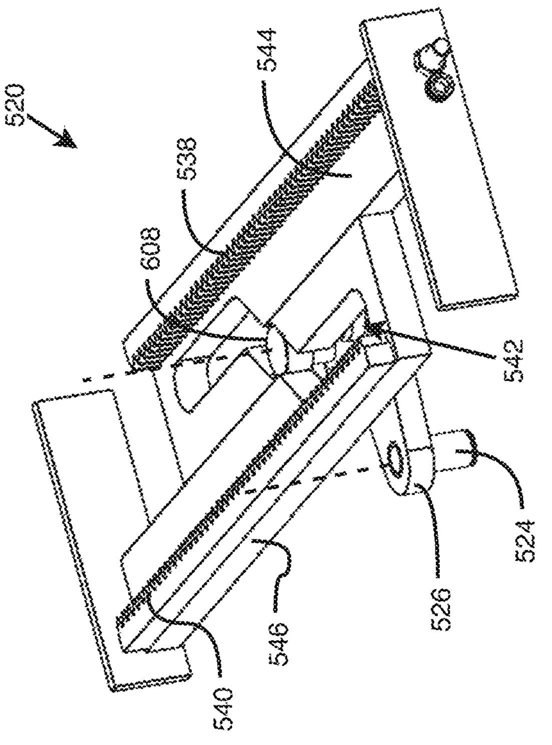
FIG. 69A is a bottom perspective view of the steering converter of FIGS. 64 and 65 with the cover and the gears removed.
Figure 69B:
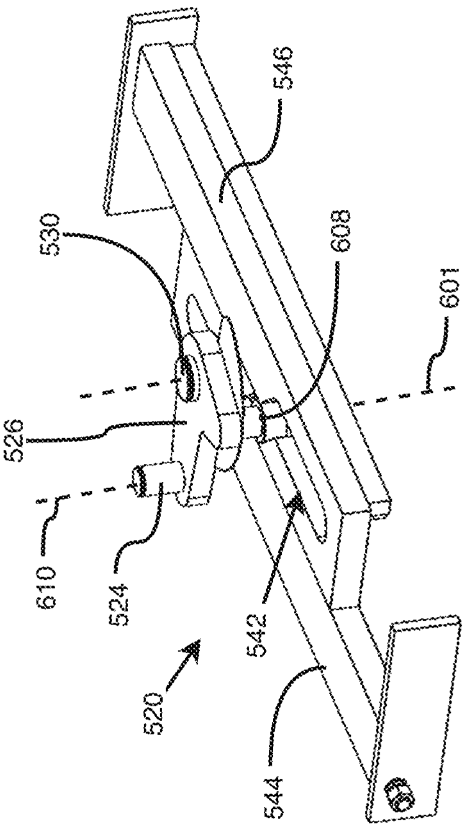
FIG. 69B is a top perspective view of the steering converter of FIGS. 64 and 65 with the cover and the gears removed.
Figure 70:
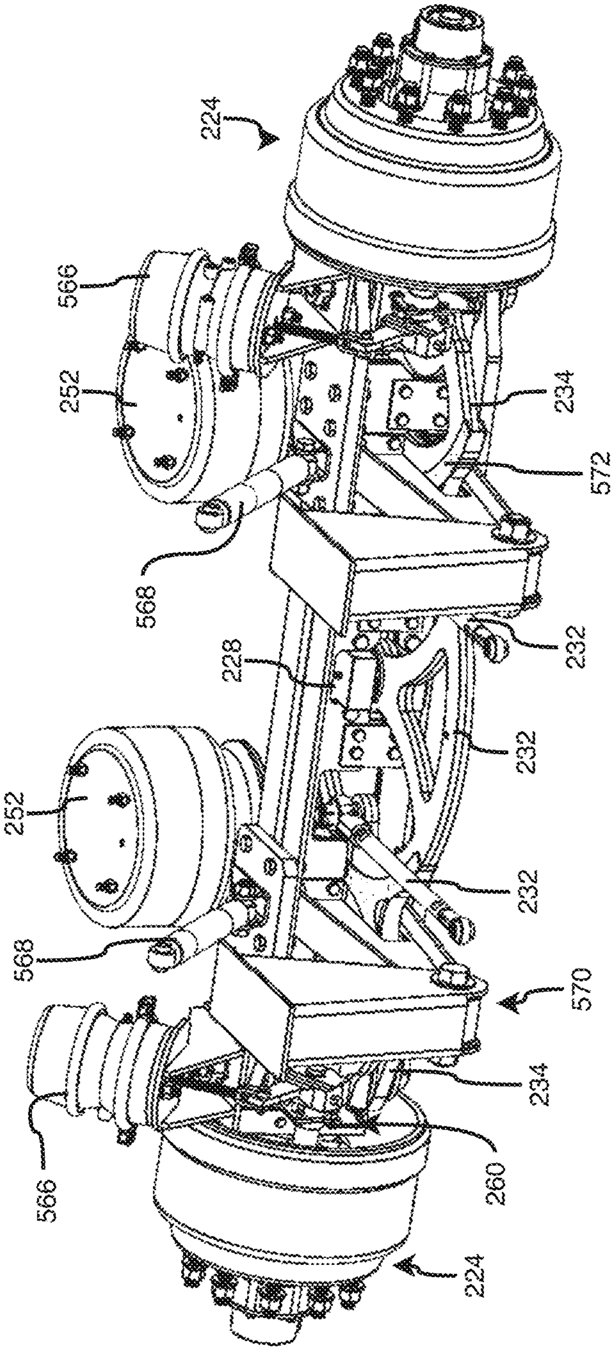
FIG. 70 is a perspective view of a steering axle in according with another embodiment.

It should be noted that the slot 190 in one embodiment, e.g., FIG. 11, and the channel of FIGS. 64, 65, provide solutions to damp that noise.

Referring now to FIGS. 1, 24-33, and 48, the steering assembly 220 is mounted to longitudinal beams 222 mounted to the chassis 352 forming the underbelly 304 of the semi-trailer 110. The steering assembly 220 defines a non-continuous axle (opposite to axles of exemplary semi-trailers having non-steerable wheels). Steered wheel hub assemblies 224 and tires 226 are mounted to the axle, outward from the longitudinal beams 222. The longitudinal beams 222 have a proximal end 414 ending frontward to the pieces 230, 234, proving the clearance necessary to them to efficiently interface, as to provide clearance rearward for break-related components 418 to take place and operate the wheel hub assemblies 224 in all steering angles of the wheel hub assembly 224 without component hitting each other.

Figure 24:
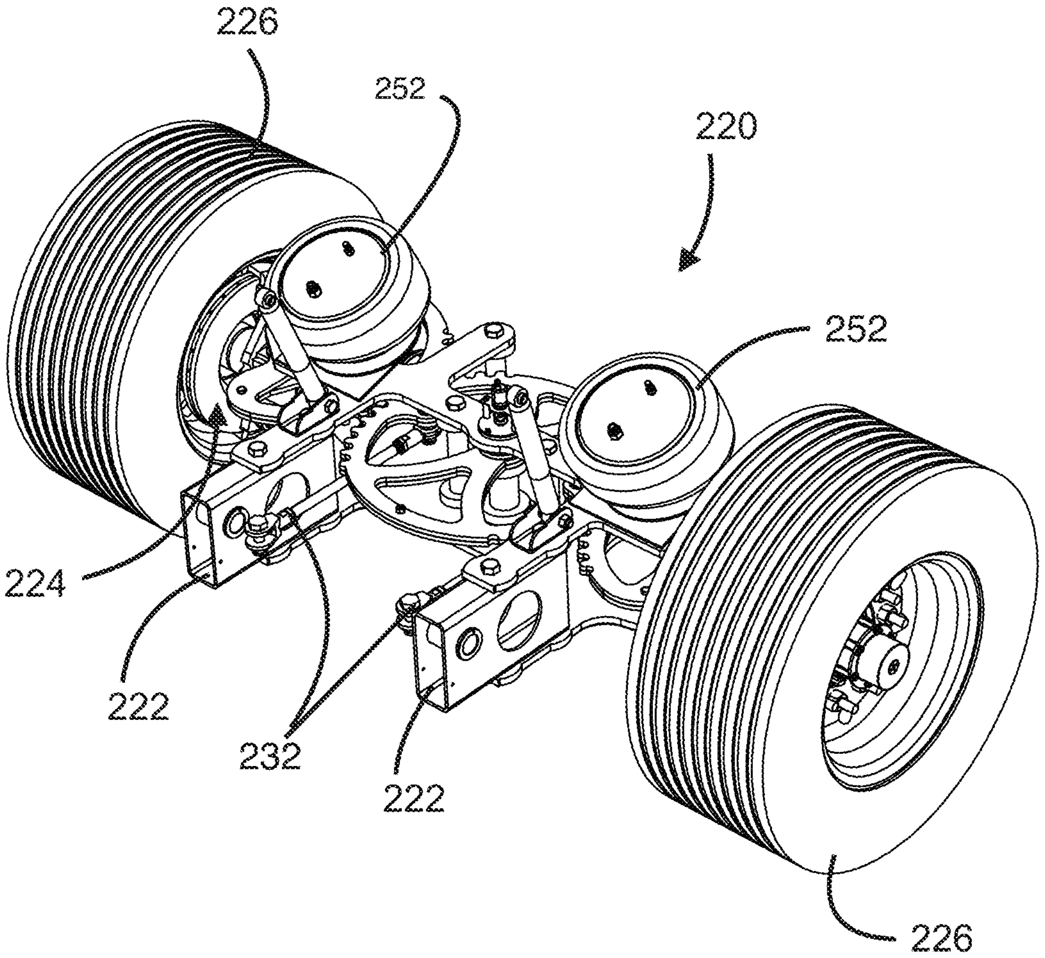
FIG. 24 is a perspective partial view of a trailer with mechanical components of a steering assembly featuring a single axle mounted thereto.
Figure 25:
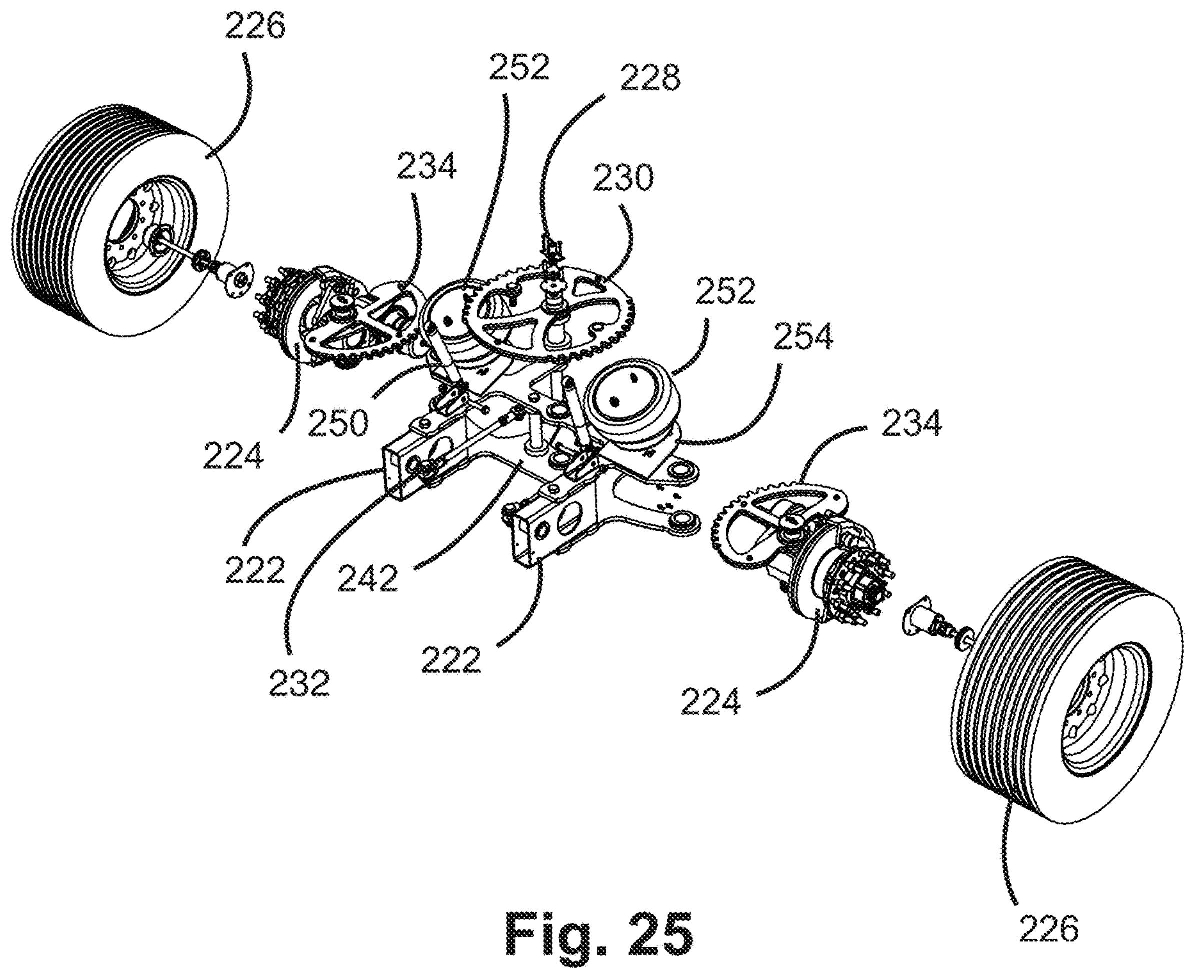
FIG. 25 is an exploded perspective view of the components depicted on FIG. 24.

The steering assembly 220, FIGS. 24-25, comprises a rotatable central cogged piece 230 driven by two driving arms 232 operating in collaboration that are adapted to exert changes in the direction of the central cogged piece 230. The two driving arms 232 are mounted to the rotatable central cogged piece 230 within the external interface, close to the cogged interface, opposed to each other, and in neutral, i.e., straight steering angle, aka when the hub assemblies 224 are straight, for optimization of the torque exerted by the two driving arms 232 up to the maximum steering angle.

An angular encoder 228 is mounted to the head of the shaft 236 for monitoring and control of the angle of the rotatable central cogged piece 230, allowing to compare electronically the data of the angular encoders 138, 228 for validation and control as explained in more details hereinafter.

Side cogged pieces 234, interfacing with the teeth of the rotatable central cogged piece 230, are adapted to transmit rotation of the rotatable central cogged piece 230 to the wheel hub assemblies 224, thus steering the wheel hub assemblies 224.

The rotatable central cogged piece 230 is rotatably mounted to the chassis of the semi-trailer 110 through a shaft 236 extending through components joining the longitudinal beams 222.

When the two driving arms 232 exerts a counterclockwise rotation of the rotatable central cogged piece 230 (ex. depiction on FIG. 28), the interface between the teeth of the rotatable central cogged piece 230 and the left side cogged piece 234 forces the left wheel to pivot clockwise, and similarly the interface between the teeth of the rotatable central cogged piece 230 and the right side cogged piece 234 forces the right wheel to pivot clockwise. However, the ratio of steering, in other words the steering angle of the wheel relative to the pivoting angle of the rotatable central cogged piece 230 is based on the local operating radii of the rotatable central cogged piece 230 and the side cogged pieces 234 at the interface.

It is worth mentioning that in the depicted example the steering angle of the left wheel differs from the steering angle of the right wheel. The reason is that the interfaces of the rotatable central cogged piece 230 and of the side cogged pieces 234 are non-circular interfaces (compared to co-centered circles 360) with a progressively changing radius. As illustrated on FIG. 49, the rotatable central cogged piece 230 has an operating interface 354 that is close to a portion of a spiral or to a portion of an ovoid (versus a circle 231). The side cogged pieces 234, rotatable around their axes 364, also has an operating interface that is close to a portion of a spiral or to a portion of an ovoid (versus circle 233). The interfaces are designed for, in any operating angle, to have their operating radii completing each other such that the clearance between the cogs in the interface remains substantially constant regardless of the angle adopted by the rotatable central cogged piece 230.

Figure 49:
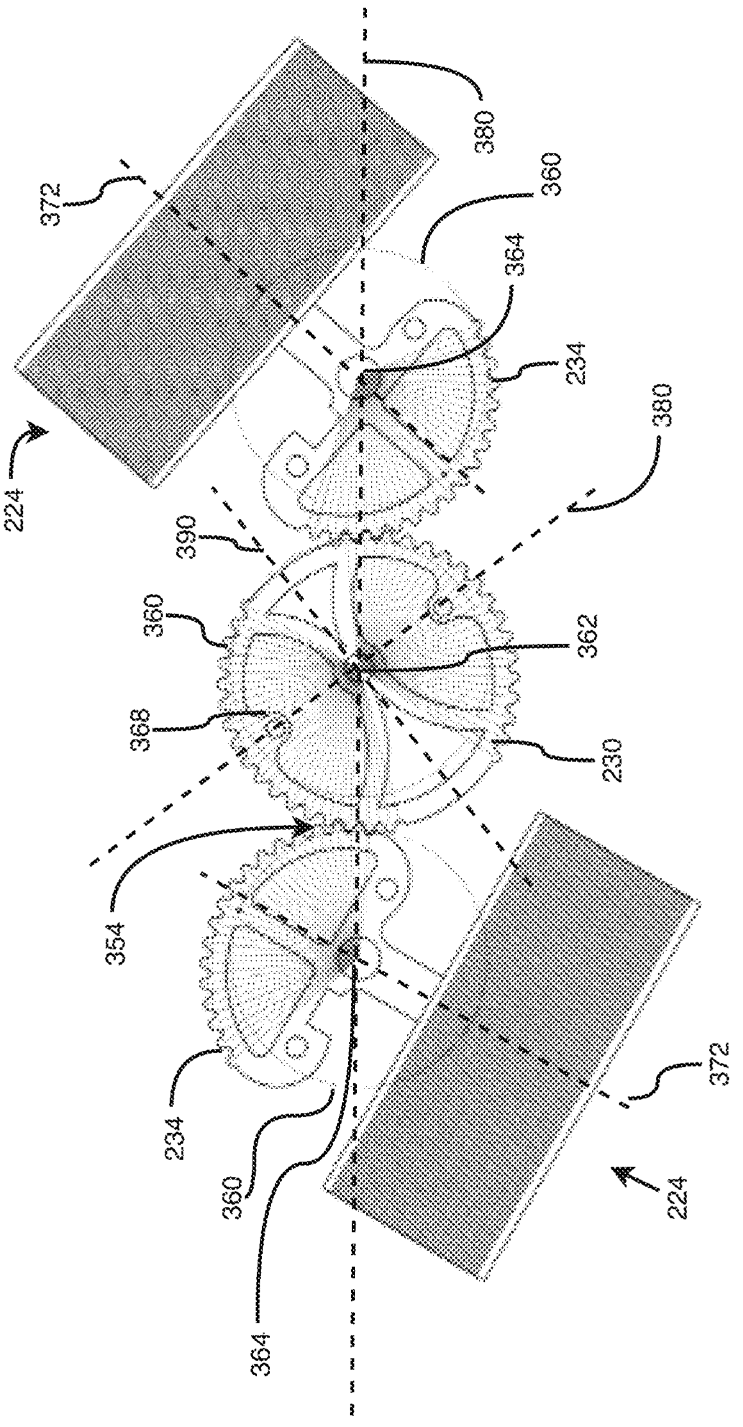
FIG. 49 is a schematic of the rotatable pieces components and the wheels of a steering axle with construction lines and shapes in accordance with an embodiment.
Figure 51:
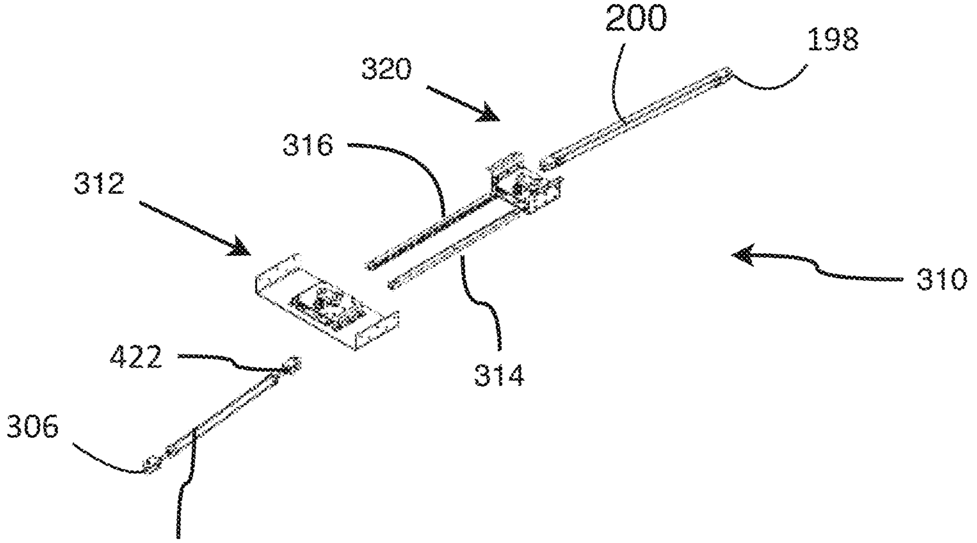
FIG. 51 is a perspective view of an articulated operating arm assembly in accordance with an embodiment.

Referring particularly to FIG. 49, in the neutral position, aka when the wheel hub assemblies 224 are directed to parallel directions, the rotation axes 372 of the steerable wheel hub assemblies 224 are coaxial. The central piece 230 comprises a left interface 350 and a right interface 350 defined according to a longitudinal plane 390 comprising the pivot axis 362 of the central piece 230 and perpendicular to the coaxial rotation axes 372, wherein the left interface 354 and the right interface 354 are mirror images of each other. The central piece 230 comprises a cogged portion adapted to interface with the left steering piece, thus not mandatory featuring the whole circumference of the central piece 230. Joints 368 linking the central piece 230 to the driving arms 232 are at the same distance of the axis 372, and at the same angle relative to the neutral plane 380 comprising the plane 390 comprising the pivot axes of the central piece 230 and the side cogged pieces 234. Preferably, this angle is close to 0 degree to provide the optimum lever distance. It is worth mentioning that the rotatable central cogged piece 230 and the side cogged pieces 234 are mounted to a common body assembly 238 joining the longitudinal beams 222, thereby ensuring planar alignment of the side cogged pieces 234 relative to the rotatable central cogged piece 230 regardless of damping positions, aka the actions of the damper component over the axle assembly.

Preferably, the common body assembly 238 comprises a top axle body 240 mounted to the top of the longitudinal beams 222, and a bottom axle body 242 mounted to the bottom of the longitudinal beams 222. The common body assembly 238 thereby defines a rigid enclosure to mount the rotatable central cogged piece 230 and the side cogged pieces 234 thereto.

The side cogged pieces 234 are rotatably mounted to the top axle body 240 and the bottom axle body 242, outside the longitudinal beams 222. The side cogged pieces 234 are rigidly connected to the spindles 246 on which are mounted the wheel hub assemblies 224. The spindles 246 are steering the wheel hub assemblies 224. Therethrough, there is providing a steering axis 244 that may be designed to optimize the stability of the semi-trailer at all operating steering angles by optimizing the distance between the steering axes 244.

It is worth mentioning that the open-front configuration of the common body assembly 238 provides clearance for connecting the two driving arms 232 to the rotatable central cogged piece 230.

According to an embodiment, the weight of the 220 is decreased to increase the weight of the freight the semi-trailer may be loaded with. The structure of the rotatable central cogged piece 230, the structure of the cogged pieces 234, and the structure of the common body assembly 238 are optimized. Accordingly, based on the distribution of the forces differing from the known steering solutions, the components of the present steering system 115 is kept relatively light. It is worth mentioning that since the forces undergone by the components at the limit steering angles are not substantially greater than the forces undergone near the straight angle, the components may be designed lighter, designed regarding a well-known and limited range of conditions of operation.

Figure 26:
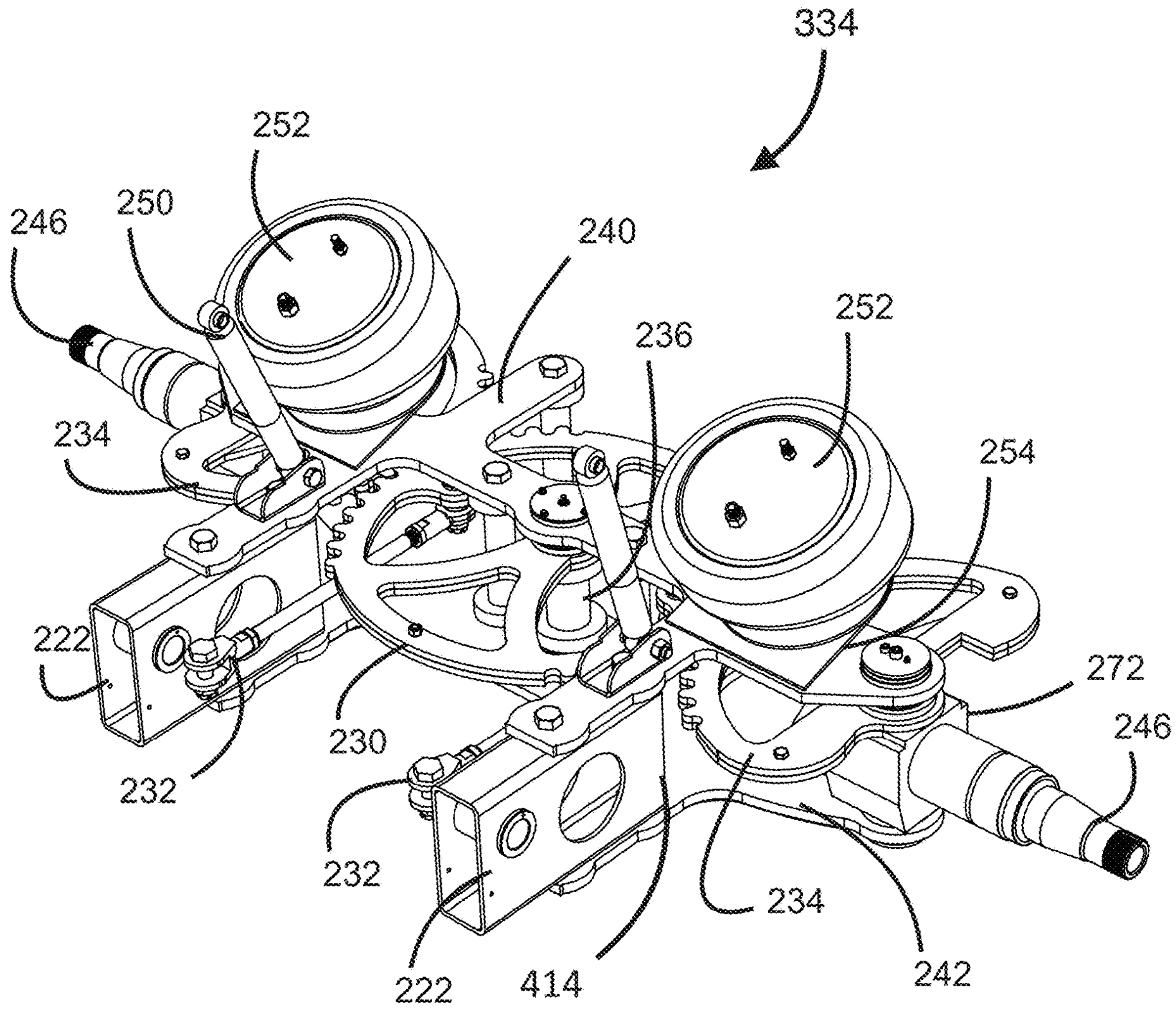
FIG. 26 is perspective view of the components of FIG. 24 with the wheels and the hub assemblies equipped of disc brakes removed.
Figure 27:
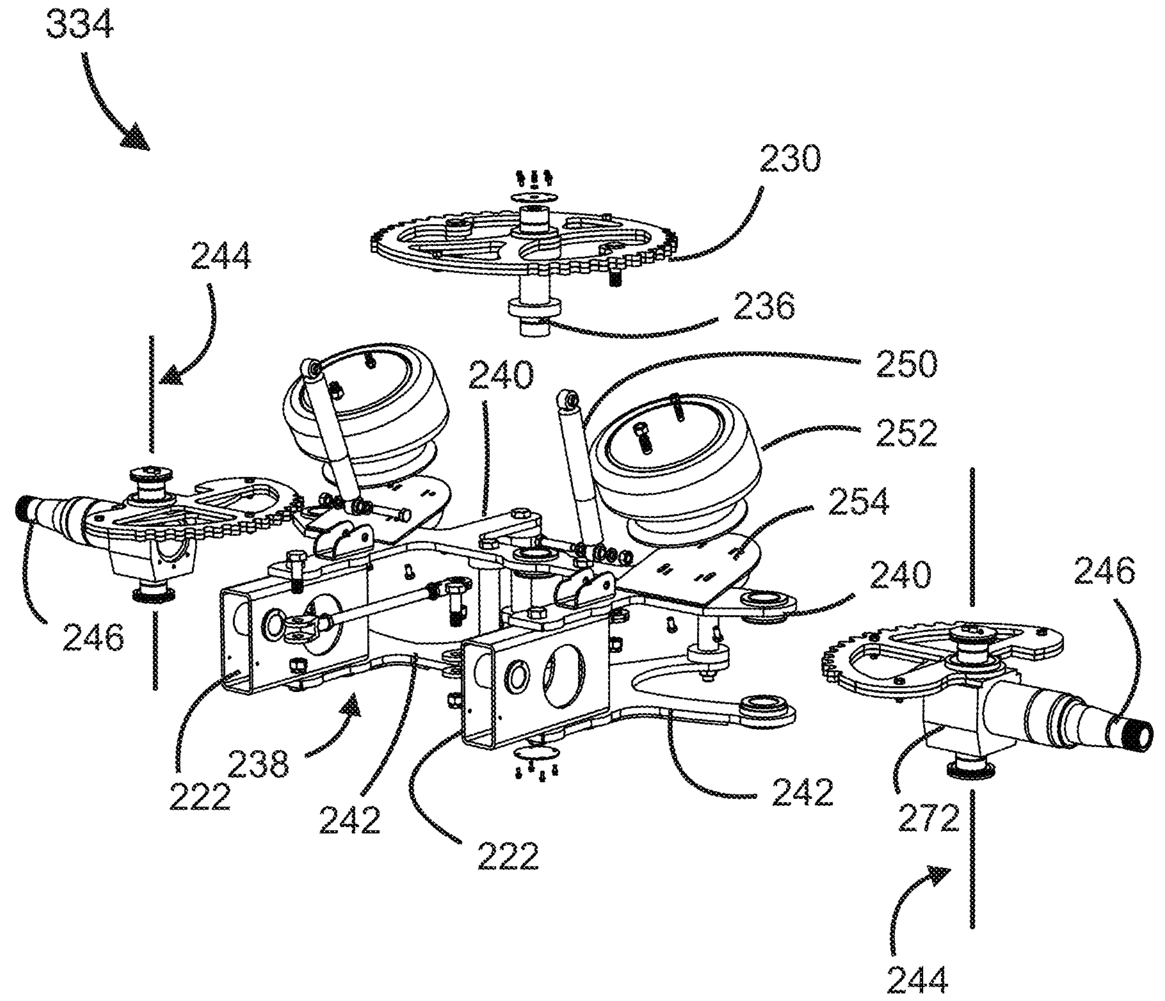
FIG. 27 is an exploded perspective view of the components depicted on FIG. 26.
Figure 28:
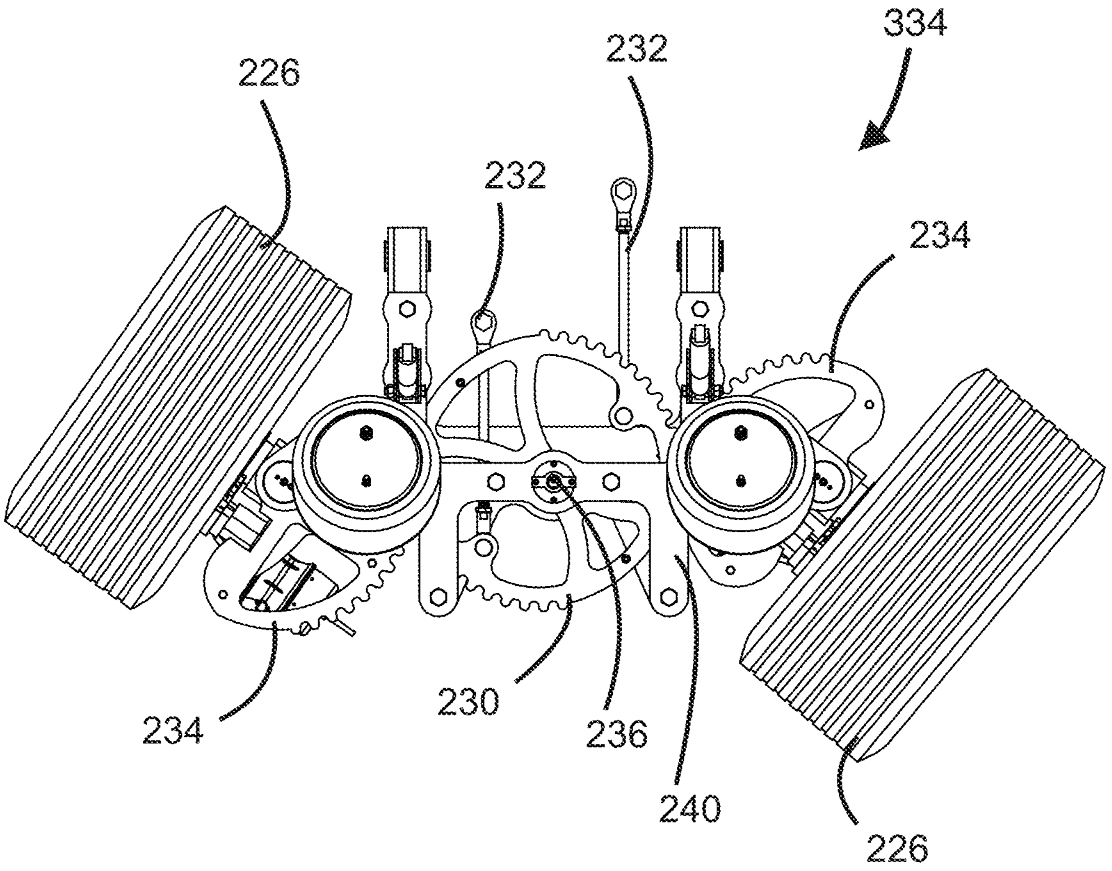
FIG. 28 is an elevated view of the components of FIG. 24 with the wheels are steered to the right.
Figure 29:
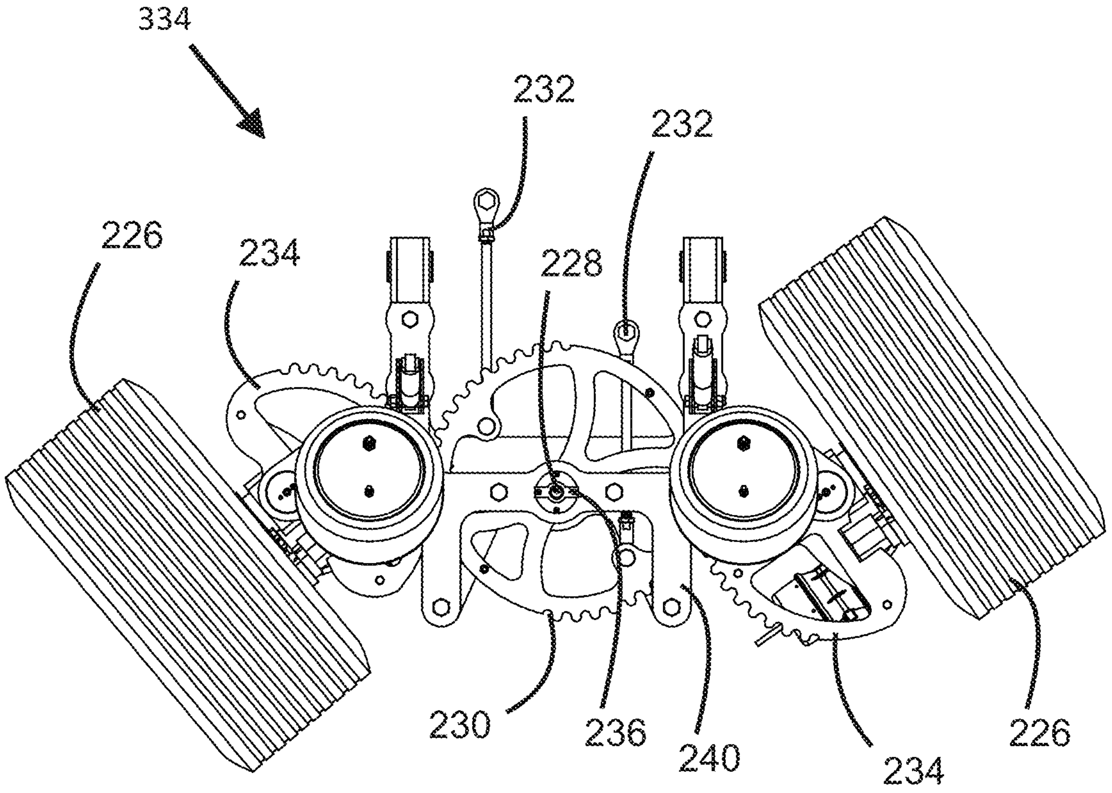
FIG. 29 is an elevated view of the components of FIG. 24 with the wheels are steered to the left.
Figure 30:
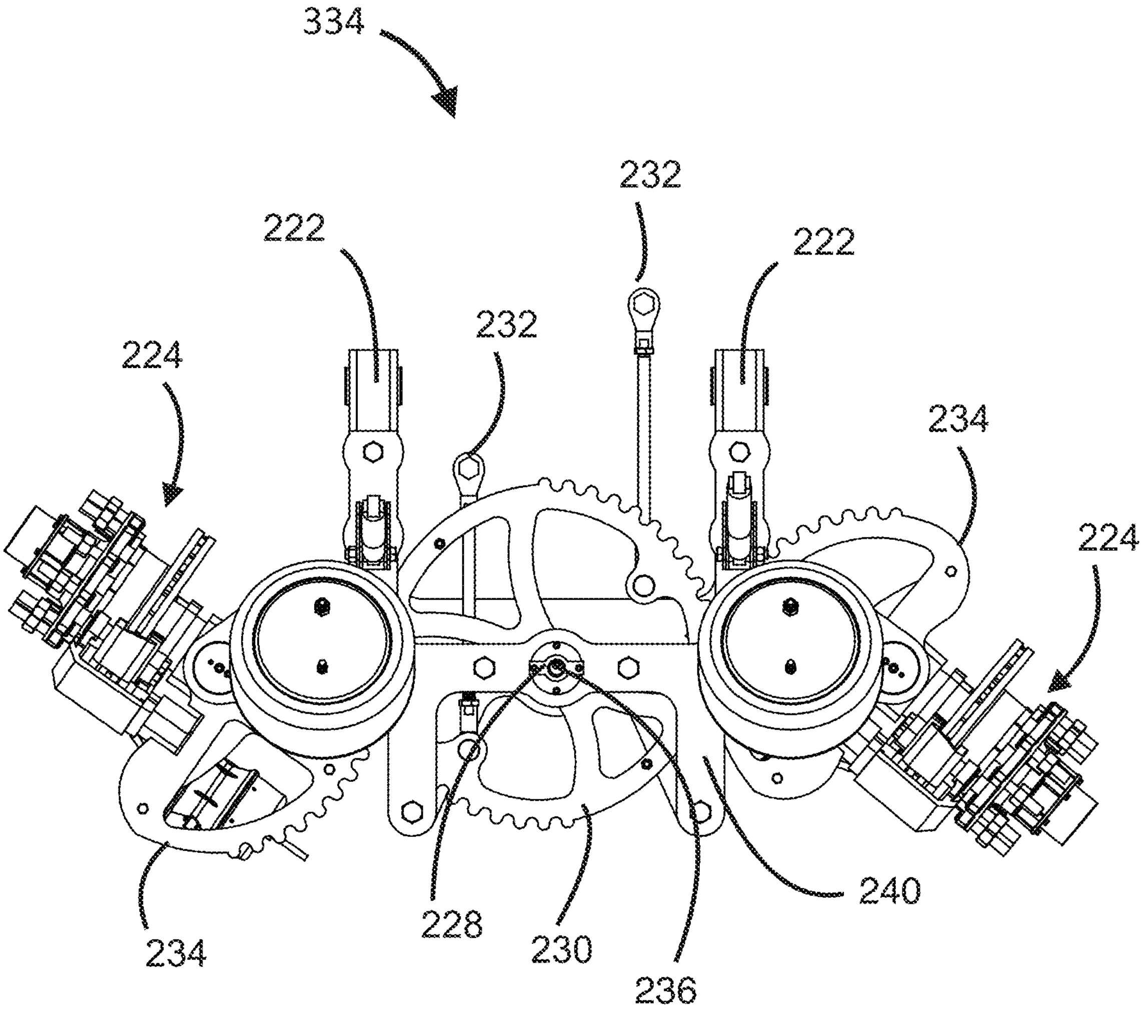
FIG. 30 is an elevated view of the components of FIG. 28, with the wheels removed.

Still referring to FIGS. 25-27, the suspension components are mounted to the top axle body 240 linking the longitudinal beams 222 to the floor of the semi-trailer 110. The suspension components comprise, above each longitudinal beams 222, a combination of a shock absorber 250 and an air spring 252. The air springs 252 are mounted to a sloped plate 254 having an angle based on the radius of curvature of the damped arm. This configuration is selected to decrease the differences of compression between the front portion and the rear portion of the flex member of the air spring 252. Location is further selected to decrease potential misalignment that would result from the compression of the air spring 252 based on the structure on which the air spring 252 is mounted pivoting around an axis (not shown) relatively close to the air spring 252.

Figure 31:
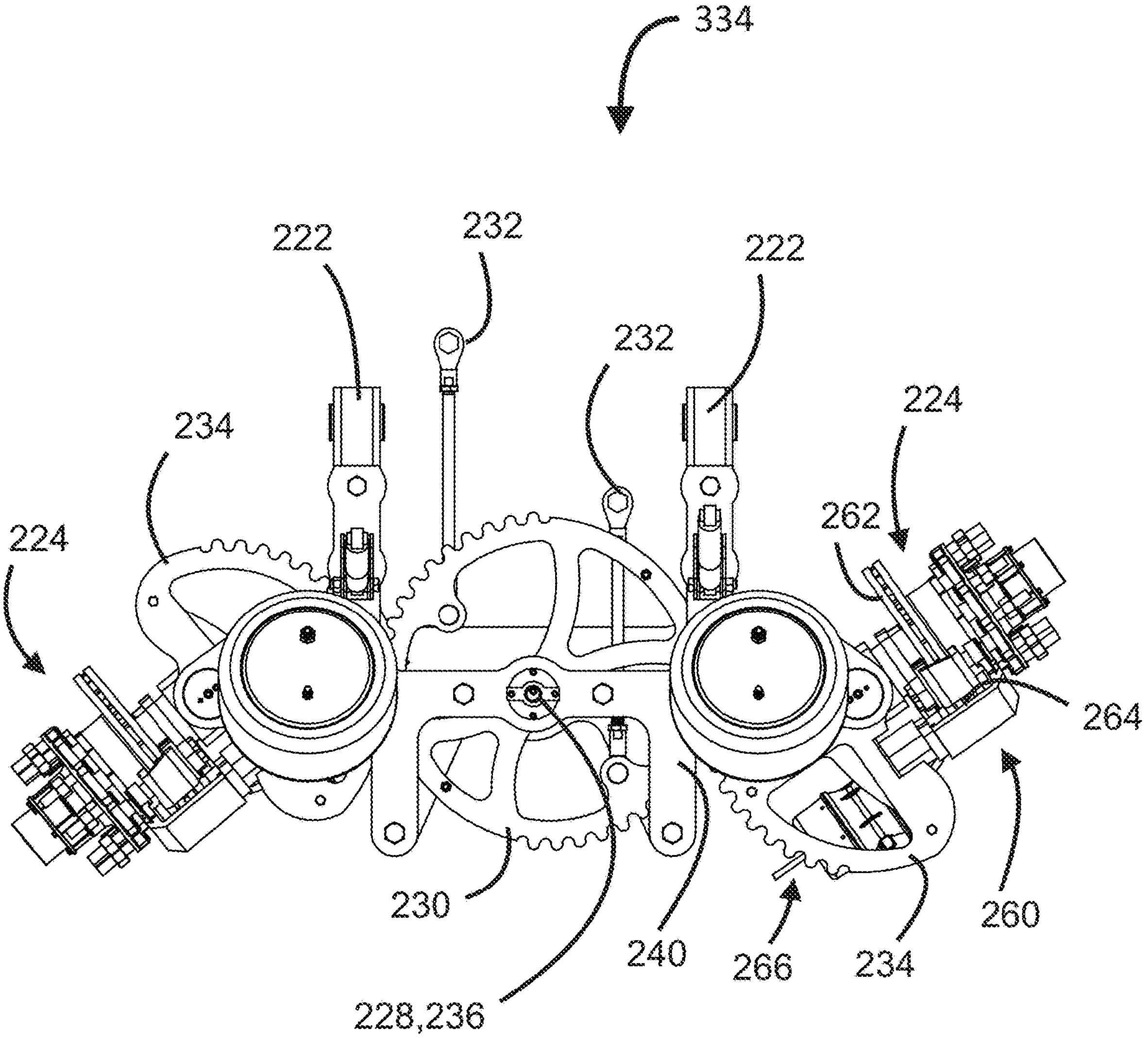
FIG. 31 is an elevated view of the components of FIG. 29, with the wheels removed.
Figure 32:
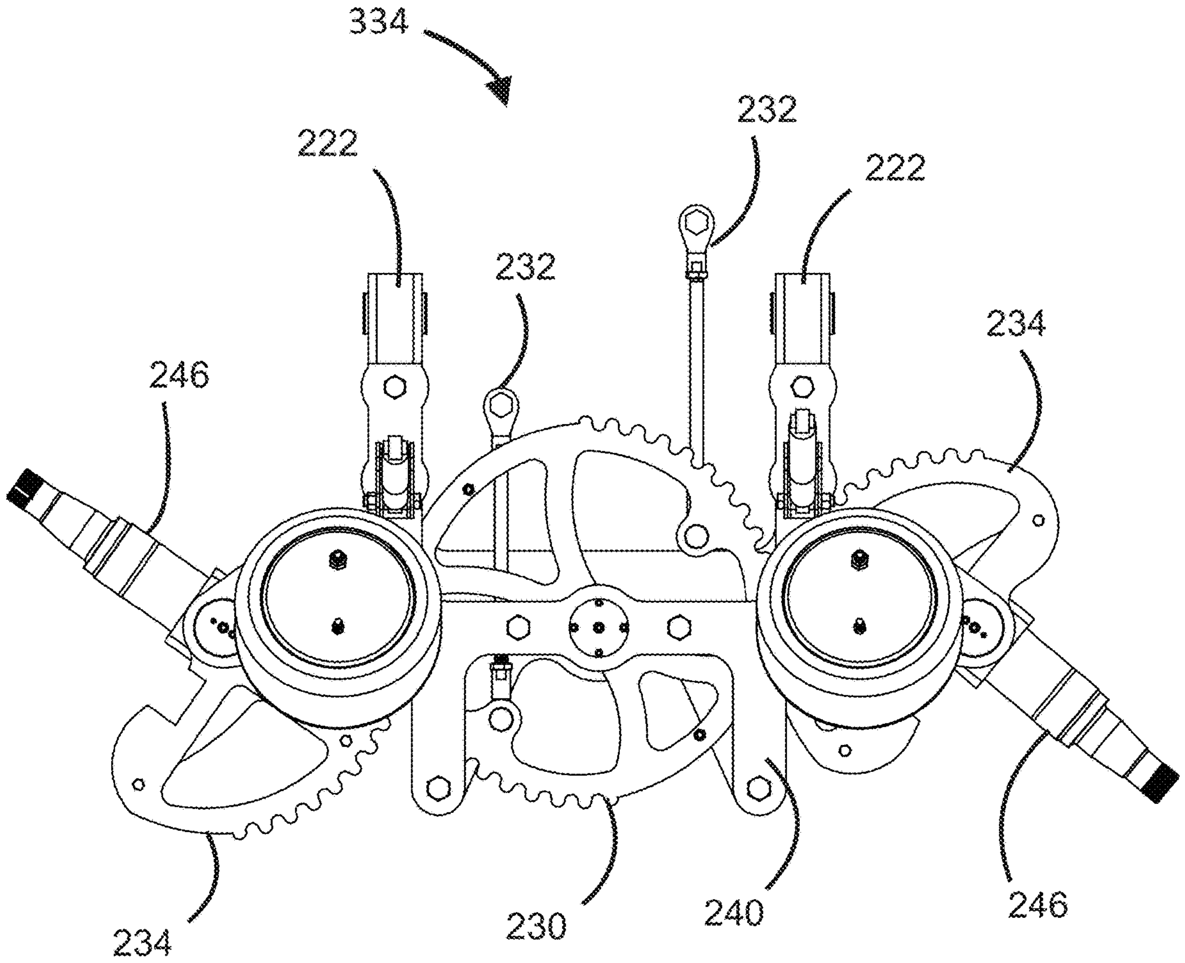
FIG. 32 is an elevated view of the components of FIG. 28, with the wheels and the hub assemblies removed.
Figure 33:
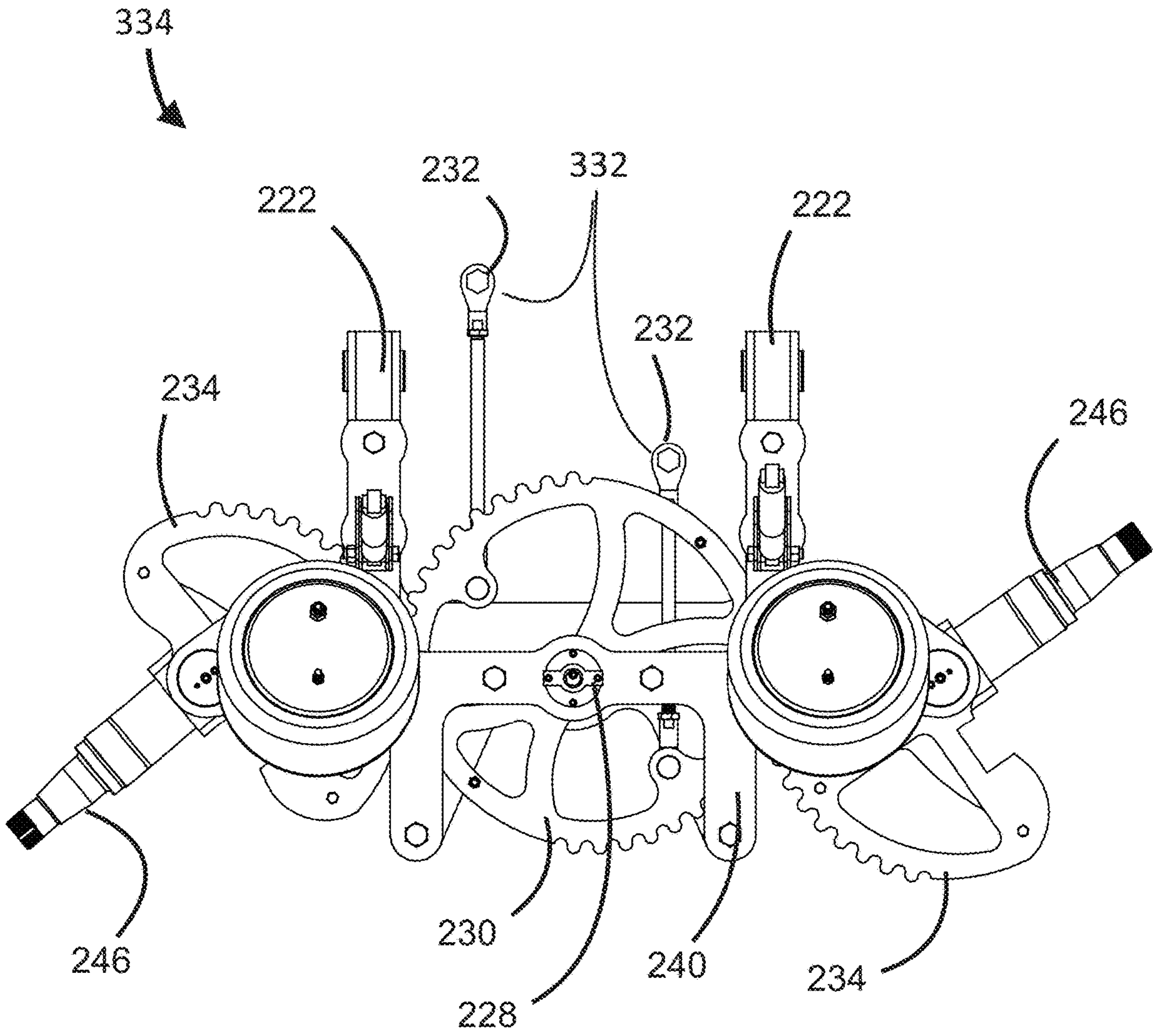
FIG. 33 is an elevated view of the components of FIG. 29, with the wheels and the hub assemblies removed.

Referring particularly to FIG. 31, the air brake assembly 260 of each of the steered wheel hub assemblies 224 is located substantially on the topside of the wheel hub assemblies 224. The brake assembly 260 comprises a disk 262, a pad assembly 264 mounted such that its bottom part is located at least equal, and preferably above the center of the wheel hub assembly 224. The brake chambers 266 are mounted below the side cogged pieces 234. The clearance provided by the steering assembly 220 under the side cogged pieces 234 provides clearance for the brake chambers 266 to travel as the wheel hub assemblies 224 are steered, and for a lock bar (for mechanical locking the wheel, not depicted)

able to be installed on the brake chambers 266 in all steering angles of the wheel hub assemblies 224.

Accordingly, the configurations of the steering assembly 220 and of the air brake assembly 260 generates no interference therebetween within the whole range of operating steering angles of e.g., between −40 and 40 steering degrees of the wheel hub assemblies 224. The open-bottom configuration of the air brake assembly 260 further prevents premature wear through available natural drainage of foreign material, e.g., gravel, ice, that may be projected e.g., between the pads and the disks 262.

Referring now to FIGS. 1 and 2, steered wheels semi-trailers 110 may feature a plurality of steered wheel axles. Section of the semi-trailer 110 depicted on FIG. 2 provides an example of a semi-trailer featuring two steered wheel axles driven together.

According to embodiments, the distance between the steered wheel axles may vary from a minimum distance (corresponding substantially to the closest distance two axles of a semi-trailer having non-steerable axles operates nowadays) to an undetermined distance that is based on other aspects, such as the structure, of the semi-trailer 110.

Figure 44:
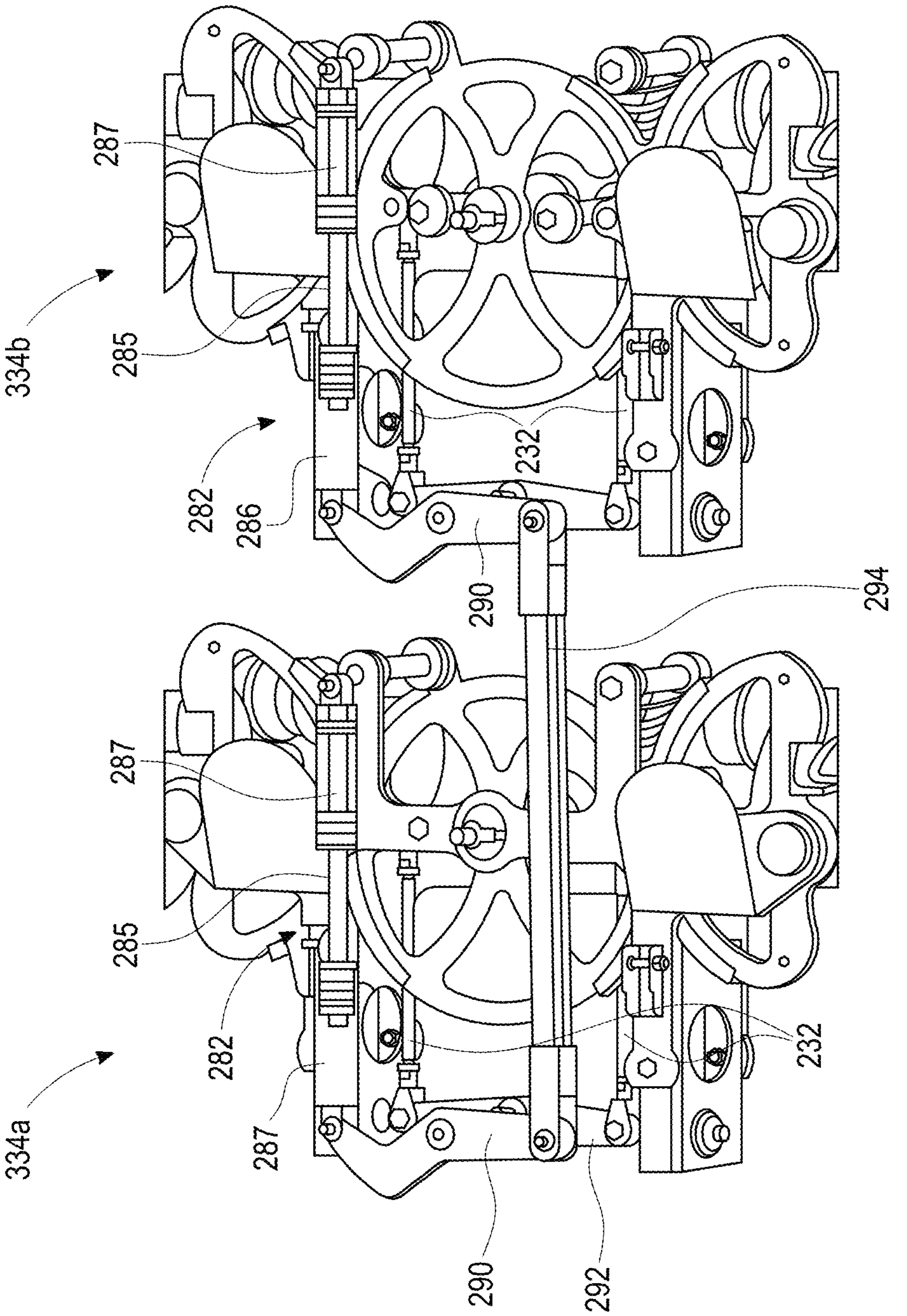
FIG. 44 is a 60-degrees elevated-side view of components of a steering system featuring two steered axles in accordance with an embodiment.
Figure 46:
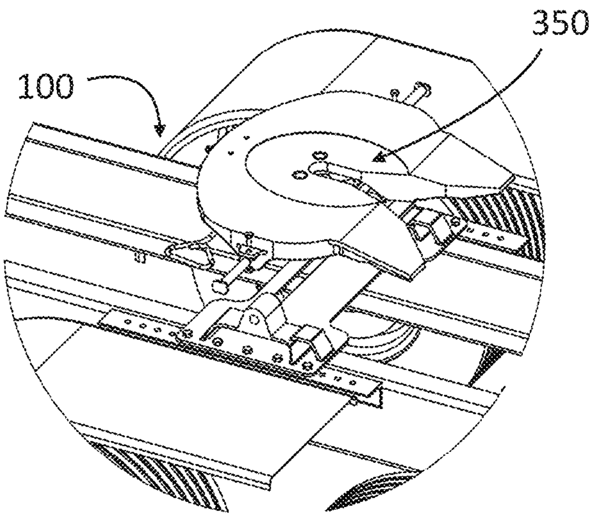
FIG. 46 is a closeup view of the saddle mounted to the chassis of the tractor of FIG. 45.
Figure 45:
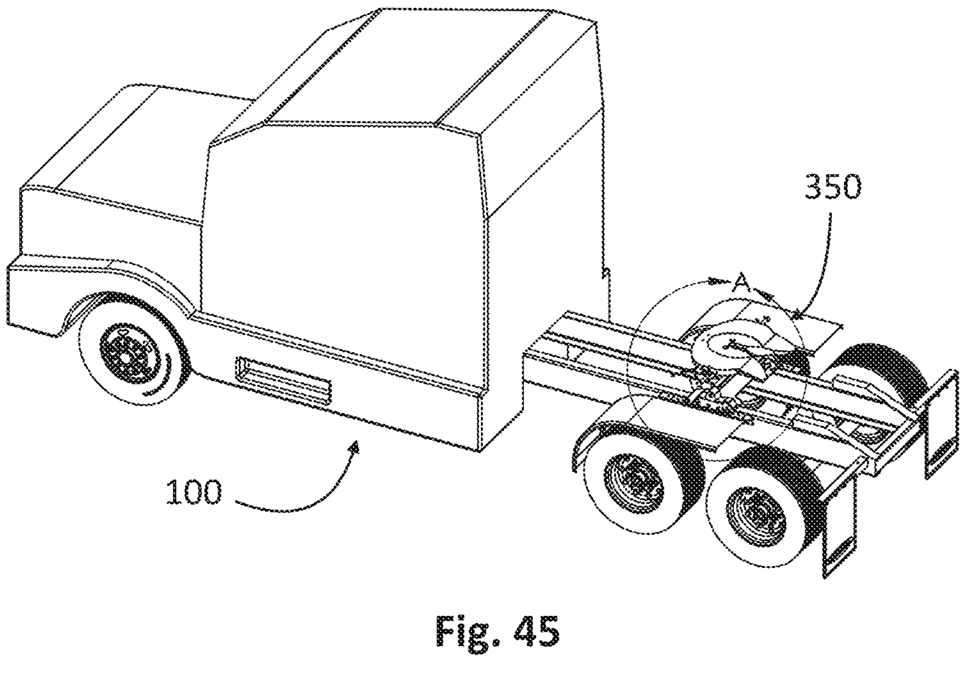
FIG. 45 is a perspective view of a tractor having a saddle.
Figure 47:
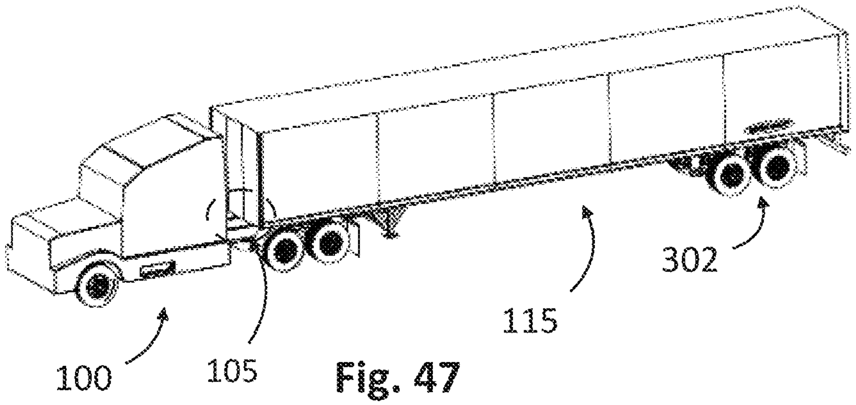
FIG. 47 is a perspective view of a tractor with a trailer attached thereto ready to be hauled.
Figure 48:
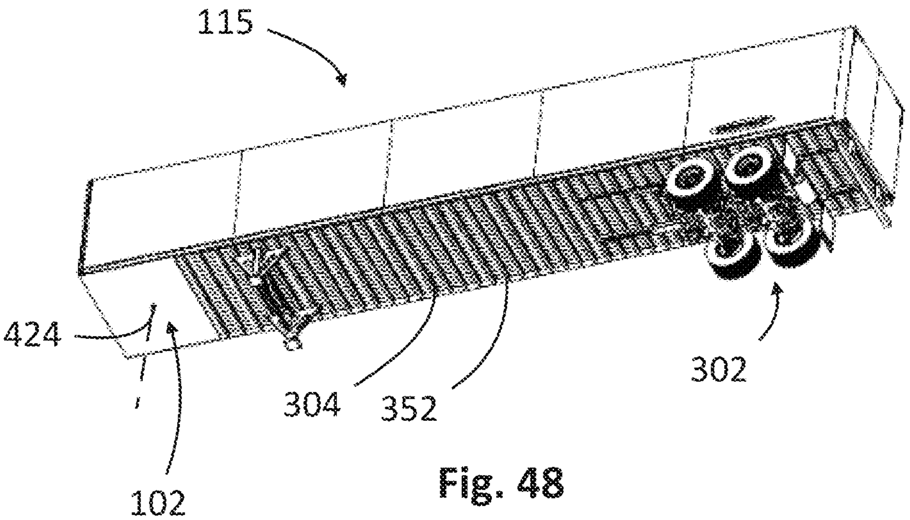
Fig. 48 Prior Art
FIG. 48 is a bottom perspective view of a tractor of the PRIOR ART comprising a kingpin adapted to attach to the saddle of a tractor.

Referring additionally to FIGS. 1 and 44, the steering axles 334 may comprise master steering axle 334*a* and a slave steering axle 334*b*. Hydraulic four-controls cylinders 282 controlling the steering of the steering assembly 220 are single-rod two-barrels 287 cylinders mounted at each end of the rod 285, that provides four-end-of course positions. These four end-of-course positions allow to provide fine control of the extension of the hydraulic cylinders 282, and particularly provides at least one intermediary end-of-course position corresponding to the straight configuration of the steered wheels.

The hydraulic cylinders 282 are connected to an arm 290 rigidly connected to a control arm 292 at which are connected the two driving arms 232. A linking arm 294, adjusted in function of the distance between the two steering assembly 220, connects the arm 290 and thereby ensures that the front steering assembly and the rear (dependent) steering assembly will operate in synchronous manner.

It is worth mentioning that even though the control of the front rotatable central cogged piece and the rear rotatable central cogged piece angle adopt the same angle, the steering angles of the four wheels are designed to be unique (based on the distance of the axle from the kingpin 102, and the wheels being the inner wheel or the outer wheel at this angle of the semi-trailer 110 relative to the tractor 100). Such unicity is performed through a specific configuration, aka shape, of a rotatable central cogged piece 230 and of side cogged pieces 234 for the front and the rear axle. Such unicity allows to minimize to substantially zero (0) the ripping through adoption by all wheels the appropriate steering angle according to their specific steering radius, regardless of the number of axles and the longitudinal positions of the axles.

It is worth mentioning that the arms 290, through ball joints 332 mounted to the linking arm 294 joining the steering assemblies, are isolated from effects of bumps on the road. The linking arm 294 is free to adopt a variety of angles as the shock absorbers operate. Accordingly, the hydraulic cylinders 282 are also isolated from most of the vibration, thereby extending the life expectancy of the hydraulic cylinders 282 and of their parts, e.g., seals.

Figure 16:
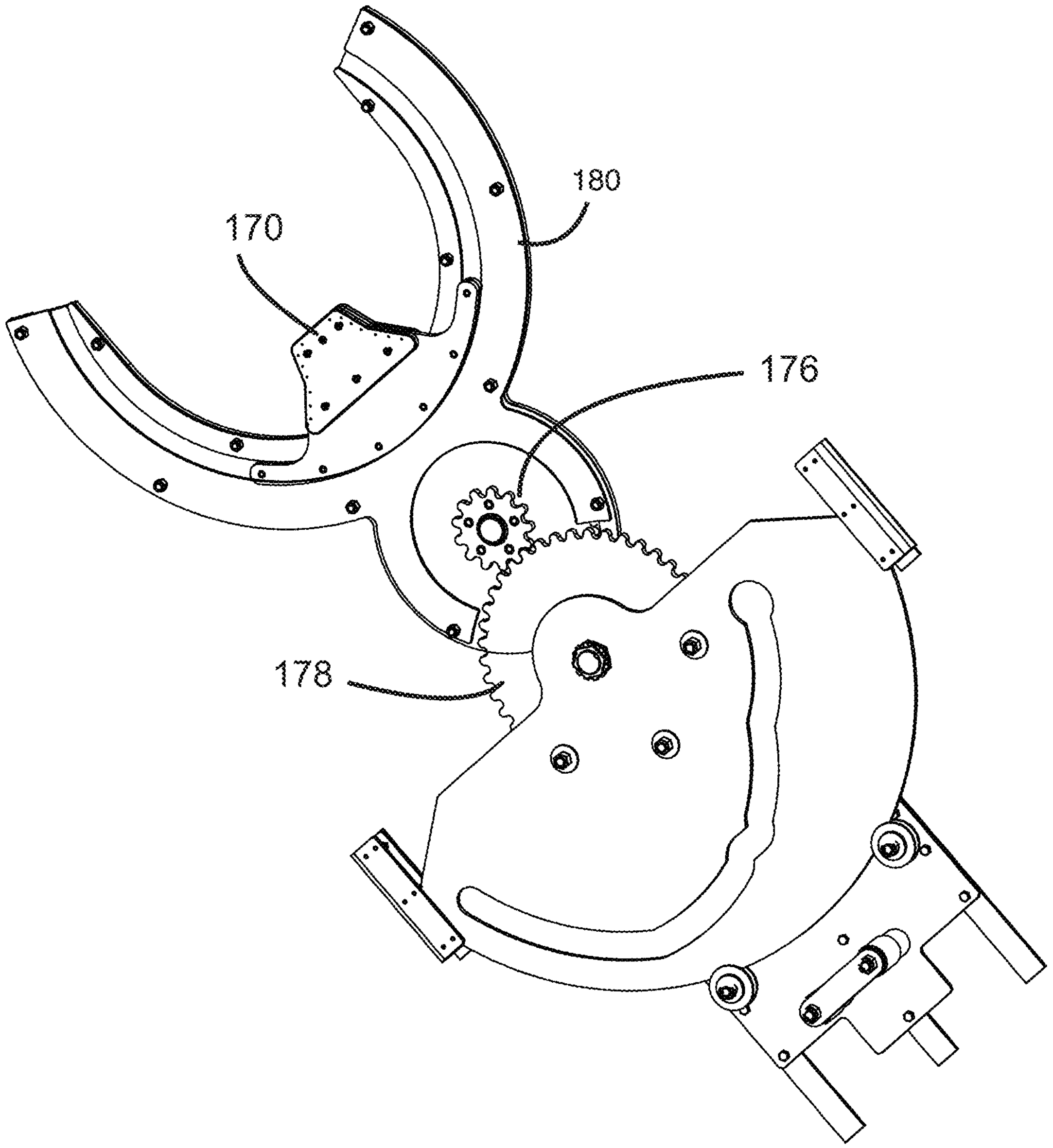
FIG. 16 is a bottom plan view of the rotation reading mechanism and a portion of the angular translation mechanism of the mechanical steer driving system of FIGS. 14-15.
Figure 17:
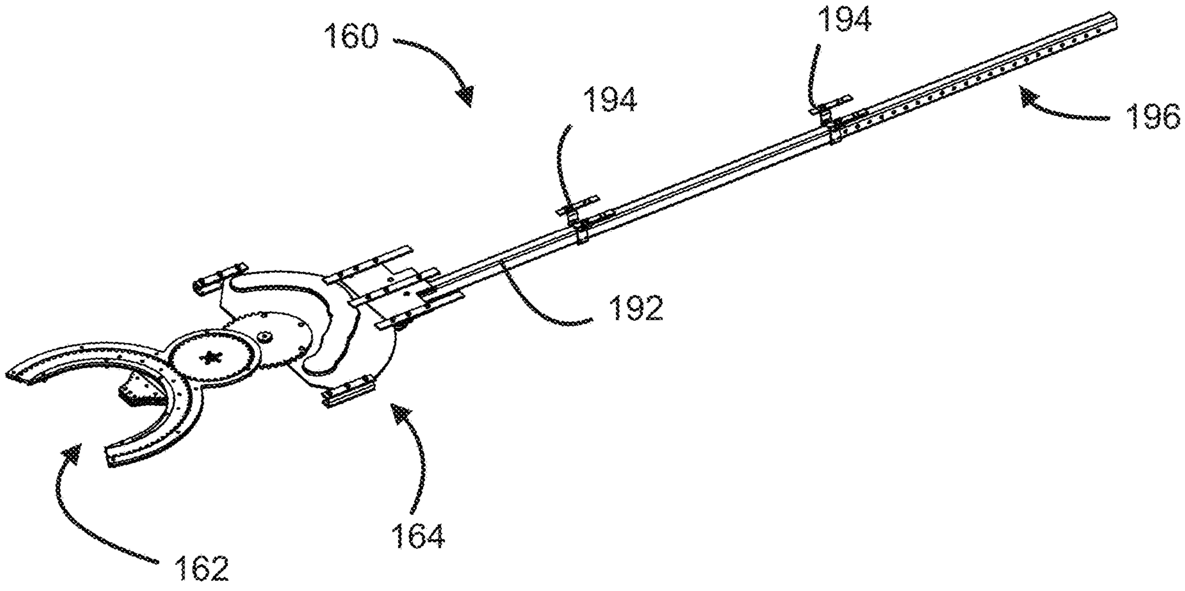
FIG. 17 is another perspective view of a mechanical steer driving system of FIG. 10.
Figure 62:
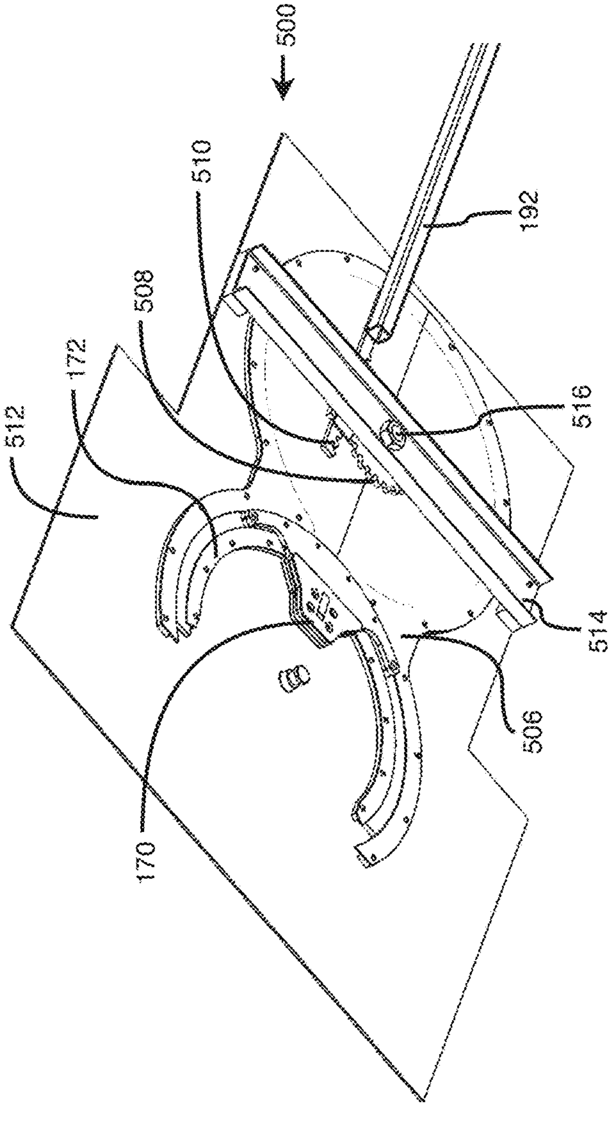
FIGS. 62 and 63 are respectively a bottom perspective view and a top perspective view without a support plate of a steer driving assembly In accordance with an embodiment.
Figure 63:
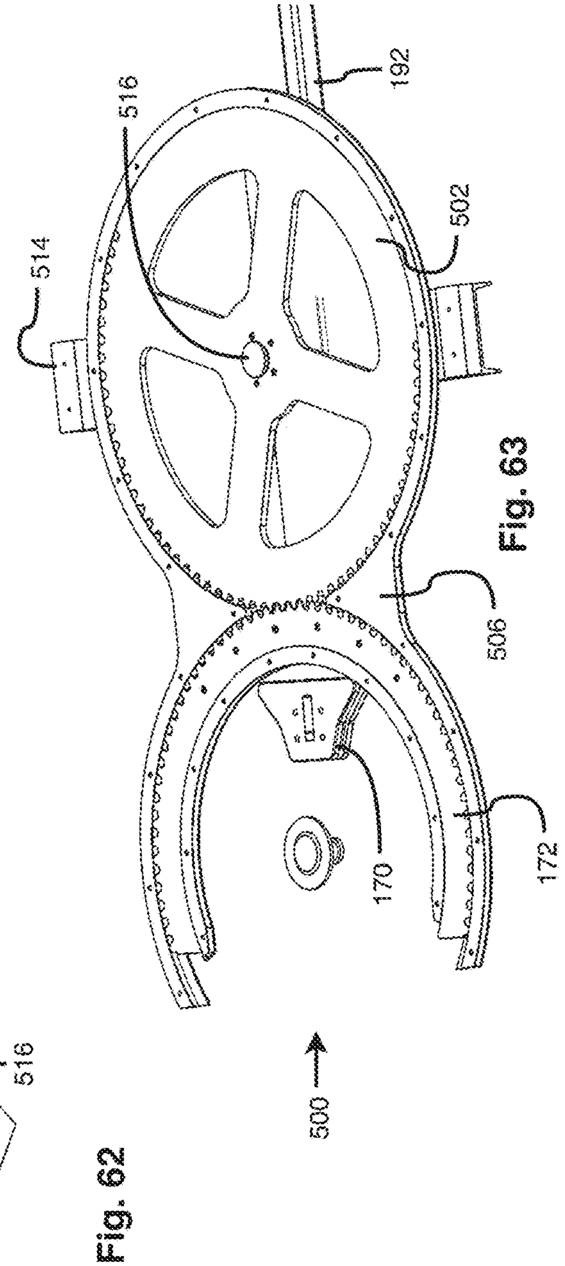

Referring now to FIGS. 62 and 63, an alternative embodiment involves displacement of the steering converter mechanism from the angle sensor system, e.g., angular translation mechanism 164 depicted in e.g., FIG. 16, to a separate mechanism. Accordingly, the steering driving assembly 500 of FIGS. 62 and 63 is limited to reading direction of the tractor 100 relative to the semi-trailer 110, and through a series of cogs, to convert that angle into a longitudinal displacement of an arm member 192.

The steering driving assembly 500 comprises upstream a funnel portion 170 connected to an arch-shaped cog railway 172 moveable relative to a frame 506, and driving a first gear 502. The first gear 502 is mounted to a shaft 516 common with a second gear 508, thus driving the second gear 508. The second gear 508 drives the arm member 192 through an interface with a cogged portion 510 converting the pivoting of the second gear 508 into longitudinal displacement of the first arm member 192.

A plate 512 and a beam 514 complete the steering driving assembly 500, providing structure, support, and protection of the components into a slim structure easily mountable to the underbelly 304 of the semi-trailer 110 without requiring changes in the design of the semi-trailer 110 or the hauling saddle 128 of the tractor 100.

Referring to FIGS. 64 to 67, 68A-B and 69A-B, an embodiment comprises a distinct steering converter mechanism embodied as a steering converter 520. The steering converter 520 comprises a housing 522 with an aperture at its front through which extends the first arm member 192. The steering converter 520 comprises a mechanism converting longitudinal displacement of the first arm member 192, a steered movement, in a steering displacement control transmitted by the displacement of a shaft 524 mounted to an arm 526 pivotally mounted to a shaft 530, aka a steering movement. The mechanism permits to control the responsiveness of the steering transmitted to the steering axle rearward. A trap 528 at the front of the housing 522 allows to set the responsiveness of the steering converter 520.

Referring particularly to FIGS. 68A-B and 69A-B, the steering converter 520 comprises a set of gears 532, 534, 536 interfacing with a pair of cog rails 538, 540, the first cog rail 538 being longitudinally driven by the first arm member 192, and the second cog rail 540 allowing to adjust responsiveness of the steering converter 520 through the setting of the longitudinal straight portion of the channel 542. More precisely, setting of the distance between the wide portions 596 of the interfacing components 544 (versus the narrow portion 597) allows to set a longitudinal central portion of the channel 542 of between a null length to a substantial length. According to a longitudinal length exerting no movement of the arm 526, increasing the length of the longitudinal central portion of the channel 542 decreases the responsiveness of the steering converter 520, or in other words increase the minimum steered angle before obtaining a steering movement transmittable to the steering axle.

For illustration, the cog rails 538, 540 are mounted to or part of interfacing components 544, 546 each featuring a channel portion 548, 550 comprising a slopped portion 600 adapted to convert a longitudinal displacement of the arm member 192 into a displacement of the shaft 524, and a longitudinal portion 604 distant from the interface of the interfacing components 544, 546. The latter longitudinal portion 604 is adapted to exert no additional displacement of the shaft 524 from displacement of the first arm member 192, thereby allowing extreme misalignment of the tractor 100 and semi-trailer 110 without exerting overlimit steering to the steering axle. The interface between the interfacing component 544, 546 is longitudinally adjustable, allowing to provide almost no to a central longitudinal portion 602 of the channel 542 having a substantial length. The central portion 602 provides a path wherein displacement of the first arm member 192 about the aligned position of the tractor 100 and semi-trailer 110 does not convert into a steering of the steering axle. Therefore, by adjusting the length of that interface central longitudinal portion 602, a level of noise cancellation may be set, including preventing conversion of any changes of direction of the tractor 100 into steering of the steering axle.

According to an embodiment, adjustment of the responsiveness of the steering converter 520 can be done by screwing/unscrewing a screw 552 accessible through the trap 528.

Such feature is particularly useful, e.g., to set no responsiveness of the steering axle for highway circuits, for when the tractor 100 and semi-trailer 110 are about to operate at high speed.

It is to be understood that the conversion is made by the shaft 608, mounted to the arm 526, with its travel in the channel 542 forced by the movement of the interfacing components 544 relative to the housing 522. When the shaft 608 is exerted to move away from the center of the channel 542, it exerts a rotation of the arm 526 around its rotation axis 601, resulting in a movement of the shaft 524 and its axis 601 connected to the steering axle.

It is further to be understood that the length of the central longitudinal portion of the channel 542, since not exerting a rotation of the arm 526, sets the steered angle before the wheels of the semi-trailer 110 being steering, and the longitudinal portions 604 of the channels 542 beyond the sloped portion 600 exerts no additional steering of the wheels of the semi-trailer 110, regardless of the additional steered angle the semi-trailer 110 may undertake. Thus, length of the longitudinal portions and of the sloped portion sets the responsiveness of the steering converter 520.

It is worth mentioning that even though a manual mode of operation is provided to set the responsiveness of the steering converter 520, in alternative embodiments, other solutions including, e.g., electric components, hydraulic components, mechanical switches, may be used to set the responsiveness from the cabin of the tractor 100, from the side of the semi-trailer 110, etc. and/or may allow to switch between a responsiveness setting transmitting steering to a no responsiveness setting without losing the responsiveness setting previously set. Therefore, complementary control solutions for the steering converter 520 are contemplated therein.

Referring now to FIGS. 70 to 79, an embodiment of a steering axle 564 more compact that the steering axle 334 is depicted. The steering axle 564 comprises a central cogged piece 230 driven the driving arms 232, with an angular encoder 228 mounted thereto. It comprises cogged pieces 234 driven by the rotatable central cogged piece 230 with wheel hub assemblies 224 steered by the cogged pieces 234. It is still adapted to have air springs 252 mounted thereto, and brake assembly 260 mounted to the wheel hub assemblies 224, comprising service brake chamber 566 mounted about the wheel hub assemblies 224, above the cogged pieces 234. The steering axle 564 further comprises a general structure 570 allowing to connect and hold these components, with the general structure 570 connected directly and/or indirectly through shock absorbers 568 to the underbelly of the semi-trailer 110. Finally, the steering axle 564 comprises, in realization of the steering axle 564 being open to the road, teeth shields 572 protecting the teeth and general interface of the cogged pieces 230, 234 from dust and foreign material.

Figure 71:
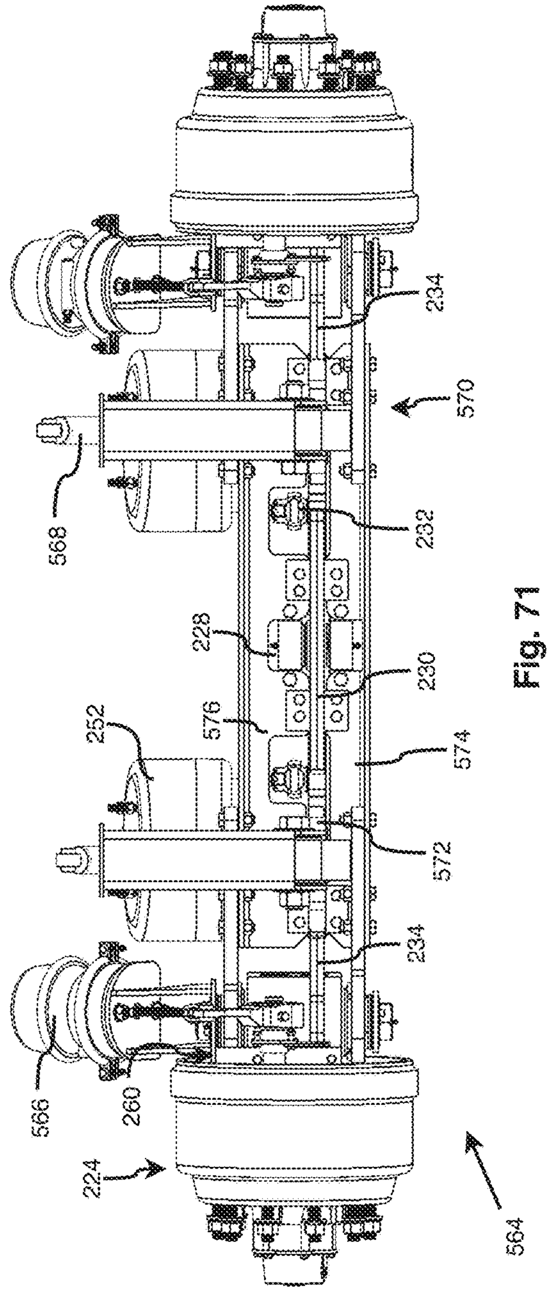
FIGS. 71 and 72 are respectively a front elevation view and a rear elevation view of the steering axle of FIG. 70.
Figure 72:
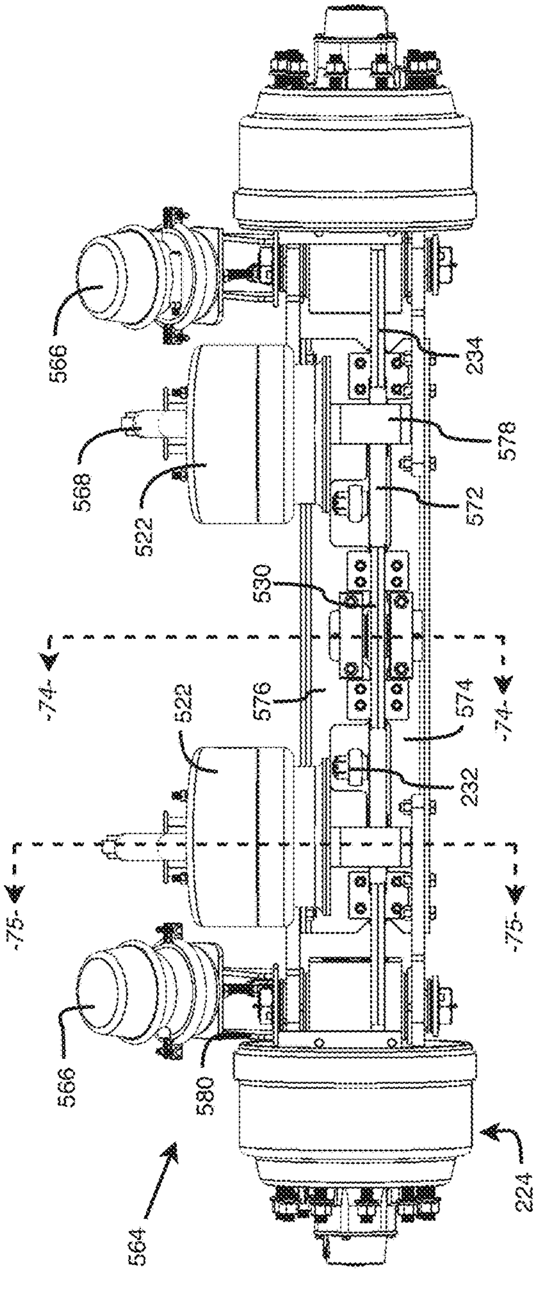

It is to be noted from FIGS. 71 and 72 that the general structure 570 is made of different components bolted together defining a cage of protection of the cogged pieces 230, 234, allowing easy opening of the cage of protection by disassembling a part from the general structure 570. For instance, the general structure 570 comprises parts extending frontward and rearward, e.g., part 578 from the central axle parts 574 and 576, allowing to slide the cogged pieces 230, 234 horizontally out of the cage of protection without having e.g., to cut off parts. Such solution, in addition to be more compact, eases maintenance of the steering axle 564 relative to the steering axle 334.

It is worth mentioning that the location and position of the service brake chamber 566, mounted on brackets 580 provides a level of clearance allowing a maximum steering angle of the wheel hub assemblies 224 not limited by the service brake chamber 566 abutting against another part, but rather only by the setting of e.g., the steering converter 520.

Figure 73:
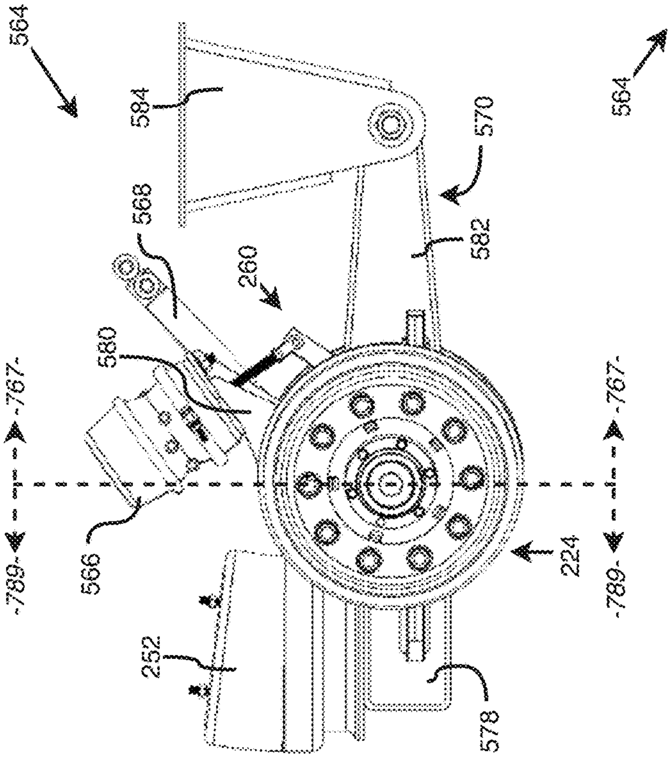
FIG. 73 is a side elevation view of the steering axle of FIG. 70.
Figure 74:
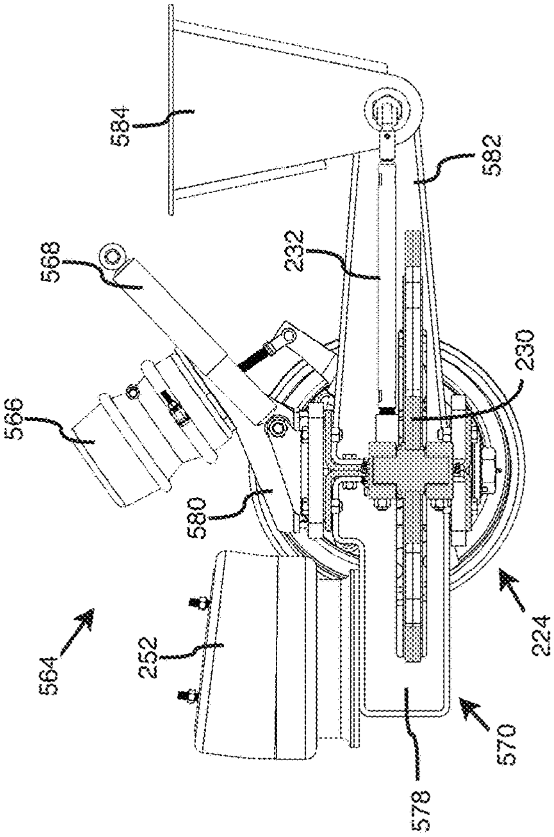
FIG. 74 is a cross-section view of the steering axle of FIG. 70 according to lines 74-74 depicted on FIG. 72.
Figure 75:
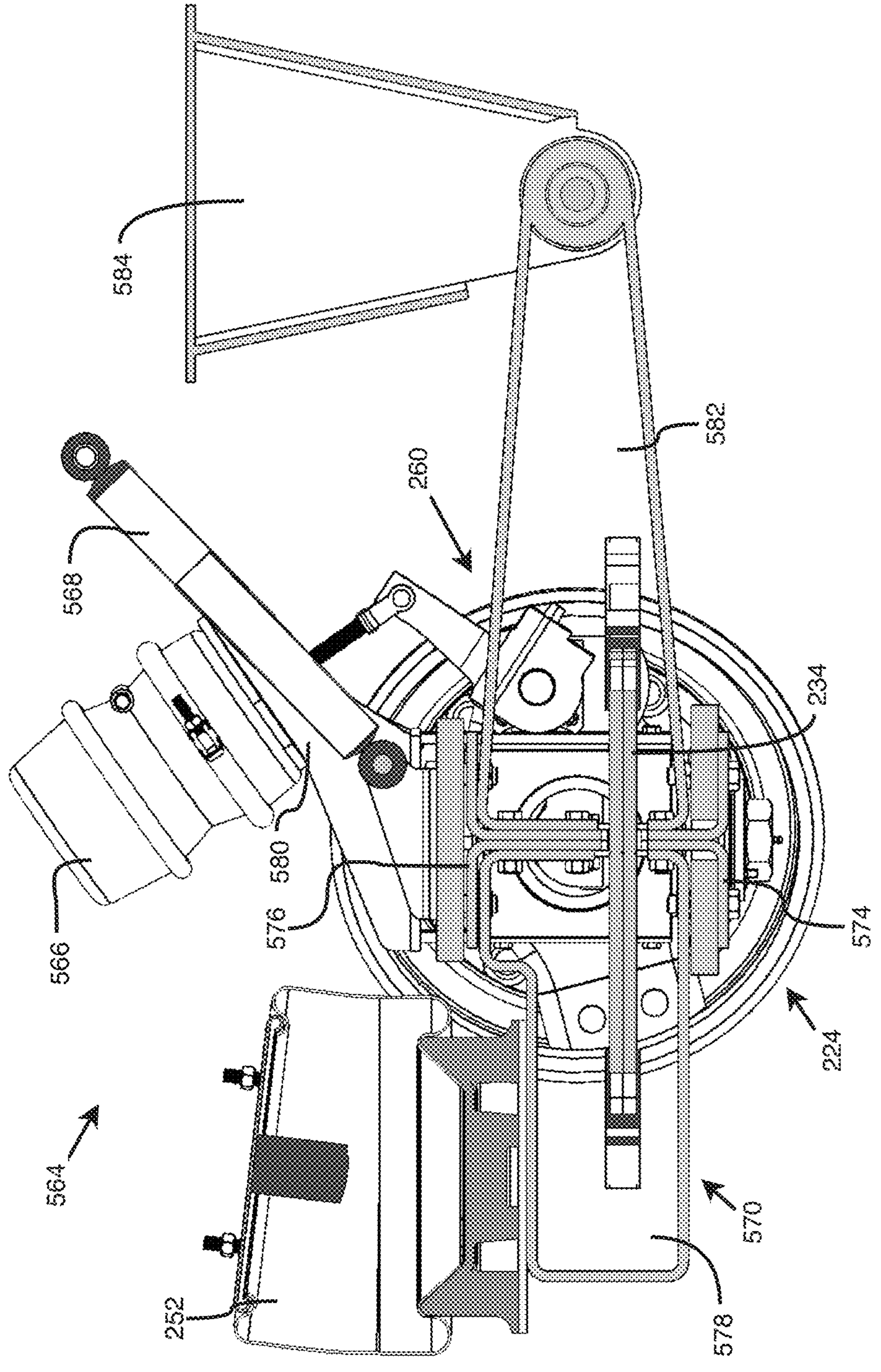
FIG. 75 is a cross-section view of the steering axle of FIG. 70 according to lines 75-75 depicted on FIG. 72.
Figure 76:
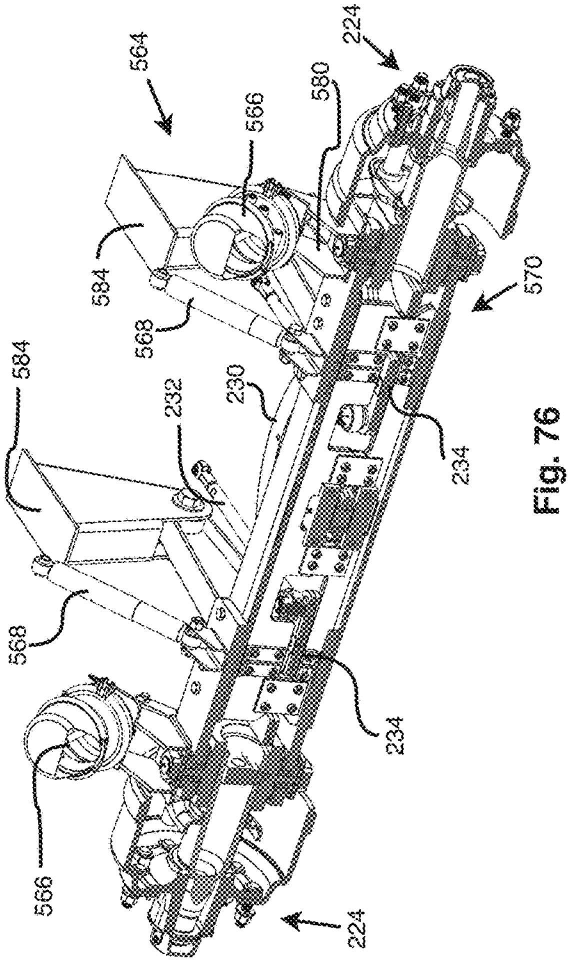
FIG. 76 is a perspective cross-section view of the steering axle of FIG. 70 according to lines 76-76 depicted on FIG. 73.

Referring now particularly to FIGS. 73, 74, and 75 are depicted a side view of the steering axle 564, and different cross-section side views of the steering axle 564 in according to rotation axes of the rotatable central cogged piece 230, and of a cogged piece 234.

From these cross-section views, it is depicted the different parts 574, 576, 578 and 582 combining into the cage of protection of the cogged pieces 230, 234, with nuts and bolts depicting the ease assemble them into the cage of protection and to open the cage of protection for maintenance.

Figure 77:
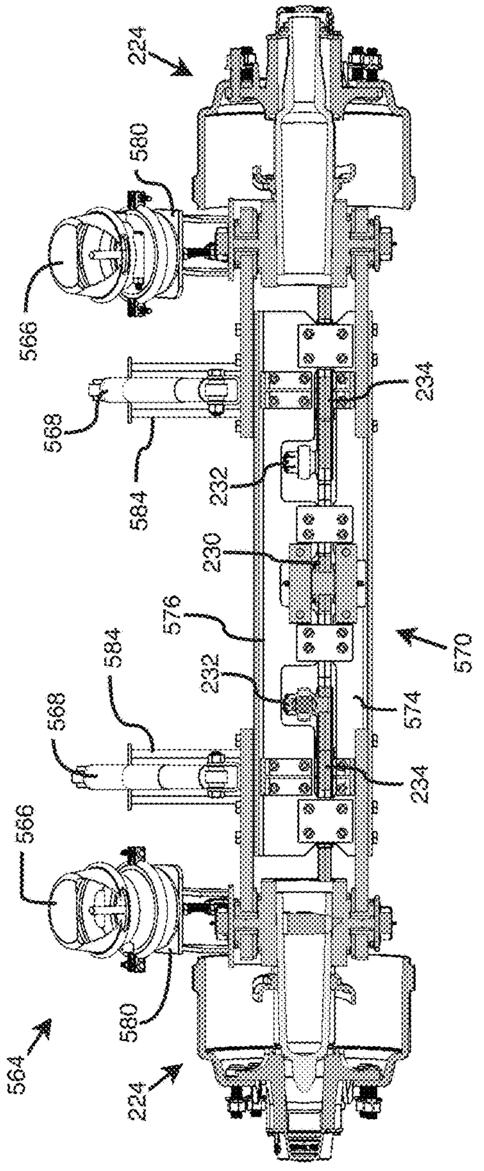
FIG. 77 is an elevation cross-section view of the steering axle of FIG. 70 according to lines 767-767 depicted on FIG. 73.
Figure 78:
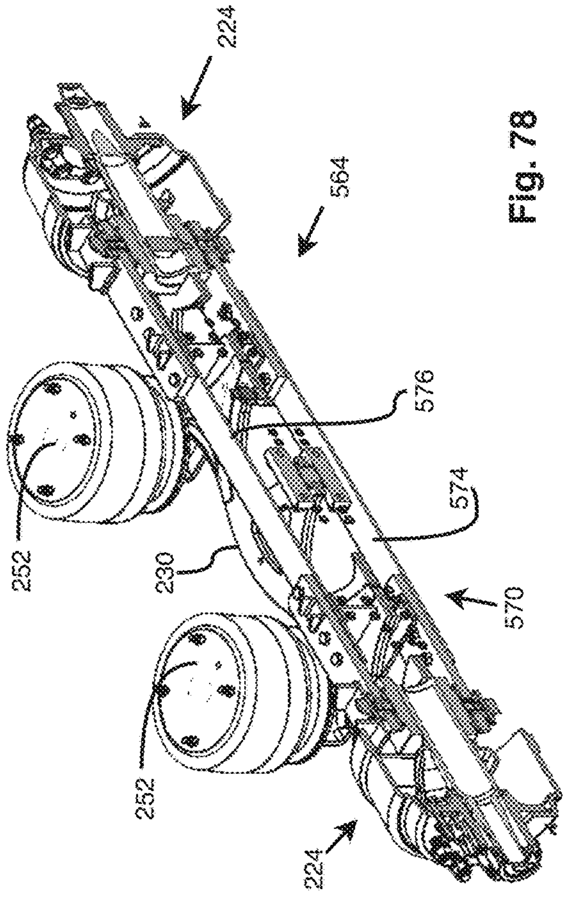
FIG. 78 is a perspective cross-section view of the steering axle of FIG. 70 according to lines 789-789 depicted on FIG. 73.
Figure 79:
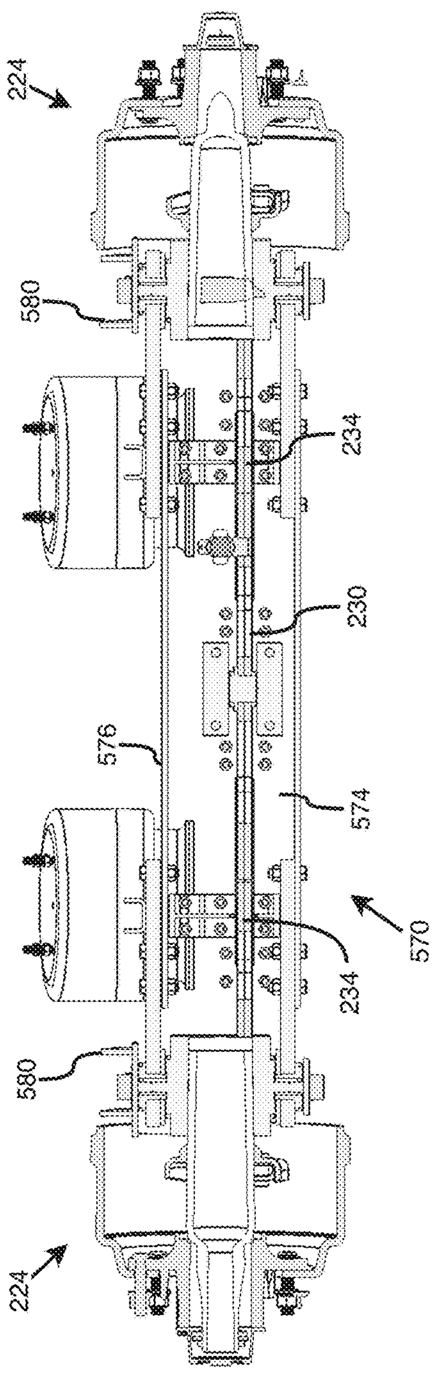
FIG. 79 is an elevation cross-section view of the steering axle of FIG. 70 according to lines 789-789 depicted on FIG. 73.

It is further patent, further considering FIGS. 77 to 79, that the axis of the cogged pieces 230, 234 are all aligned, providing an upmost design to limit forces and relative movements that may generate premature wear to one of the components of the steering axle 564.

It is also to be noted that the parts 582 allow to mount the steering axle 564 to the bogie, wherein rotatable connection between the parts 582, 584 provides the necessary flexibility of the steering axle 564.

Referring particularly to FIGS. 76 to 79, it is further patent that maintenance is possible from the assembly of the general structure 570, and that two driving arms 232 driving the rotatable central cogged piece 230 are adapted to be connected at the same height at both ends, limiting the requirements and fatigue the ball bearings used to mount the 232 at each end will endure.

Figure 81:
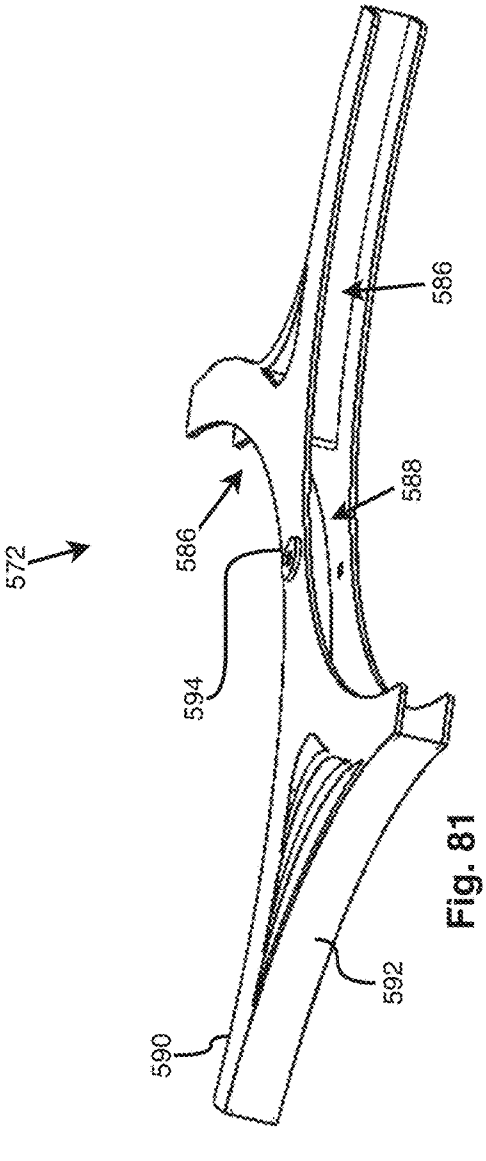
FIGS. 80 and 81 are oblique perspective views of a teeth shield in accordance with an embodiment.
Figure 80:
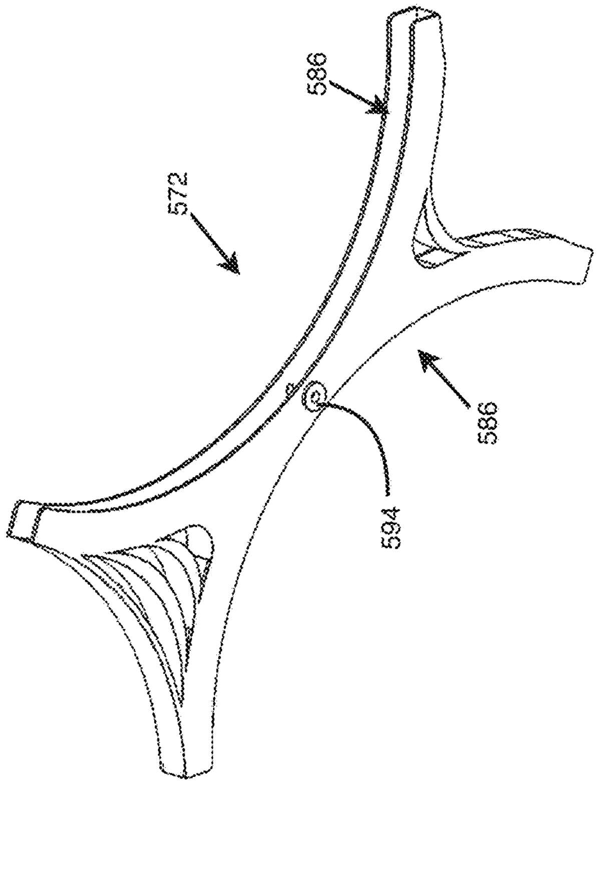
Figure 82:
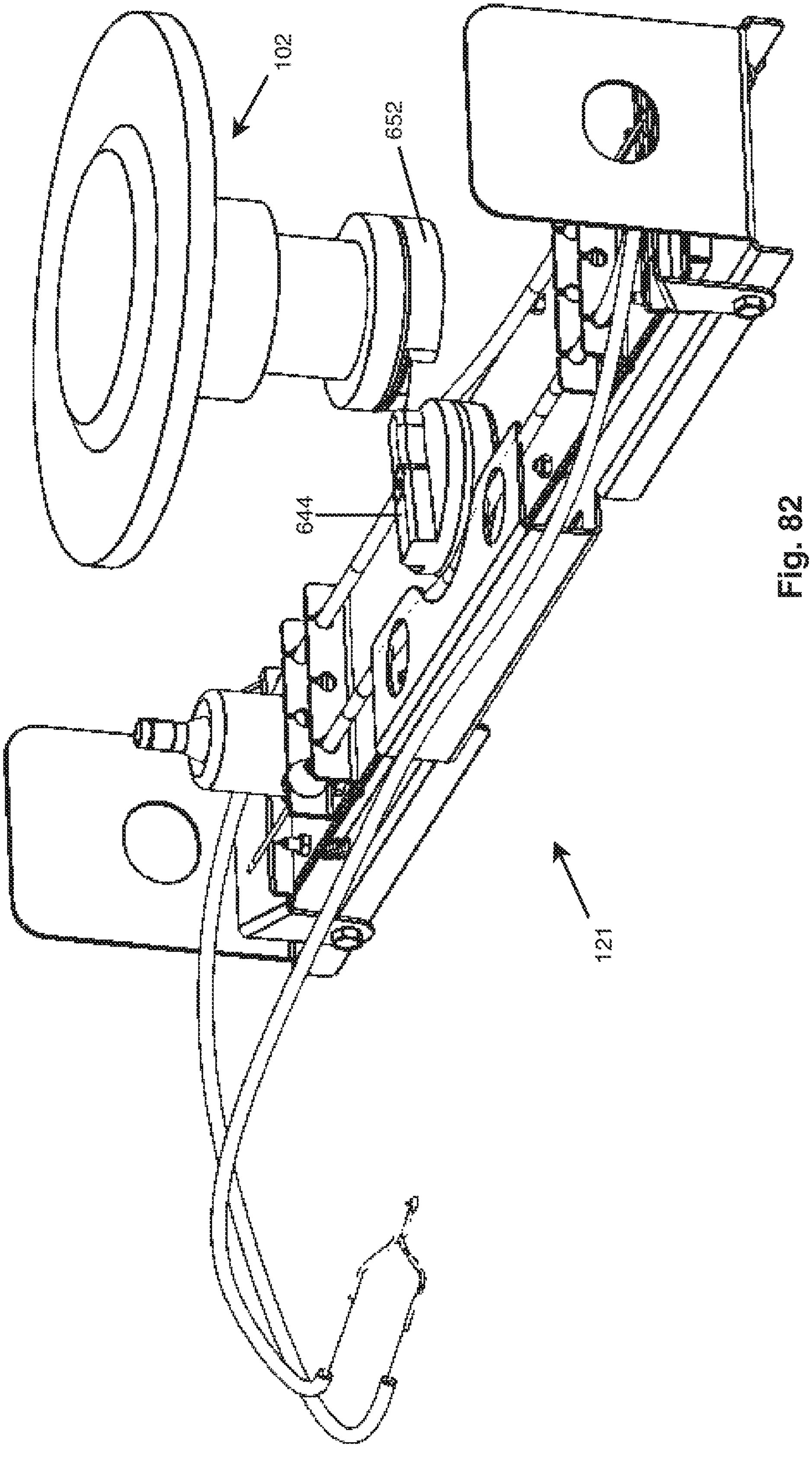
FIG. 82 is a perspective view of an angular encoder system and a kingpin before they are engaging with each other in accordance with an embodiment.
Figure 83:
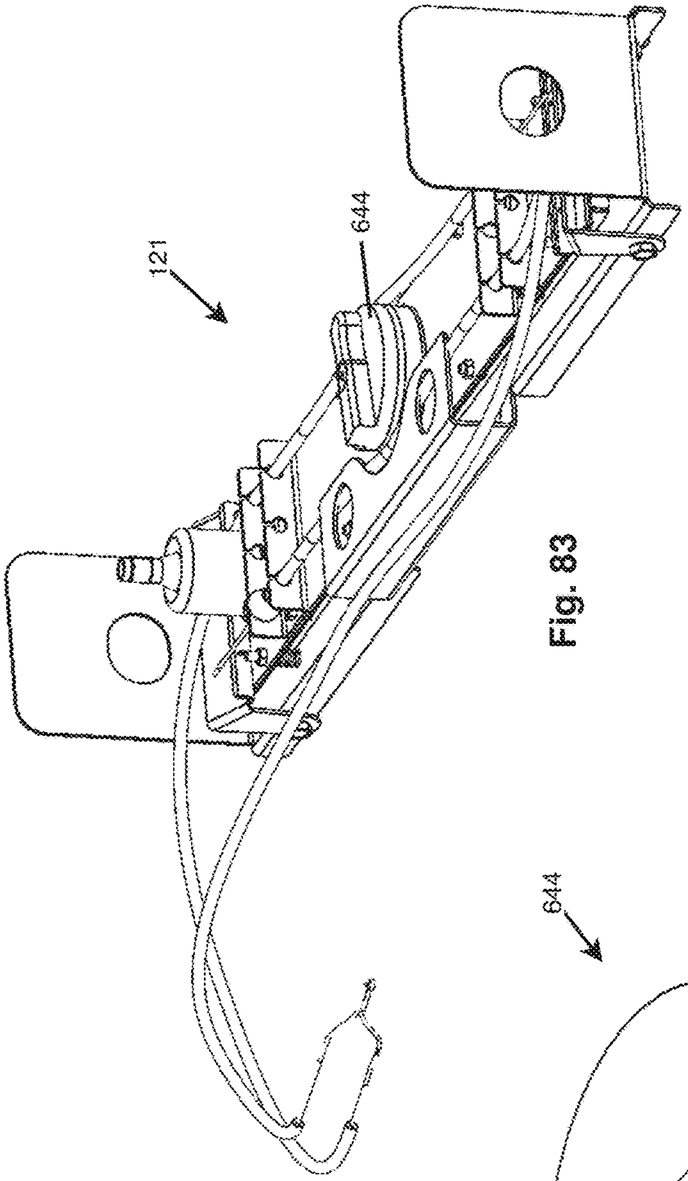
FIG. 83 is a perspective view of an angular encoder system in accordance with an embodiment.
Figure 84:
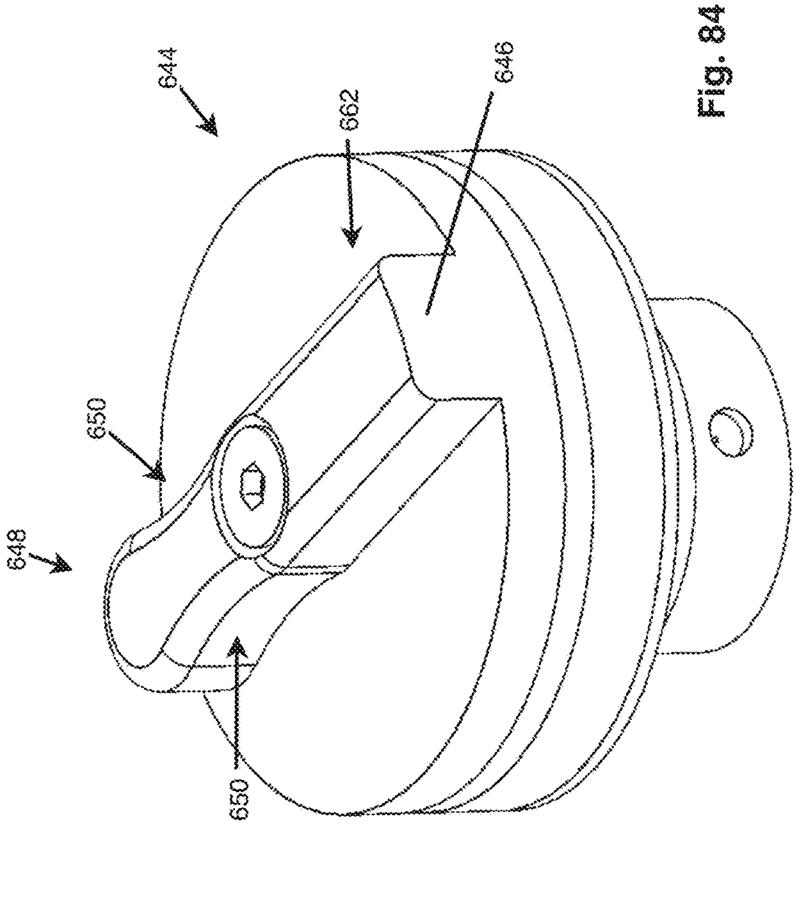
FIG. 84 is a perspective view of the interfacing top of the angular encoder system of FIG. 83.
Figure 87:
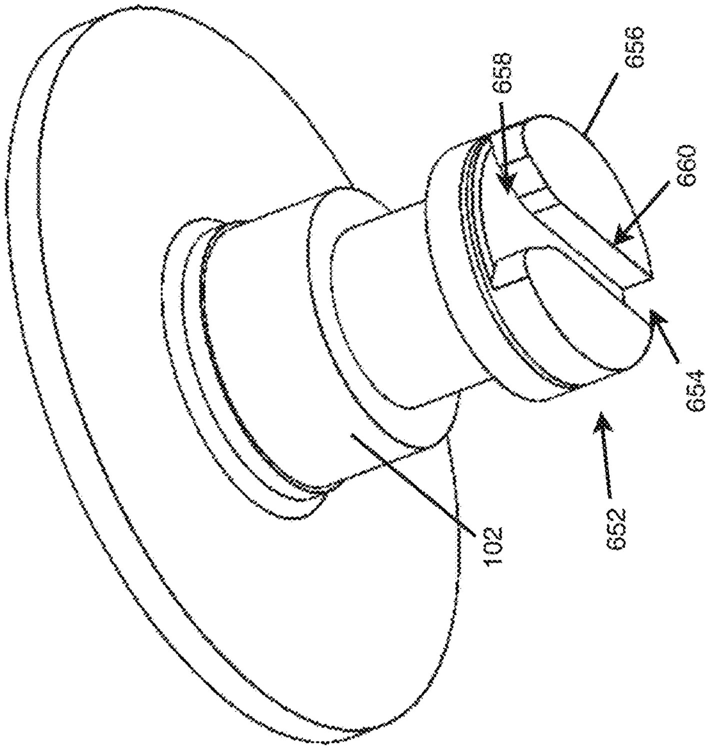
FIG. 87 is a bottom perspective view of a kingpin with a settling component mounted thereto of FIGS. 85 and 86.
Figure 85:
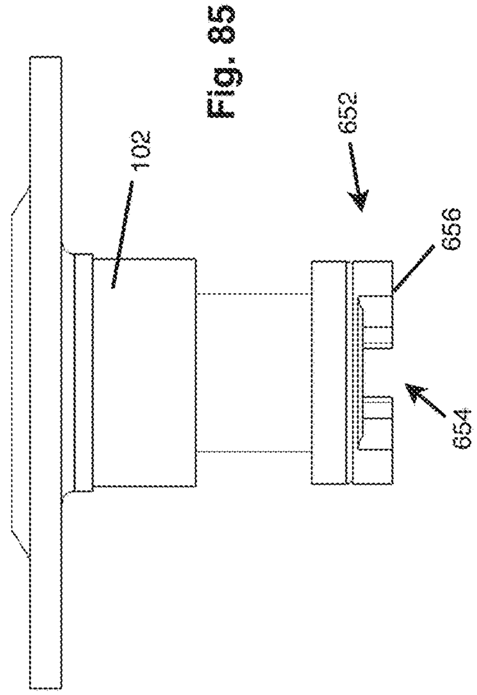
FIGS. 85 and 86 are respectively a front elevation view and a bottom plane view of a kingpin with a settling component mounted thereto in accordance with an embodiment.
Figure 86:
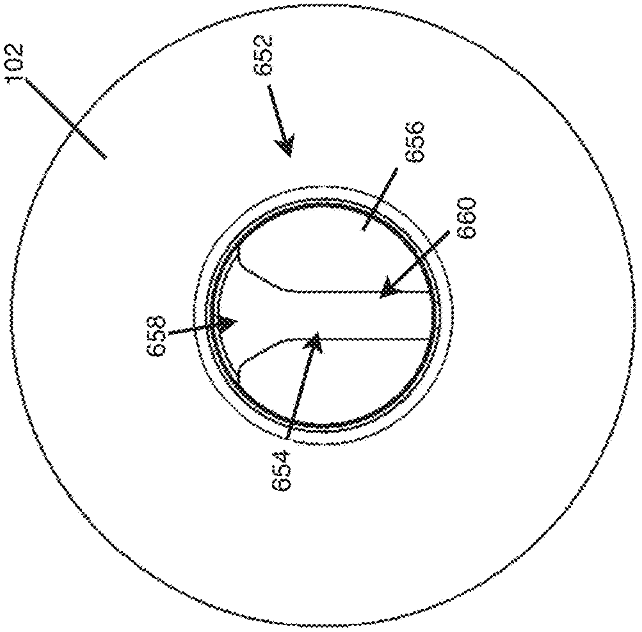

Referring now to FIGS. 80 and 81, the teeth shield 572 consists in a pair of curved channels 586 opposed to each other with a central floor-free portion 588 opening the channels 586 to each other. The teeth shields 572 are made of polymer, light while able to resist to different temperatures. The object of the teeth shields 572 is to prevent gravel and other debris to be present between the teeth of the cogged pieces 230, 234 at their interface, thereby increase life cycle of the cogged pieces 230, 234. The general shape of the teeth shields 572, in addition to the interfacing cogged pieces moving in opposed direct helps in keeping the 572 in place. Practically, according to an embodiment, the teeth shields 572 are made of a top piece 590 and a bottom piece 592 that are clipped to each other once the cogged pieces 230, 234 are mounted to the general structure 570. According to another embodiment (not depicted), the teeth shields 572 are made of a front piece and a rear piece that are clipped to each about the central floor-free portion 588 other once the cogged pieces 230, 234 are mounted to the general structure 570. The teeth shields 572 may feature a closable opening 594 for lubricating the cogged pieces 230, 234 at their interface.

Figure 42:
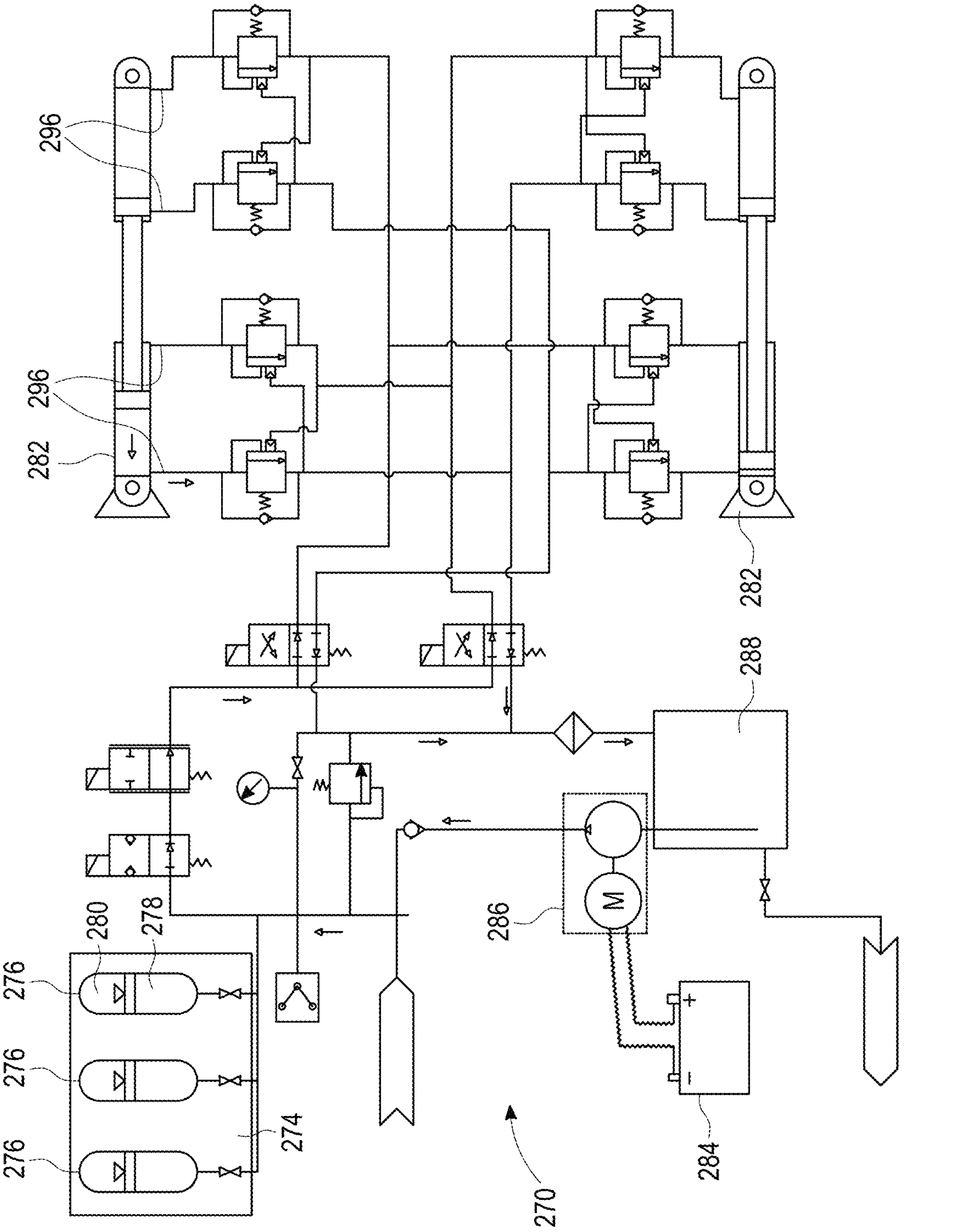
FIG. 42 is a first portion of a hydraulic circuit schematic of the hydraulic system of the steering system in accordance with an embodiment.
Figure 43:
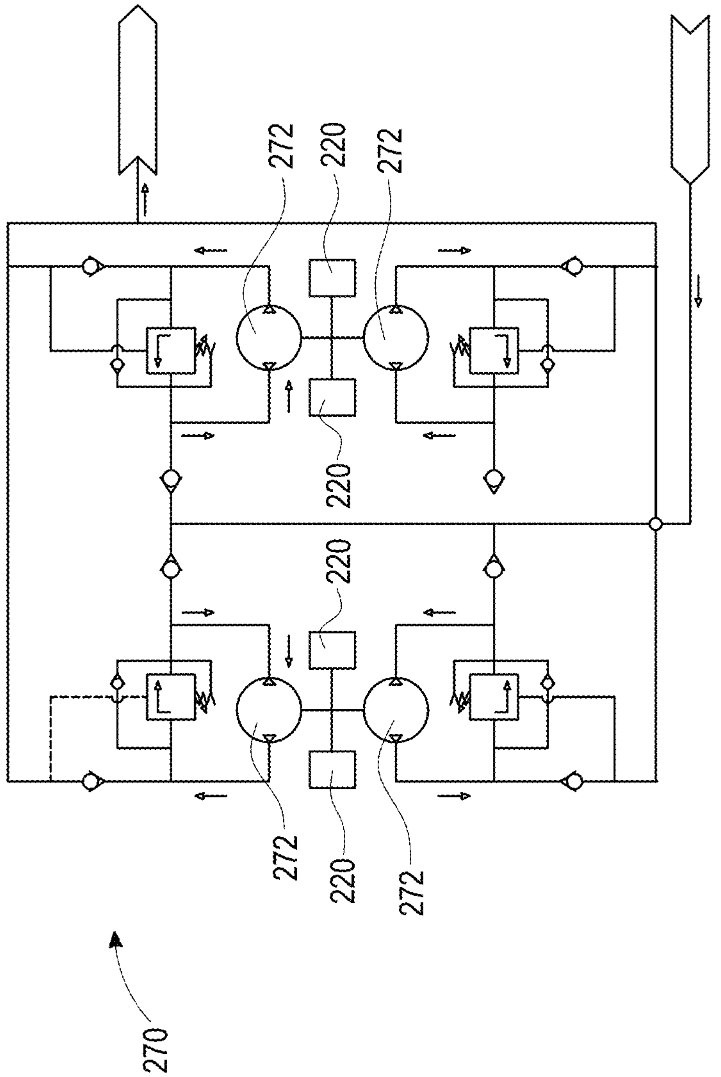
FIG. 43 is a second portion of the hydraulic circuit schematic of the hydraulic system of the steering system complementary to the one of FIG. 42.

Referring particularly to FIGS. 42 and 43, it is to be noted that the hydraulic cylinder 282, aka hydraulic linear actuator, through its double-barrel four (4) inlets configuration, ensures that the same volume of oil is used, and thus maintained, in the hydraulic system regardless of the configuration of the hydraulic cylinder 282, aka position of the arm extremities or pistons, in the barrels. As the arm moves in one barrel, the same volume of oil pushed out of the first barrel is freed in the second barrel. By associating the aligned configuration of the steering axle 334 with an extreme position of the arm relative to at least one of the barrel, it is always possible through control of pressure in one of the inlets to force alignment of the steering axle 334.

Preferably, counter balance vales are connected to each one of the inlets of the hydraulic cylinders 282 to prevent overpressure at the inlets, extra pressure at one inlet being counterbalanced by the associated counter balance valve, According to realizations, hydraulic cylinders 282 may be mounted to connect a steering axle 334 or a part of steering axle 334 to another steering axle, or to a fix component of the semi-trailer 110 or of the bogie 302. The last option, through axis absolute reference, allows at any point to set a steering axle 334 is the neutral aligned position.

It is to be noted that the present steering assembly 220 is a hydraulic powered system, and as any hydraulic system on heavy vehicles, and particularly heavy semi-trailers, operation of the hydraulic system requires a lot of amperage to operate. Nowadays, some designs of semi-trailers adopt a solution to that problem which consists in having an important number of batteries mounted to the semi-trailer for autonomously powering the hydraulic pump(s) of the hydraulic system, what frequently sum up to a power requirement of two hundred (200) Amperes of 12 Volts direct current. Accordingly, an alternative solution adopted nowadays also comprise to install generators on the semi-trailers to decrease the necessary stocking capacity of the batteries.

Hence, herein is described an alternative energy stocking system 270 for powering the hydraulic system of the steering assembly 220. The energy stocking system 270 allows to substantially decrease the necessary stocking capacities of the batteries of the semi-trailer, and environmental impact.

Figure 34:
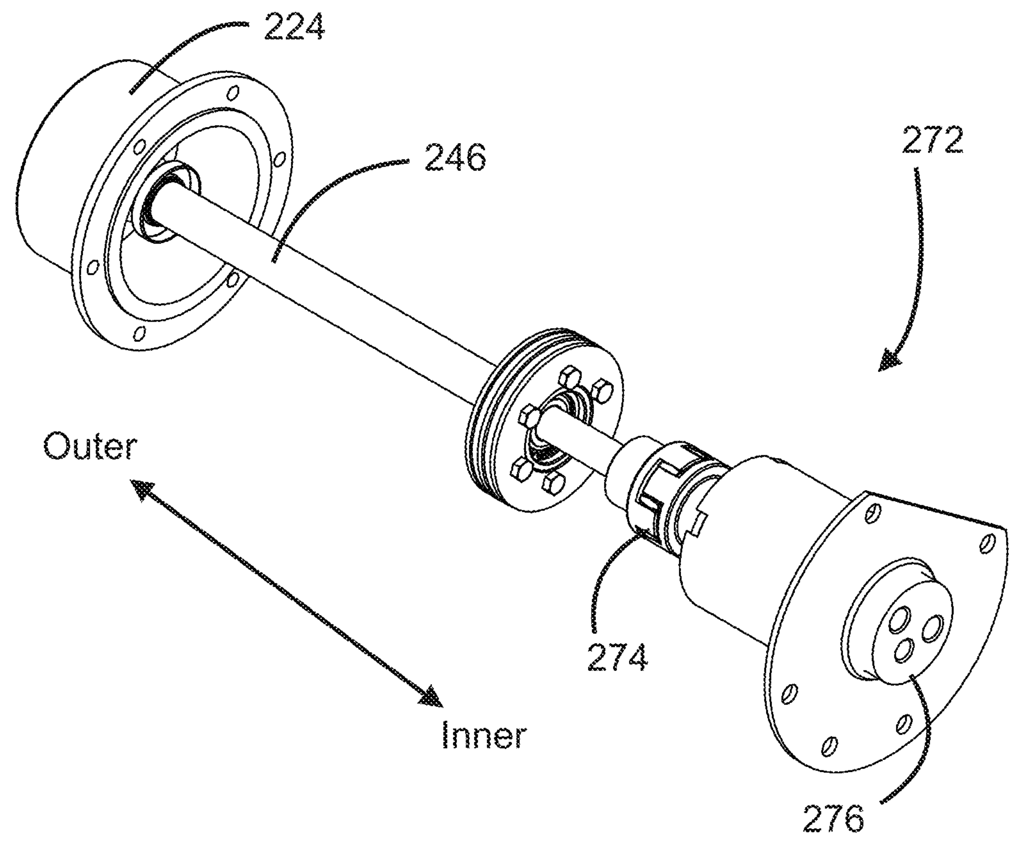
FIG. 34 is a partially exploded view of components of the external portion of the axle of a steered wheel comprising a hydraulic generator in according with an embodiment.
Figure 35:
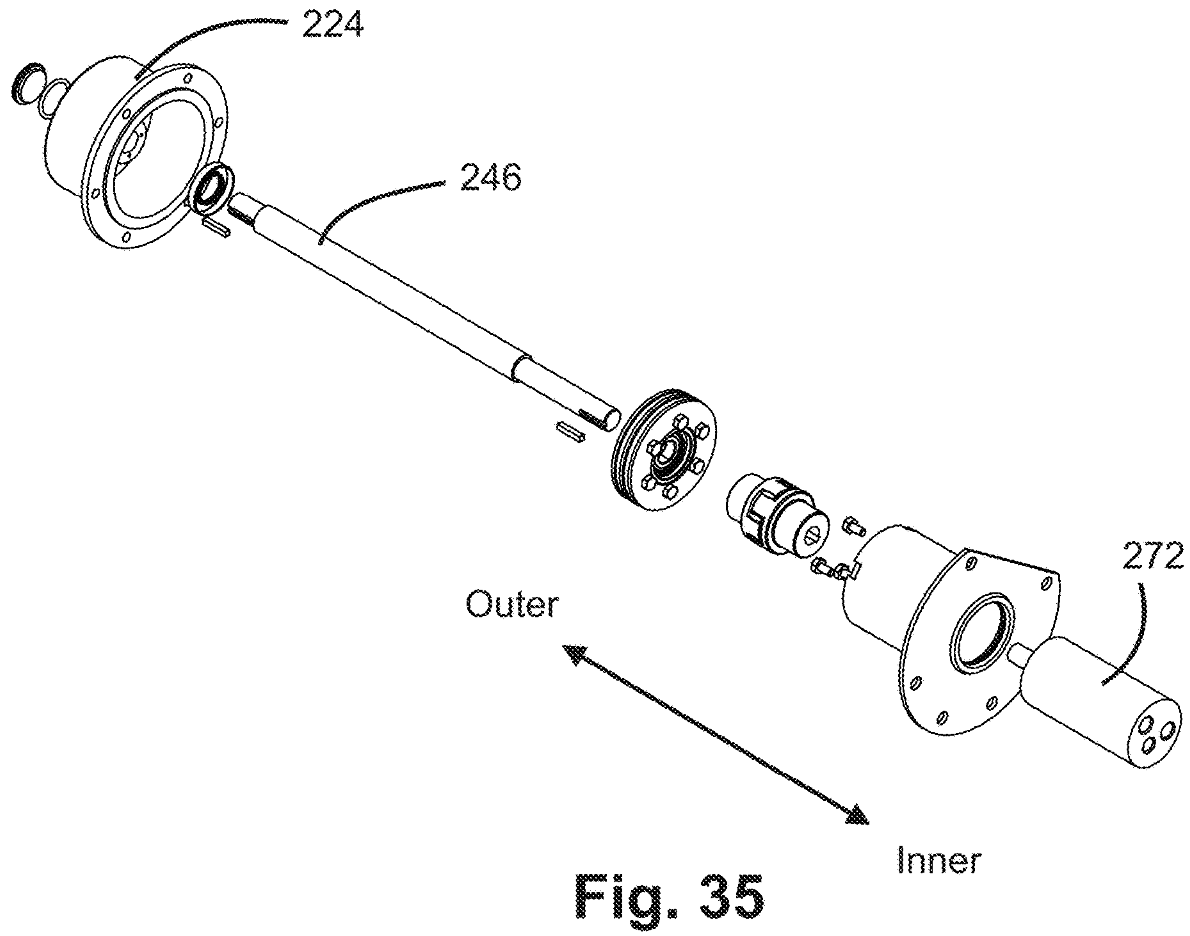
FIG. 35 is an exploded view of the components of FIG. 34.
Figure 36:
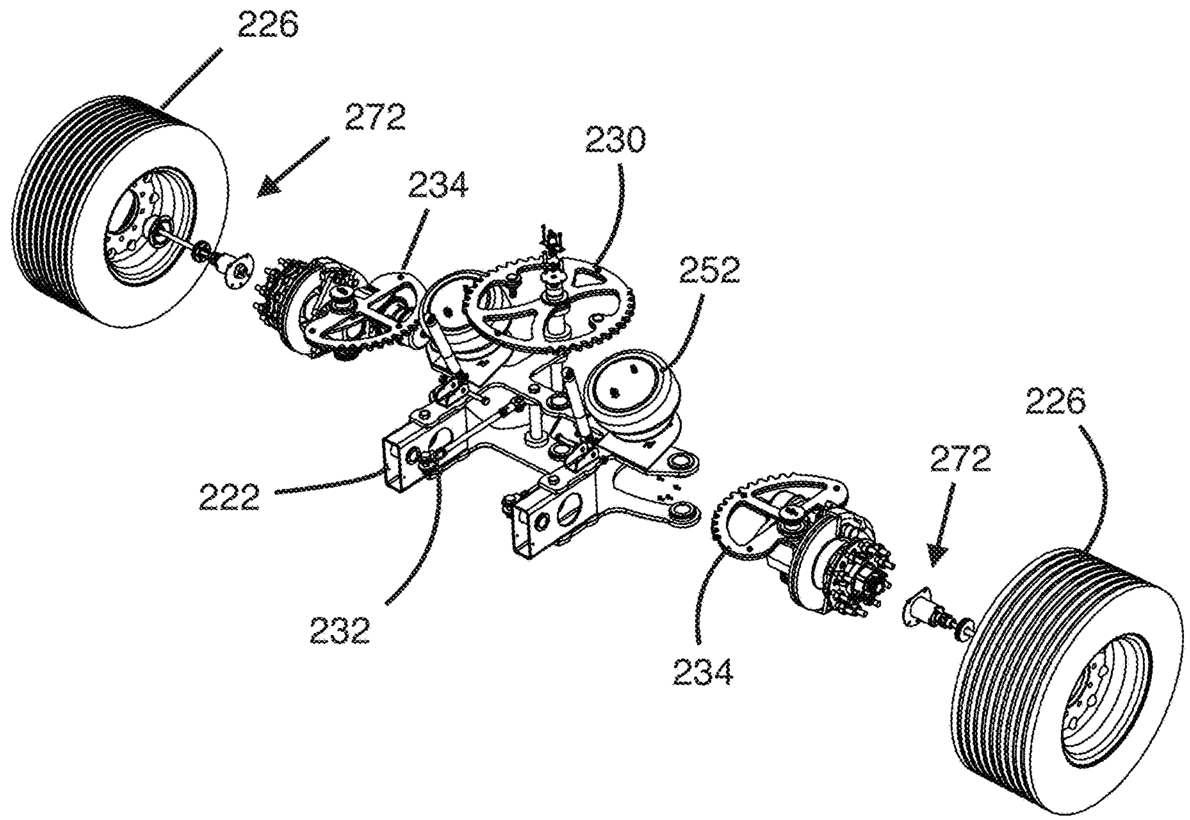
FIG. 36 is an exploded view of the axle for steered wheels comprising a hydraulic generator in accordance with an embodiment.
Figure 37:
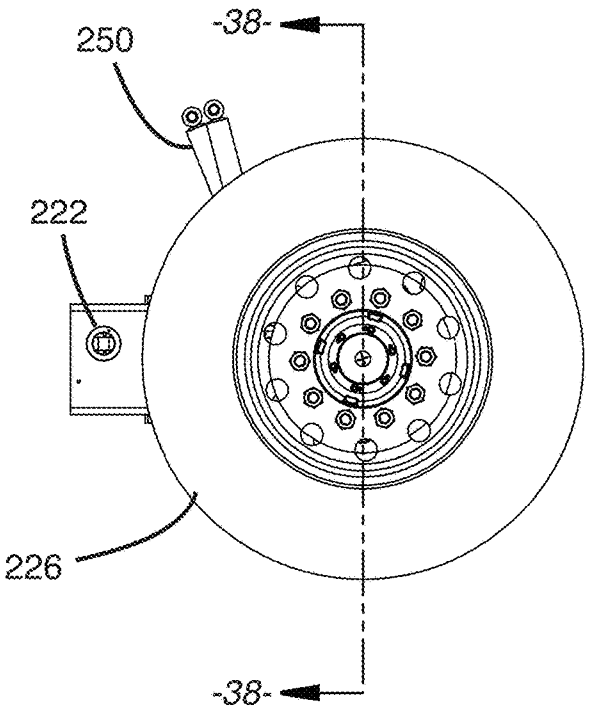
FIG. 37 is a side view of a portion of a steered-wheel trailer in accordance with an embodiment.
Figure 38:
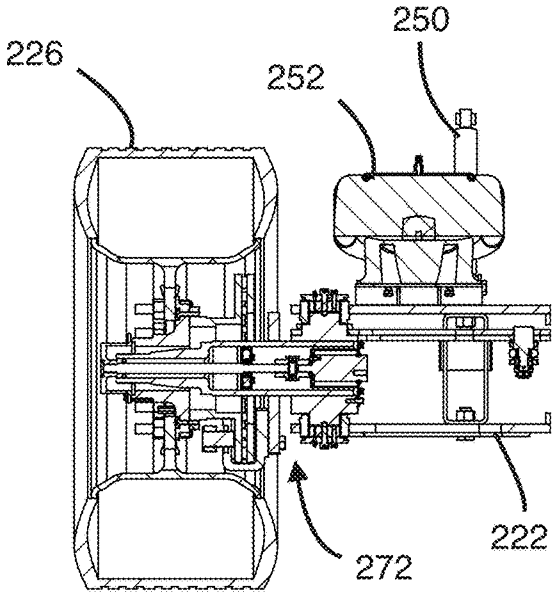
FIG. 38 is a rear-perspective cross-section view of a left portion of the portion of the of a steered-wheel trailer according to cross-section lines A-A depicted on FIG. 37.
Figure 41:
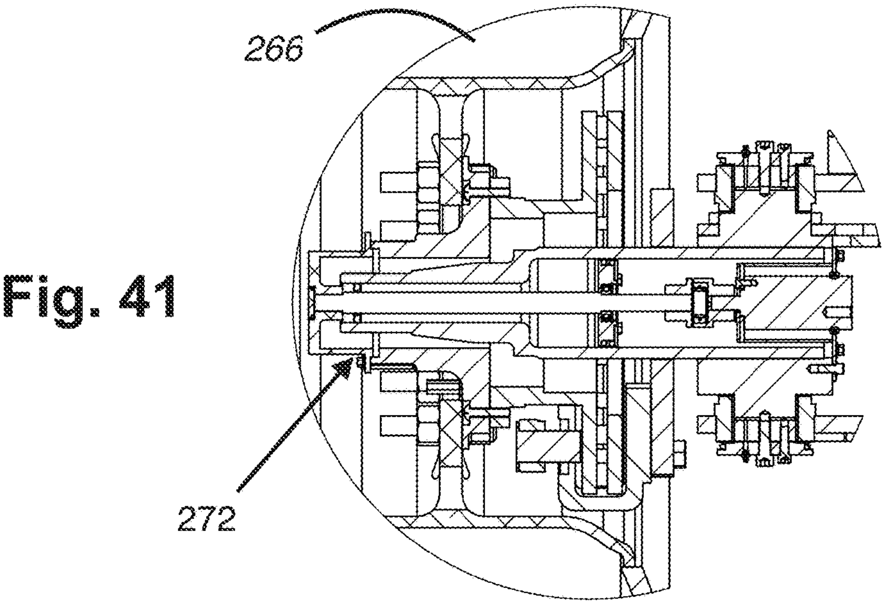
FIG. 41 is a detailed rear-perspective cross-section view of components depicted on FIG. 40 according to detail section -B- depicted on FIG. 40.
Figure 39:
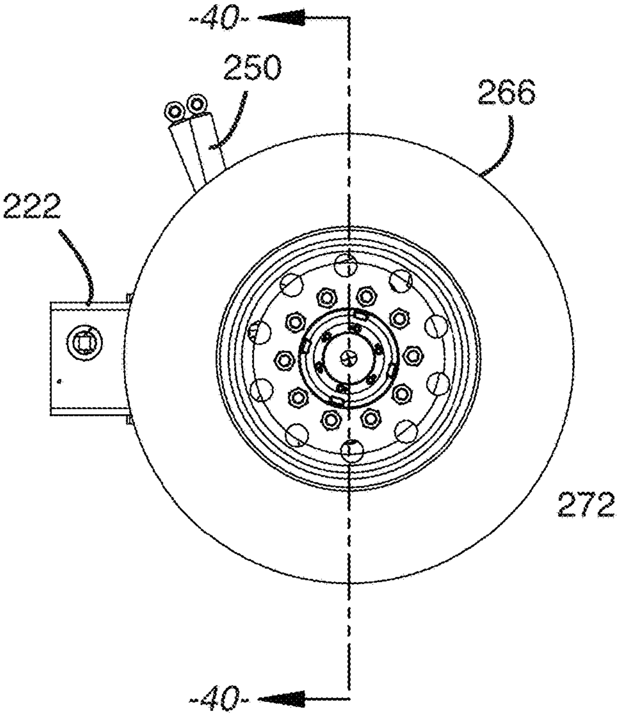
FIG. 39 is a side view of a portion of a steered-wheel trailer in accordance with an embodiment.
Figure 40:
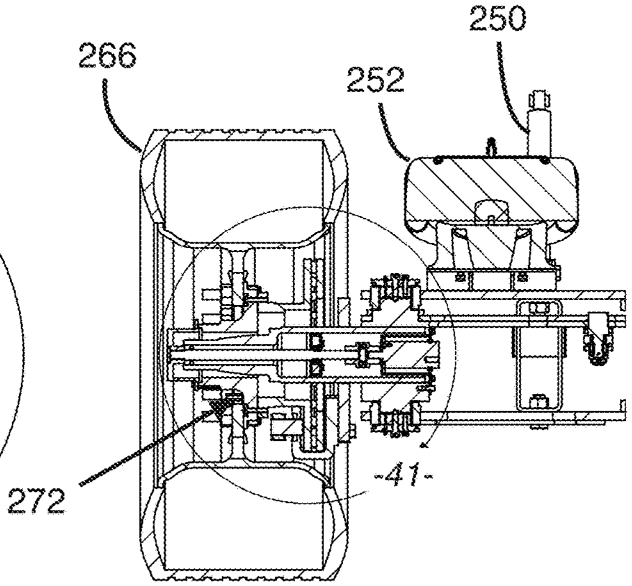
FIG. 40 is a rear-perspective cross-section view of a left portion of the portion of the of a steered-wheel trailer according to cross-section lines A-A depicted on FIG. 39.

The energy stocking system 270 takes advantage of the rotation of the wheel hub assemblies 224 as the semi-trailer 110 is hauled by the tractor 100. The energy stocking system 270 combines a number of hydraulic generators 272, FIG. 34, and a hydraulic accumulator 274 (see FIG. 42). The hydraulic generators 272 are installed opposed to the external extremity of the spindles 246 and are driven through the spindles 246 as the wheel hub assemblies 224 are rotating engaged to the ground. The hydraulic generators 272 are hydraulic pumps that pump oil into the under-pressure accumulator 274 to stock hydraulic potential energy available afterwards to exert pressure into the hydraulic system on demand.

As is described in details hereinafter, the hydraulic generators 272 are coupled to a circuit that operated in close circuit once the accumulator 274 has reached its optimal pressure, preventing over-pressurizing, premature wear, and/or failure of the present energy stocking system 270.

Referring additionally to FIG. 43, the hydraulic accumulator 274 comprises, according to an embodiment, three individual hydraulic accumulators 276 commonly connected to the hydraulic circuit, and adapted to contain seven (7) liters of oil under about two thousand five hundred (2500) PSI (Pounds per square inch) of pressure. The accumulators 276 comprises a compressible oil compartment 278 and a gas compartment 280 in which nitrogen is stocked and used to compress the compressible oil compartment 278 as the compressible oil compartment 278 is evacuated from its oil. In opposition, the nitrogen increase pressure as the compressible oil compartment 278 is filled with oil; the compressible oil compartment 278 and gas compartment 280 being complementary to each other.

Referring to FIGS. 34-41, the hydraulic generators 272 are mounted coaxially to the axle and the spindles 246. The hydraulic generators 272 are fixedly connected to the spindles 246 such as when the wheel hub assemblies 224 roll as the tractor 100 hauls the semi-trailer 110, the hydraulic generators 272 are powered. The hydraulic generators 272 comprise an inner part, fixedly mounted to the rotating spindle 274, and a non-rotating outer part, connected to the axle, with relative rotation pumping the oil.

Accordingly, energy stocking system 270 requires a less powerful pump and thus less electric energy to be stocked to power it. For instance, the present steering assembly 220 that would require about two hundred (200) Amperes for powering the hydraulic system according to common designs, may operate with a pump and e.g., batteries requiring less than twenty (20) Amperes. In the present case, two batteries are used at the startup of the hydraulic system to power a startup pump that would fill the hydraulic accumulator 274 before the operation (note: since a startup phase, the process may be performed according to a lower response-time requirement, thus with a less powerful pump requiring less amperage). During the operation, the startup pump will usually not be required to operate in real time to respond to hydraulic pressure response. The startup pump would operate almost only to complement the hydraulic generators 272 when deemed necessary. After the startup phase, the batteries would power valves and other components that are consuming less energy than a hydraulic pump to direct the hydraulic power stocked in the hydraulic accumulator 274 toward the appropriate component of the hydraulic system. Such flow of operation and requirements will become apparent from the following detailed description.

Referring to FIGS. 42-43, a hydraulic circuit schematic is provided. Depicted on FIG. 42 are the batteries 284, a startup motor 286 operating at the startup to fill the hydraulic accumulator 274, and the non-pressurized oil container 288. FIG. 42 depicts on the top left the hydraulic accumulator 274. The remaining of the circuit on FIG. 42 depicts the circuit controlling the hydraulic cylinders 282 operating the steering of the steering assembly 220.

FIG. 43 depicts the part of the circuit associated with the hydraulic generators 272 and the closed circuit taking place once the hydraulic accumulator 274 has reached the desired pressure.

Control components and valves (not individually identified) are completing the circuit and can be understand from the circuit by a person skilled in the art.

It is worth mentioning that the steering assembly 220 is controlled by two hydraulic four-controls cylinders 282 (see FIG. 42) each featuring e.g., four inlets/outlets 296 that allows to reset the steering wheels to the straight configuration by operating the hydraulic cylinders 282 to a specific end-of-course position. The use of an end-of-course position as the straight configuration prevents the necessity to use an encoder and to store data that is necessary to refer to restore the system to its straight configuration. Such solution prevents failures such as controller memory and angular encoder failures to require urgency maintenance. The same applies to the hydraulic pressure entries. The steering system 115 is designed such that when a failure occurs that prevents correct control of the cylinders to steer the wheels, pressure in some normally open valves automatically results in the wheels on both sides of the semi-trailer (since joined through the rotatable central cogged piece 230) to resume to the straight configuration, namely the wheels returning to a straight direction, i.e., parallel to each other and parallel to the longitudinal axis of the semi-trailer.

The steering system 115 comprises a series of security features and security redundancy solutions in addition to the four inlet/outlet cylinders, the normally open valves, and the hydraulic energy stocking discussed before. These security features (not explained herein but understandable from the figures by a person skilled in the art) ensures that the steering system 115, in almost all cases of failures, either remains operable or steer the wheels to the straight configuration, and thus allowing the operator to continue operating the semi-trailer 110 (e.g., completing remaining deliveries of the day and returning to the garage) until maintenance is performed.

Therefore, one person skilled in the art would recognize that the present description contemplated therethrough steered wheels semi-trailers featuring a variety of configurations, wherein the parameters used to establish the configuration of the steered wheels semi-trailer may comprise, in a non-limiting manner:

Distance of the steered axles relative to the kingpin 102;
Wheelbase;
Installation of the steering system 115 on a single semi-trailer, on a front or a rear semi-trailer of a road train;
Steering system comprising a single steered axle, a dependent steered axle, etc.
Etc.

It is also contemplated that the steering system 115 may be installed on a self-powered vehicle, e.g., articulated buses and airplanes, with the angle driving parameters driving the steering angles of the wheels being potentially captured in an alternative manner than via the sensing of the rotation of a kingpin relative to a hauling saddle without departing from the scope of the present description.

It is also contemplated that embodiments may encompass a combination of one or more, up to all of the features described herein without departing from the scope of the description.

It is further contemplated that technical variations are also intended to be contemplated therethrough, wherein the general geometry of the described features and/or the general way in which it works are generally maintained. Examples of such technical variations comprises alternative fixation techniques, alternative number of components involved in generating a coupling, and an operating interface based on e.g., use of cogs, use of interconnecting chain(s), use of interconnecting belt(s).

It is also contemplated that systems described herein may be embodied in other environment having similar requirements but not listed herein.

For instance, a similar hydraulic energy stocking system may be installed on garbage trucks equipped with a hydraulic arm used to lift and empty garbage cans into a compactor bin. The hydraulic energy stocking system may accumulate hydraulic energy during rides between residences and/or when the motor runs, and uses the accumulate hydraulic power (alone or in combination with pump provided power) to power to the hydraulic arm, thus decreasing peak power requirements. Such exemplary solution thus requires a less powerful pump to be installed thereto.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A coupling assembly of a vehicle, the coupling assembly being designed for coupling a steering mechanism to a steering axle mounted to a bogie movable relative to the steering mechanism, the coupling assembly comprising:
a first subassembly comprising a first structure for being coupled to the vehicle at a fixed distance relative to the steering mechanism and a first linking mechanism mounted to the first structure;
a second subassembly comprising a second structure for being coupled to the vehicle and to move with the bogie, a second linking mechanism mounted to the second structure, and an intermediary steering component coupled to the second linking mechanism designed to be coupled to the steering axle; and
a pair of elongated members extending side by side, the elongated members coupling the subassemblies, wherein a first one of the elongated members is adapted to be coupled to a steering member,
wherein, when the steering member is moving relative to the first subassembly, the steering member exerts the elongated members to move relative to each other with the intermediary steering component being controlled therethrough, and
wherein, when the bogie is moving relative to the steering mechanism, the bogie exerts the second subassembly to move relative to the first subassembly without the elongated members moving relative to each other.

2. The coupling assembly of claim 1, wherein at least one of the linking mechanisms consists in a cog mechanism.

3. The coupling assembly of claim 2, wherein the cog mechanism comprises a pair of coupled cogs, with a first one of the cogs having a shaft rotatable around a second one of the cogs.

4. The coupling assembly of claim 3, further comprising an arched way in which travels the shaft of the first cog.

5. The coupling assembly of claim 3, further comprising a linking element rotationally coupling the shaft of the first cog to the second cog.

6. The coupling assembly of claim 3, wherein the intermediary steering component is coupled to the first cog.

7. The coupling assembly of claim 3, wherein the cog mechanism comprises a guiding element coupled to the first cog in which one of the elongated members extends.

8. The coupling assembly of claim 1, wherein the elongated members comprise racks.

9. The coupling assembly of claim 8, wherein each of the racks comprises a toothed face, with the toothed faces facing each other.

10. The coupling assembly of claim 1, wherein the linking mechanisms consists in cog mechanisms comprising cogs having an identical rotation ratio per unit of linear displacement of the elongated members.

11. A vehicle comprising:
a chassis;
a bogie movable relative to the chassis:
a steering axle mounted to the bogie;
a steering mechanism; and
a coupling assembly coupling the steering mechanism to the steering axle, the coupling assembly comprising:
a first subassembly comprising a first structure coupled to the chassis,
and a first linking mechanism mounted to the first structure:

a second subassembly comprising a second structure coupled to the vehicle to move with the bogie, a second linking mechanism mounted to the second structure, and an intermediary steering component coupled to the second linking mechanism coupled to the steering axle: and a pair of elongated members extending side by side, the elongated members coupling the subassemblies, wherein a first one of the elongated members is coupled to the steering mechanism, wherein, the steering mechanism is adapted to exert the elongated members to move relative to each other with the intermediary steering component being controlled therethrough, thereby steering the steering axle, and wherein, when the bogie is moving relative to the chassis, the bogie exerts the subassemblies to move relative to each other without the elongated members moving relative to each other.

12. The vehicle of claim 11, wherein at least one of the linking mechanisms consists in a cog mechanism.

13. The vehicle of claim 12, wherein the cog mechanism comprises a pair of coupled cogs, with a first one of the cogs having a shaft rotatable around a second one of the cogs.

14. The vehicle of claim 13, further comprising an arched way in which travels the shaft of the first cog.

15. The vehicle of claim 13, further comprising a linking element rotationally coupling the shaft of the first cog to the second cog.

16. The vehicle of claim 13, wherein the intermediary steering component is coupled to the first cog.

17. The vehicle of claim 13, wherein the cog mechanism comprises a guiding element coupled to the first cog in which one of the elongated members extends.

18. The vehicle of claim 13, wherein the cogs of the pair of coupled cogs of the cog mechanism have an identical rotation ratio per unit of linear displacement of the elongated members.

19. The vehicle of claim 11, wherein the elongated members consists in racks.

20. The vehicle of claim 19, wherein each of the racks comprises a toothed face, wherein the toothed faces are facing each other.

* * * * *